United States Patent
Shukunami et al.

(10) Patent No.: US 9,699,531 B2
(45) Date of Patent: Jul. 4, 2017

(54) SWITCHABLE OPTICAL AMPLIFIER AND OPTICAL TRANSMISSION APPARATUS

(71) Applicant: FUJITSU LIMITED, Kawasaki-shi, Kanagawa (JP)

(72) Inventors: Norifumi Shukunami, Yokohama (JP); Yoshito Kachita, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/949,059

(22) Filed: Nov. 23, 2015

(65) Prior Publication Data
US 2016/0192043 A1    Jun. 30, 2016

(30) Foreign Application Priority Data

Dec. 25, 2014  (JP) .................... 2014-262332

(51) Int. Cl.
| | |
|---|---|
| H04J 14/00 | (2006.01) |
| H04Q 11/00 | (2006.01) |
| G02B 6/35 | (2006.01) |
| H01S 3/067 | (2006.01) |
| H01S 3/16 | (2006.01) |

(Continued)

(52) U.S. Cl.
CPC ......... *H04Q 11/0005* (2013.01); *G02B 6/353* (2013.01); *H01S 3/06758* (2013.01); *H01S 3/1003* (2013.01); *H01S 3/0064* (2013.01); *H01S 3/10015* (2013.01); *H01S 3/1301* (2013.01); *H01S 3/1608* (2013.01); *H01S 2301/04* (2013.01); *H04Q 2011/0013* (2013.01)

(58) Field of Classification Search
CPC .. H04J 14/0204; H04J 14/083; H04J 14/0212; H04Q 11/0005; H04Q 2011/0013; G02B 6/353; G02B 6/35; H01S 3/06758; H01S 3/06754; H01S 3/1003; H01S 3/0064; H01S 3/10015; H01S 3/1301; H01S 3/1608; H01S 2301/04; H04B 10/291; H04B 10/2935; H04B 10/294
USPC .............. 398/45, 50, 51, 54, 160; 359/333
See application file for complete search history.

(56) References Cited

U.S. PATENT DOCUMENTS

| | | | | |
|---|---|---|---|---|
| 5,165,077 A | * | 11/1992 | Rokugawa | ............ H04J 14/083 |
| | | | | 398/101 |
| 5,438,444 A | * | 8/1995 | Tayonaka | ................ H04J 14/02 |
| | | | | 385/24 |

(Continued)

FOREIGN PATENT DOCUMENTS

| | | |
|---|---|---|
| JP | 03-103838 | 4/1991 |
| JP | 05-218974 | 8/1993 |

*Primary Examiner* — Hibret Woldekidan
(74) *Attorney, Agent, or Firm* — Staas & Halsey LLP

(57) ABSTRACT

A switchable optical amplifier includes: a first optical amplifier; a second optical amplifier; and an optical switch which includes first and second input ports and first and second output ports, the optical switch that switches between a first connection state where the first input port and the first output port are in an optical connection and the second input port and the second output port are in a no optical connection and a second connection state where the first input port and the second output port are in an optical connection and the second input port and the first output port are in an optical connection, wherein an output of the first optical amplifier is optically coupled to the first input port of the optical switch, an input of the second optical amplifier is optically coupled to the second output port of the optical switch.

6 Claims, 40 Drawing Sheets

(51) Int. Cl.
*H01S 3/10* (2006.01)
*H01S 3/13* (2006.01)
*H01S 3/00* (2006.01)

(56) References Cited

U.S. PATENT DOCUMENTS

| | | | | |
|---|---|---|---|---|
| 6,535,331 | B2* | 3/2003 | Shiota | H04B 10/2935 |
| | | | | 359/333 |
| 6,671,085 | B2* | 12/2003 | So | H01S 3/06754 |
| | | | | 359/337.1 |
| 7,522,839 | B2* | 4/2009 | Onaka | H04J 14/0212 |
| | | | | 398/38 |
| 7,650,072 | B2* | 1/2010 | Onaka | H04J 14/0212 |
| | | | | 398/147 |
| 7,777,940 | B1* | 8/2010 | Delfyett | H01S 3/06754 |
| | | | | 359/333 |
| 8,873,135 | B2* | 10/2014 | Sridhar | H04B 10/2916 |
| | | | | 359/334 |
| 2007/0165298 | A1* | 7/2007 | Seki | H01S 3/06758 |
| | | | | 359/337.4 |
| 2010/0315702 | A1* | 12/2010 | Itoh | H04B 10/294 |
| | | | | 359/341.33 |
| 2011/0085231 | A1* | 4/2011 | Bolshtyansky | H01S 3/06754 |
| | | | | 359/341.33 |
| 2011/0116159 | A1* | 5/2011 | Wysocki | H01S 3/06758 |
| | | | | 359/337.1 |
| 2012/0183294 | A1* | 7/2012 | Boertjes | H04J 14/0204 |
| | | | | 398/49 |

* cited by examiner

IN – OUT 1  CONNECTION STATE

IN-OUT2 CONNECTION STATE

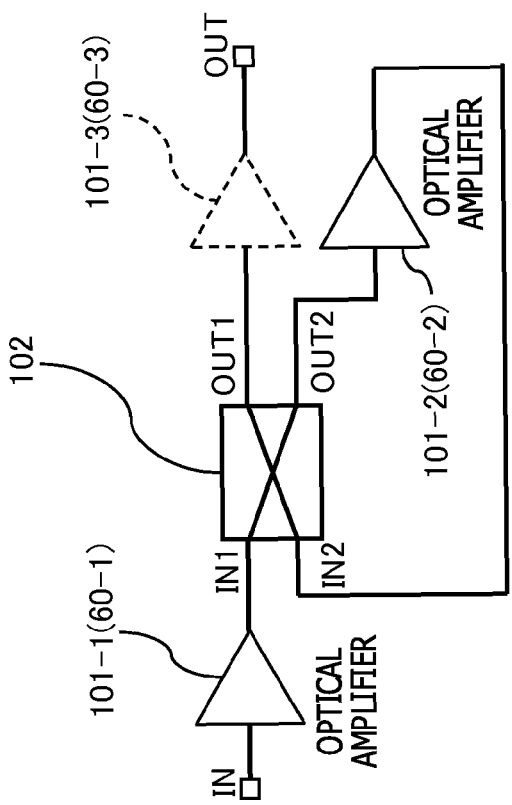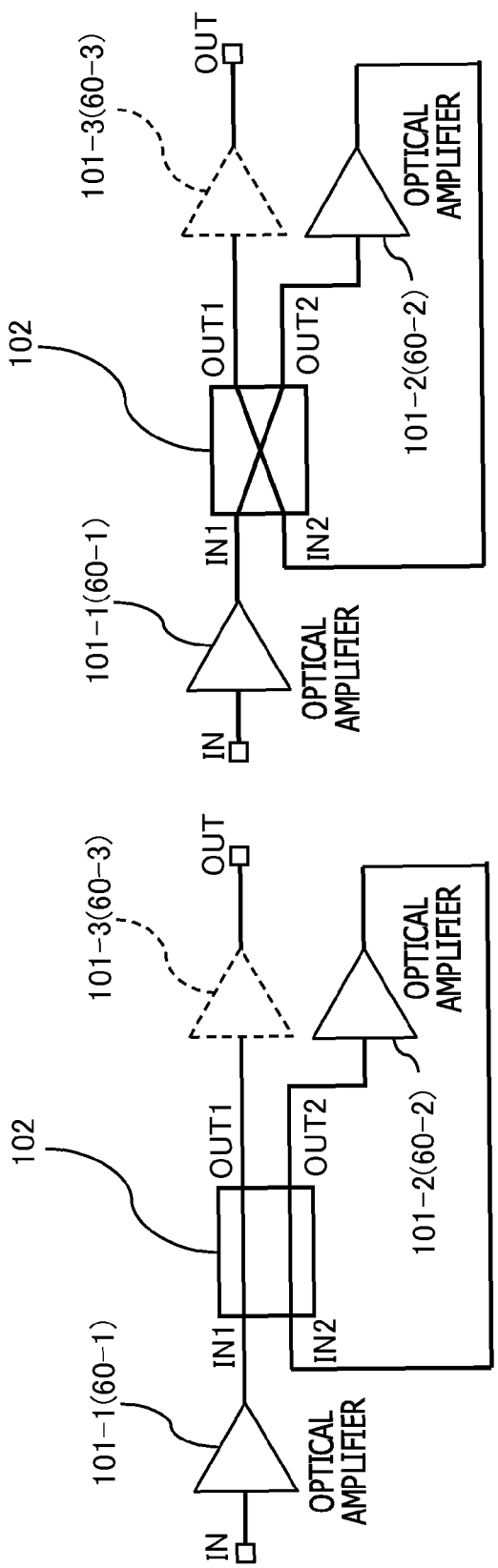

FIRST CONNECTION STATE (BAR CONNECTION STATE)

SECOND CONNECTION STATE (CROSS CONNECTION STATE)

SWITCHABLE OPTICAL AMPLIFIER AND OPTICAL TRANSMISSION APPARATUS

CROSS-REFERENCE TO RELATED APPLICATION

This application is based upon and claims the benefit of priority of the prior Japanese Patent Application No. 2014-262332, filed on Dec. 25, 2014, the entire contents of which are incorporated herein by reference.

FIELD

The embodiments discussed herein are related to a switchable optical amplifier and an optical transmission apparatus.

BACKGROUND

In the field of optical communication technologies, an optical amplifier is used to extend a transmission distance of signal light. An example of the optical amplifier may include a rare earth-added optical fiber amplifier using a rare earth-added optical fiber for an optical amplification medium.

An example of the rare earth-added optical fiber may include erbium-doped optical fiber (EDF) produced by adding (doping) erbium ions, which are one example of rare earth ion, in an optical fiber core. An optical amplifier using EDF for an optical amplification medium is called EDFA. EDFA is being widely used to collectively amplify, for example, WDM (Wavelength Division Multiplexing) light obtained by wavelength division-multiplexing of the light with a plurality of wavelengths.

As another example of the optical amplifier, a semiconductor optical amplifier (SOA), a Raman optical amplifier using a distributed Raman scattering effect and the like have been known.

In some cases, the optical amplifier may prepare, for example, a plurality of configurations having different gains supported depending on a transmission distance of signal light (referred to as an "amplifier menu"). However, it may not be said that preparing different amplifier menus for different transmission distances is desirable in terms of maintenance, management and costs.

Therefore, there is a need to reduce the number of amplifier menus as much as possible. For example, an optical amplifier configuration capable of constitutively changing (or switching) a range of gain supported by one optical amplifier is contemplated.

The followings are reference documents.
[Document 1] Japanese Laid-open Patent Publication No. 03-103838 and
[Document 2] Japanese Laid-open Patent Publication No. 05-218974.

SUMMARY

According to an aspect of the invention, a switchable optical amplifier includes: a first optical amplifier; a second optical amplifier; and an optical switch which includes first and second input ports and first and second output ports, the optical switch that switches between a first connection state where the first input port and the first output port are in an optical connection and the second input port and the second output port are in a no optical connection and a second connection state where the first input port and the second output port are in an optical connection and the second input port and the first output port are in an optical connection, wherein an output of the first optical amplifier is optically coupled to the first input port of the optical switch, an input of the second optical amplifier is optically coupled to the second output port of the optical switch, and an output of the second optical amplifier is optically coupled to the second input port of the optical switch.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 9A is a block diagram illustrating a configuration of an optical amplifier using a cross/bar type 2×2 optical switch, where the 2×2 optical switch is in a bar connection state;

FIG. 9B is a block diagram illustrating a configuration of an optical amplifier using a cross/bar type 2×2 optical switch, where the 2×2 optical switch is in a cross connection state;

DESCRIPTION OF EMBODIMENTS

Figure 1:
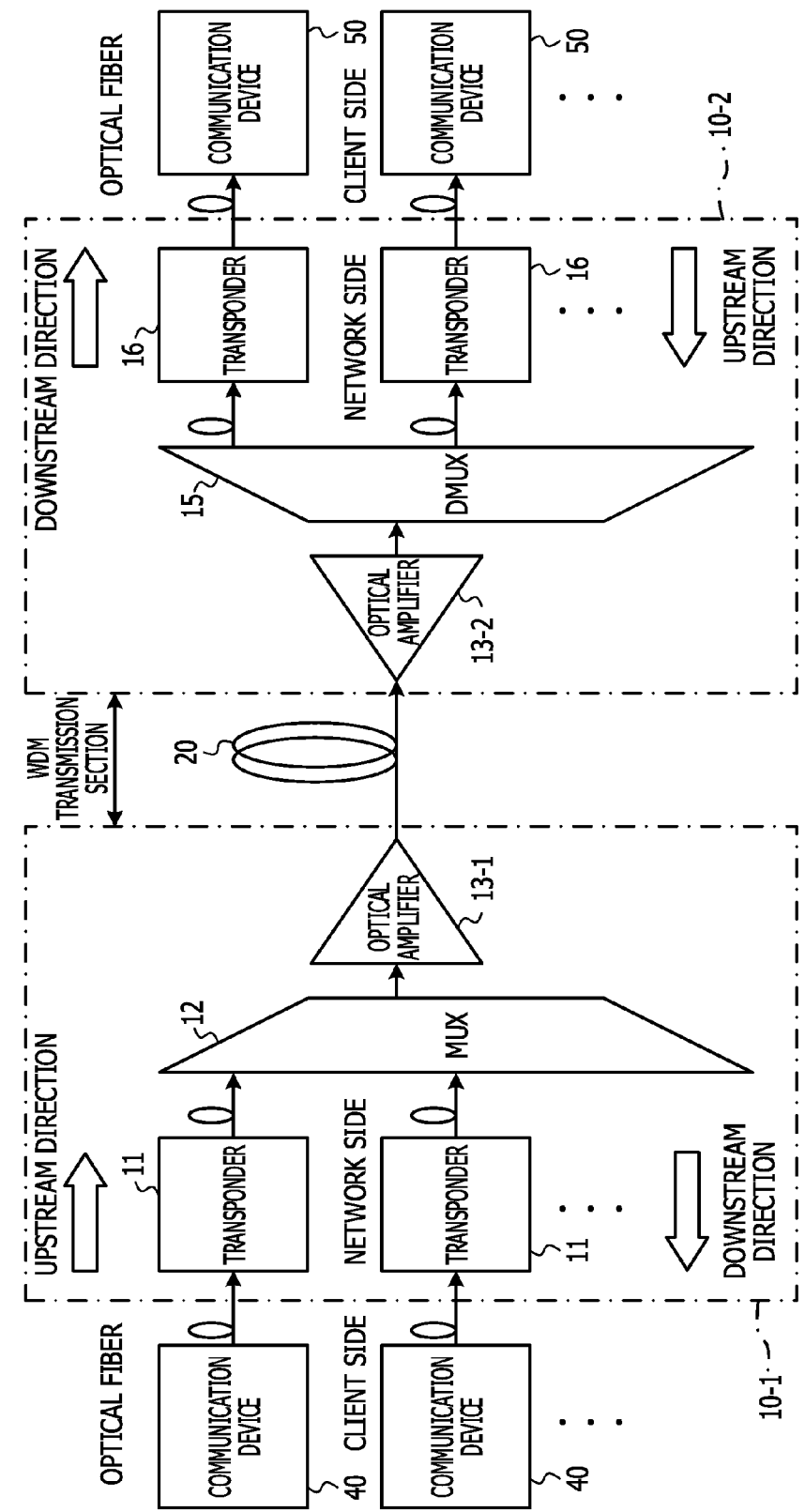
FIG. 1 is a block diagram illustrating a configuration example of a WDM optical network as one example of an optical transmission system.

Hereinafter, embodiments of the present disclosure will be described with reference to the drawings. However, the following embodiments are merely illustrative and are not intended to exclude application of other modifications and techniques which are not specified in the following description. In addition, various illustrative aspects described in the following description may be practiced in proper combination. Throughout the drawings used to explain the following embodiments, the same or similar elements or portions are denoted by the same reference numerals unless otherwise stated.

One Embodiment

FIG. 1 is a block diagram illustrating a configuration example of a WDM optical network as one example of an optical transmission system. As illustrated in FIG. 1, the WDM optical network 1 includes, for example, an optical transmitter 10-1 and an optical transmitter 10-2 connected in optical communication with the optical transmitter 10-1 via an optical transmission line 20. The optical transmission line 20 is, for example, an optical fiber transmission line.

The optical transmitters 10-1 and 10-2 may be sometimes simply referred to as an "optical transmitter 10" if they are not distinguished from each other. The optical transmitter 10 is one example of an element (network element (NE)) of the WDM optical network 1. A "wavelength" multiplexed with WDM light transmitted on the optical transmission line 20 is called "channel." A transmission route of light transmitted on the "channel" is called "wavelength path" or simply "path."

The NE 10 corresponds to an optical transmitting station, an optical receiving station or an optical relaying station and also corresponds to Optical Add-Drop Multiplexer (OADM) having a wavelength-based optical add-drop function. The OADM may be replaced with Reconfigurable OADM (ROADM) which may freely change a degree of wavelength path. Meanwhile, the term "station" used herein is also called "node."

As illustrated in FIG. 1, the first node 10-1 includes a plurality of transponders 11, a wavelength multiplexer (MUX) 12 and an optical amplifier 13-1.

The transponders 11 are connected to respective communication devices 40 such as, for example, routers by optical fibers. The communication devices 40 are, for example, communication devices 40 at a client side (also called "tributary side"). Signals transmitted from the communication devices 40 are received in the respective corresponding transponders 11 and each is converted to an optical signal having any wavelength which is then input to the multiplexer 12.

An optical fiber is used for connection between each transponder 11 and the multiplexer 12. In other words, each transponder 11 and the multiplexer 12 may be optically interconnected in optical communication.

The multiplexer 12 may be a multiplexing coupler such as a WDM coupler, or a wavelength selective switch (WSS), which generates WDM light by wavelength-multiplexing of the light received from the transponder 11 and transmits the multiplexed light onto the optical transmission line 20.

The WDM light is amplified into predetermined transmitting light power by the optical amplifier 13-1 provided at the subsequent stage (post-stage) of the multiplexer 12. The optical amplifier 13-1 is called a "post-amplifier 13-1" or a "transmitting amplifier 13-1."

The WDM light signal transmitted onto the optical transmission line 20 is received in the second node 10-2. For example, the second node 10-2 includes a wavelength de-multiplexer (DMUX) 15 and a plurality of transponders 16.

An optical amplifier 13-2 for amplifying the WDM optical signal received from the optical transmission line 20 is provided in a previous stage (pre-stage) of the DMUX 15. The optical amplifier 13-2 is called a "pre-amplifier 13-2" or a "receiving amplifier 13-2."

The DMUX 15 de-multiplexes the WDM light amplified in the pre-amplifier 13-2 for each wavelength and inputs the de-multiplexed WDM light to any of the transponders 16. The DMUX 15 may be a de-multiplexing coupler such as a WDM coupler, or WSS. If the transponders 16 support coherent reception, the de-multiplexer 15 may be alternatively an optical splitter for splitting the received WDM light.

The transponders 16 conducts a photoelectric conversion converting the light input from the DMUX 15 into electrical signals which are then transmitted to, for example, respective communication devices 50 such as routers. The communication devices 50 are, for example, communication devices 50 at a client side.

In the meantime, although the configuration focusing on the communication directing from the first node 10-1 toward the second node 10-2 is illustrated in FIG. 1, this configuration may be also applied to the reverse communication. In other words, a bidirectional communication may be conducted between the first node 10-1 and the second node 10-2, i.e., between the communication devices 40 and the communication devices 50.

The bidirectional communication is conducted between the first node 10-1 and the second node 10-2 via the optical transmission line 20 individually provided for each of the two directions. For example, in FIG. 1, the reverse communication from the second 10-2 to the first node 10-1 is achieved by a configuration where the first node 10-1 is read as the second node 10-2 and vice versa.

Of the two directions, a direction in which the node 10-1 (or the node 10-2) transmits the WDM optical signal onto the optical transmission line 20 is called an "upstream direction" and the reverse direction is called a "downstream direction."

Accordingly, each of the first and second nodes 10-1 and 10-2 includes a transmission system corresponding to the upstream direction and a reception system corresponding to the downstream system.

For example, in FIG. 1, the transponders 11 and the multiplexer 12 correspond to the transmission system of the first node 10-1 and the de-multiplexer 15 and the transponders 16 correspond to the reception system of the second node 10-2.

In other words, although not illustrated in FIG. 1, the first node 10-1 includes the de-multiplexer 15 and the transponders 16, as the reception system, like the reception system of the second node 10-2.

In addition, although not illustrated in FIG. 1, the second node 10-2 includes the transponders 11 and the multiplexer 12, as the transmission system, like the transmission system of the first node 10-1.

Here, the transponders 11 or 16 are used in common for transmission/reception. In other words, the transponders 11 and 16 have the same configuration (transmission part and reception part).

The above-mentioned optical amplifiers 13-1 and 13-2 (sometimes simply referred to as an "optical amplifier 13" if they are not distinguished from each other) are used for a loss compensation of the optical transmission line 20 and a loss compensation of optical parts used in the optical transmitter 10.

EDFA (Erbium-Doped Fiber Amplifier) is used for the optical amplifier 13. EDFA is an optical amplifier using EDF, which is one example of a rare earth-added fiber, for an optical amplification medium.

Illustratively, EDFA is able to amplify light in a band of 1525 nm to 1565 nm, which is called "C band" and a band of 1570 nm to 1610 nm, which is called "L band." By utilizing such broadband amplification characteristics of EDFA, the optical transmitter 10 capable of transmitting the WDM light obtained by wavelength-multiplexing of the light having, for example, 80 or more wavelengths is put in practical use.

Alternatively, the optical amplification medium may employ thulium doped fiber (TDF) obtained by doping an optical fiber core with thulium ions, praseodymium doped fiber (PDF) obtained by doping an optical fiber core with praseodymium ions, or the like. As another example of the optical amplifier 13, a semiconductor optical amplifier (SOA) and a Raman optical amplifier are put in practical use.

One or both of the EDFAs 13-1 and 13-2 are used for a loss compensation of the optical transmission line 20. The EDFA 13 may compensate for a loss of the WDM light transmitted onto the optical transmission line 20 by varying its gain. In other words, the EDFA 13 is one example of a variable gain amplifier.

Figure 2:
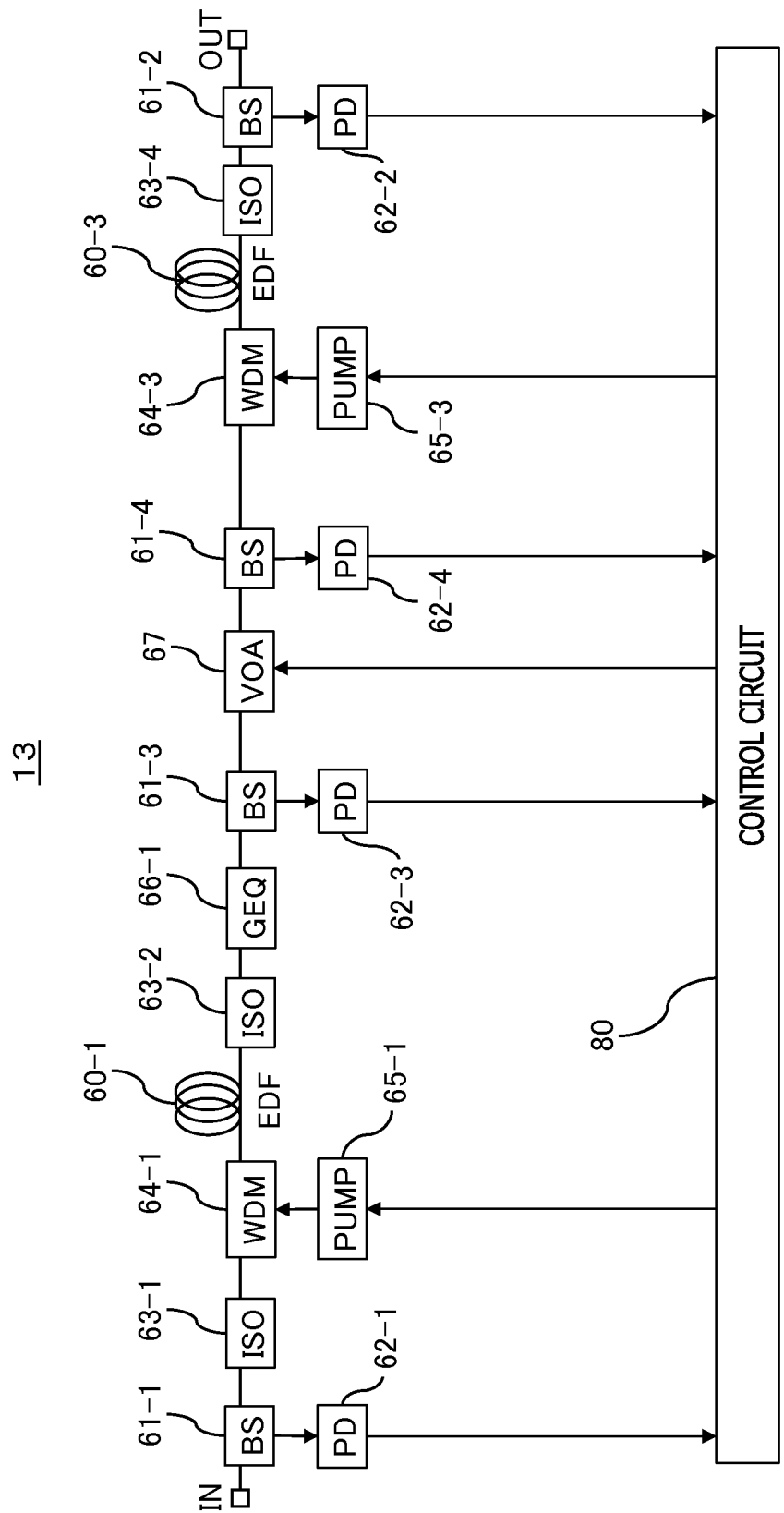
FIG. 2 is a block diagram illustrating a configuration example of a variable gain erbium-doped optical fiber amplifier (EDFA)

FIG. 2 illustrates a configuration example of the variable gain EDFA 13. As illustrated in FIG. 2, the EDFA 13 includes, for example, EDFs 60-1 and 60-3, which are one example of the optical amplification medium, and a control circuit 80.

As illustrated in FIG. 2, the EDFs 60-1 and 60-3 are connected in series and each of which amplifies input WDM light and outputs the amplified light.

The control circuit 80 controls gains of the EDFs 60-1 and 60-3 individually such that the sum of gains of the EDFs 60-1 and 60-3 is constant in order to compensate for wavelength characteristics of overall gain (gain tilt) of the EDFA 13.

Illustratively, the gain of one (front) EDF 60-1 may be controlled by controlling power of excited light input to the EDF 60-1. Similarly, the gain of the other (rear) EDF 60-3 may be controlled by controlling power of excited light input to the EDF 60-3.

The excited (or pumped) light for the EDF 60-1 is generated by, for example, an excitation light source 65-1 and the excited light for the EDF 60-3 is generated by, for example, an excitation light source 65-3. A semiconductor laser diode (LD) is used for each of the excitation light sources 65-1 and 65-3. The wavelength of the excited light is selected depending on a rare earth-added optical amplification medium to be excited. Excited light of a 980 nm wavelength band and a 1480 nm wavelength band is selected for EDF.

The excited light generated in the excitation light source 65-1 is input to a WDM coupler 64-1 disposed at the pre-stage of the EDF 60-1, multiplexed with the WDM light in the WDM coupler 64-1, and then input to the EDF 60-1. The WDM coupler 64-1 is one example of a first coupler.

Similarly, the excited light generated in the excitation light source 65-3 is input to a WDM coupler 64-3 disposed at the pre-stage of the EDF 60-3, multiplexed with the WDM light in the WDM coupler 64-3, and then input to the EDF 60-3.

The control circuit 80 may control the gains of the EDFs 60-1 and 60-3 by controlling each excited light power by controlling the excitation light sources 65-1 and 65-3.

The gain of the EDF 60-1 is calculated based on input/output light power of the EDF 60-1 and the gain of the EDF 60-3 is calculated based on input/output light power of the EDF 60-3.

Illustratively, the input light power of the EDF 60-1 is detected (or monitored) by a beam splitter (BS) 61-1 and a photodetector (or photodiode) (PD) 62-1, which are disposed at the pre-stage of the EDF 60-1.

The BS 61-1 splits the input WDM light into two beams: one output toward the EDF 60-1 and the other output, as monitor light, to the PD 62-1.

The PD 62-1 outputs an electrical signal (e.g., a current signal), which corresponds to the received light power of the monitor light input from the BS 61-1, to the control circuit 80. The current signal corresponding to the received light power is converted to a voltage signal by a TIA (Trans-Impedance Amplifier) or the like. The TIA is included in the control circuit 80. This is equally applied to PDs 62-2 to 62-4 to be described later.

In the meantime, illustratively, the output light power of the EDF 60-1 is detected (or monitored) by a BS 61-3 and a PD 62-3, which are disposed at the post-stage of the EDF 60-1.

The BS 61-3 splits the input WDM light, which is amplified by the EDF 60-1, into two beams: one output toward the EDF 60-3 at the post-stage and the other output, as monitor light, to the PD 62-3.

The PD 62-3 outputs an electrical signal (e.g., a current signal), which corresponds to the received light power of the monitor light input from the BS 61-3, to the control circuit 80.

The PD 62-1 corresponds to an "input light monitor" of the EDF 60-1 and the PD 62-3 corresponds to an "output light monitor" of the EDF 60-1. An "input/output monitor" of the EDF 60-1 is formed by the PD 62-1 and the PD 62-3.

An "input/output monitor" of the EDF 60-3 at the post-stage is formed in the same manner as the "input/output monitor" of the EDF 60-1. For example, illustratively, the input light power of the EDF 60-3 is detected (or monitored) by a BS 61-4 and a PD 62-4, which are disposed at the pre-stage of the EDF 60-3.

The BS 61-4 splits the input WDM light, which is amplified by the EDF 60-1 and passes through a variable optical attenuator (VOA) 67 to be described later, into two beams: one output toward the EDF 60-3 and the other output, as monitor light, to the PD 62-4.

The PD 62-4 outputs an electrical signal (e.g., a current signal), which corresponds to the received light power of the monitor light input from the BS 61-4, to the control circuit 80.

In the meantime, illustratively, the output light power of the EDF 60-3 is detected (or monitored) by a BS 61-2 and a PD 62-2, which are disposed at the post-stage of the EDF 60-3.

The BS 61-2 splits the input WDM light, which is amplified by the EDF 60-3, into two beams: one output as output light of the EDFA 13 and the other output, as monitor light, to the PD 62-2.

The PD 62-2 outputs an electrical signal (e.g., a current signal), which corresponds to the received light power of the monitor light input from the BS 61-2, to the control circuit 80.

The PD 62-4 corresponds to an "input light monitor" of the EDF 60-3 and the PD 62-2 corresponds to an "output light monitor" of the EDF 60-3. An "input/output monitor" of the EDF 60-3 is formed by the PD 62-4 and the PD 62-2.

In addition, the PD 62-1 corresponds to an "input light monitor" of the EDFA 13 as a whole and the PD 62-2 corresponds to an "output light monitor" of the EDFA 13 as a whole. Further, an "input/output monitor" of the EDFA 13 as a whole is formed by the PD 62-1 and the PD 62-2.

In addition, an isolator (ISO) 63-1 for outputting input light in one direction is disposed at the pre-stage of the EDF 60-1 between the BS 61-1 and the WDM coupler 64-1. In addition, an ISO 63-2 and a gain equalizer (GEQ) 66-1 are disposed at the post-stage of the EDF 60-1.

The ISOs 63-1 and 63-2 disposed at the input/output side of the EDF 60-1 may prevent the EDF 60-1 from being oscillated due to returned light, thereby stabilizing the amplification operation of the EDF 60-1. In addition, the GEQ 66-1 may equalize (compensate for) a loss of the wavelength dependency of the WDM light amplified in the EDF 60-1 (in other words, gain characteristics of the wavelength dependency of the EDF 60-1). The phrase "gain characteristics of the wavelength dependency" used herein is abbreviated as "gain wavelength characteristics."

An ISO 63-4 is interposed between the EDF 60-3 and the BS 61-2. The ISO 63-4 and the ISO 63-2 disposed in the output side of the EDF 60-1 may prevent the EDF 60-3 from being oscillated due to the returned light, thereby stabilizing the amplification operation of the EDF 60-3.

The control circuit 80 may calculate the gain of the EDF 60-1 based on a result of monitoring by the PD 62-1 and the PD 62-3 and may calculate the gain of the EDF 60-3 based on a result of monitoring by the PD 62-4 and the PD 62-2.

In addition, illustratively, based on the result of monitoring by the PD 62-1 and the PD 62-2, the control circuit 80 controls the excitation light sources 65-1 and 65-3 such that the overall gain of the EDFA 13 reaches a target gain.

If a gain tilt occurs in the EDFA 13, since the transmission quality is not uniform due to different gains between wavelengths of light contained in the WDM light, the control circuit 80 controls the excitation light sources 65-1 and 65-3 such that the sum of the gains of the EDFs 60-1 and 60-3 is constant.

The overall gain of the EDFA 13 may be illustratively controlled (adjusted) by increasing/decreasing a loss of the VOA 67 (referred to as a "VOA loss") interposed between the EDF 60-1 and the EDF 60-3.

Illustratively, the VOA loss is controlled based on the result of monitoring by the PD 62-3 and the PD 62-4 as described above. In the meantime, since the noise figure (NF) of the EDFA 13 is deteriorated if the VOA loss is excessively increased, the variable amount of the VOA loss is limited to, for example, about 10 dB.

In other words, the EDFA 13 having the EDF two-stage configuration illustrated in FIG. 2 illustratively has a variable gain range of about 10 dB. If a change (variation) in a transmission line loss occurring in the WDM light received in the second node 10-2 illustrated in FIG. 1 is about 15 dB to 25 dB, the variation of the loss of the received WDM light may be compensated for by applying the EDFA 13 to the pre-amplifier 13-2.

However, if the variation of the transmission line loss has a range of, for example, 15 dB to 35 dB, which exceeds 10 dB, the EDFA 13 configured as illustrated in FIG. 2 has a variable gain range too insufficient to completely compensate for the transmission line loss variation.

Therefore, in some cases, a combination of an EDFA 13 capable of compensating for a loss variation in a range of about 15 dB to 25 dB and a higher gain EDFA 13 capable of compensating for a loss variation in a range of about 25 dB to 35 dB may be used. The former EDFA 13 is called "low gain optical amplifier 13" and the latter EDFA 13 is called "high gain optical amplifier 13."

Figure 3:
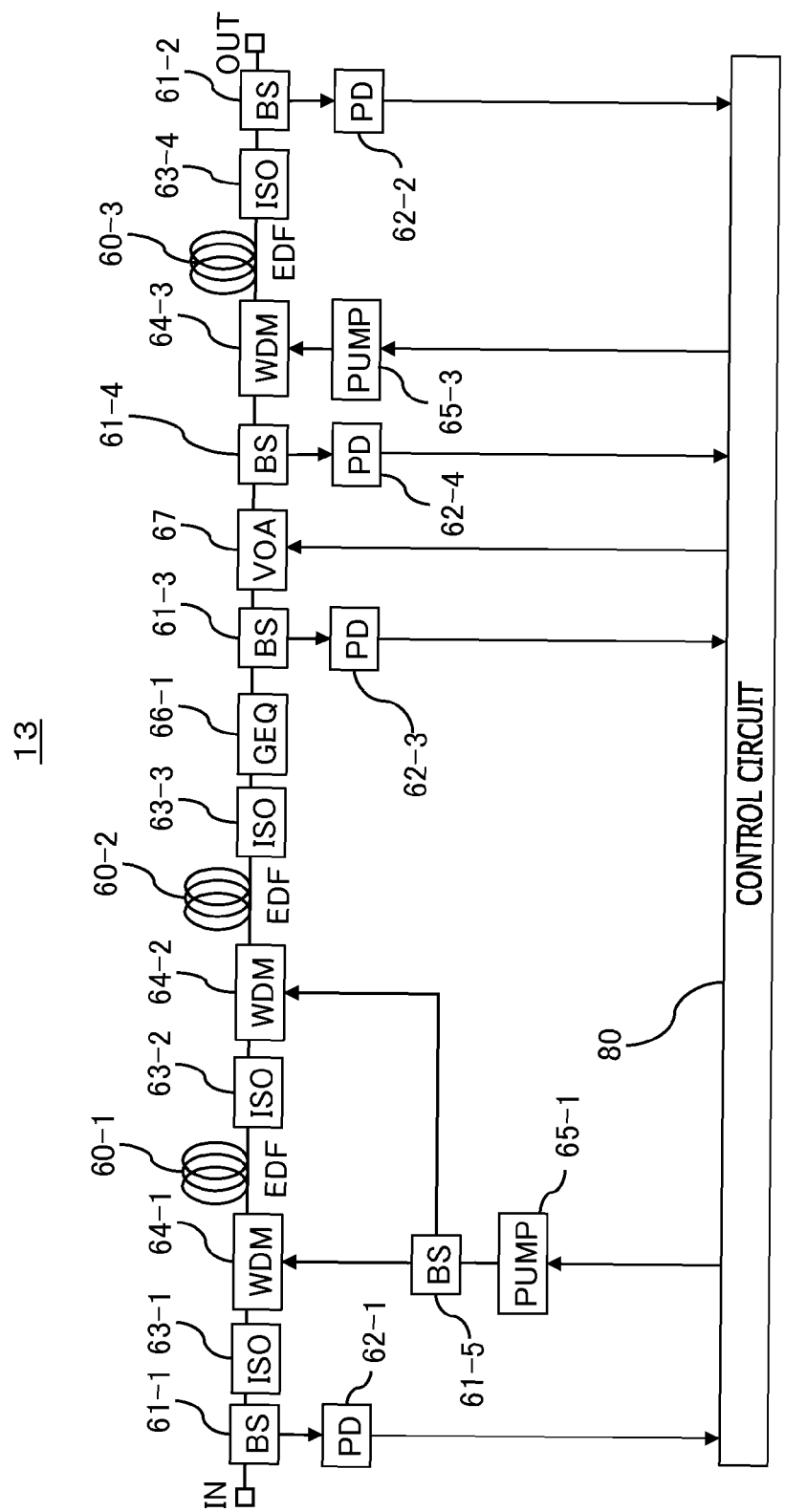
FIG. 3 is a block diagram illustrating a configuration example of a high gain optical amplifier with three stages of EDF.

Since the high gain optical amplifier 13 requires a gain higher than that of the low gain optical amplifier 13, for example, an EDF three-stage configuration may be applied to the high gain optical amplifier 13, as illustrated in FIG. 3. The high gain optical amplifier 13 illustrated in FIG. 3 is illustratively different from the configuration illustrated in FIG. 2 in that the former further includes an EDF 60-2 in addition to the EDFs 60-1 and 60-3.

The EDF 60-2 is illustratively interposed between the ISO 63-2 and GEQ 66-1 illustrated in FIG. 2. A WDM coupler 64-2 for multiplexing the excited light for the EDF 60-2 with the WDM light and emitting the multiplexed light is interposed between the EDF 60-2 and the ISO 63-2.

The excited light input to the WDM coupler 64-2 may be light excited from an excitation light source for the EDF 60-2, separated from the excitation light source 65-1 for the EDF 60-1 or may be light excited from the excitation light source 65-1 for the EDF 60-1, as illustrated in FIG. 3.

For example, the excited light of the excitation light source 65-1 is split into two beams by a bean splitter (BS) 61-5: one emitted into the EDF 60-1 by the WDM coupler 64-1 and the other emitted into the EDF 60-2 by the WDM coupler 64-2.

In other words, the excitation light source 65-1 is used in common for the EDF 60-1 and the EDF 60-2. The common use of the excitation light source 65-1 makes it possible to reduce the number of LDs required for the high gain optical amplifier 13, thereby achieving a reduced cost of the high gain optical amplifier 13.

In the meantime, an isolator (ISO) 63-3 is disposed at the post-stage of the EDF 60-2, for example, between the EDF 60-2 and the GEQ 66-1. The ISOs 63-2 and 63-3 located at the pre-stage of and at the post-stage of the EDF 60-2 may prevent the EDF 60-2 from being oscillated due to returned light.

Figure 4:
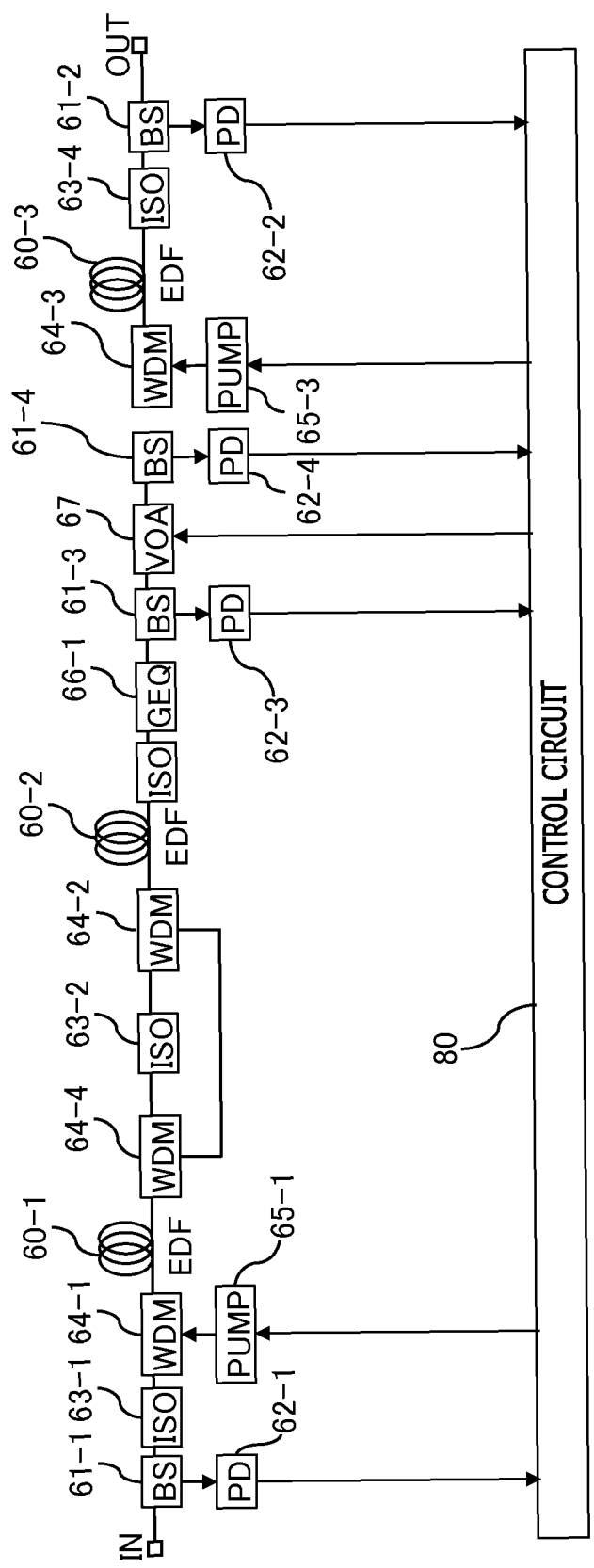
FIG. 4 is a block diagram illustrating a modification of the high gain optical amplifier illustrated in FIG. 3.

As another configuration of using the excited light in common for the plurality of EDFs, it may be contemplated that excited light leaked from the EDF 60-1 without being exhausted for the amplification in the EDF 60-1 is reused as excited light in the subsequent EDF 60-2, as illustrated in FIG. 4.

For example, as illustrated in FIG. 4, a WDM coupler 64-4 for decoupling the excited light from the WDM light is disposed at the post-stage of the EDF 60-1 and the excited light leaked from the EDF 60-1 bypasses the ISO 63-2 and is input to the WDM coupler 64-2.

The WDM coupler 64-4 is one example of a second coupler for extracting an excited light component remaining in the output light of the EDF 60-1. The WDM coupler 64-2 is one example of a third coupler for emitting the excited light component extracted by the WDM coupler 64-4 into the EDF 60-2.

In any of the configurations illustrated in FIGS. 3 and 4, illustratively, based on the result of monitoring by the PDs 62-1 to 62-4, the control circuit 80 controls the excitation light sources 65-1 and 65-3 such that the sum of gains of the EDFs 60-1 to 60-3 is constant.

In the following description, in some cases, the EDFs 60-1 to 60-3 are simply abbreviated as an "EDF 60" if they are not distinguished from each other. If a higher gain is required for the high gain optical amplifier 13, the EDF 60 may be connected in multiple stages with four or more stages.

As described above, the EDFA 13 may have different configurations (called "amplifier menus") prepared for required (different) gains. However, for example, from the viewpoint of maintenance and management of the optical transmitter 10, it is desirable that the number of amplifier menus is as small as possible.

As one example of the configuration of realizing different amplifier menus with one optical amplifier, it may be contemplated that two optical amplifiers having different gains to be supported are connected in parallel between a 1×2 optical switch and a 2×1 optical switch. For example, by switching between the two optical switches according to a transmission line loss, received light is selectively input to the optical amplifier in accordance with the transmission line loss.

Figure 5A:
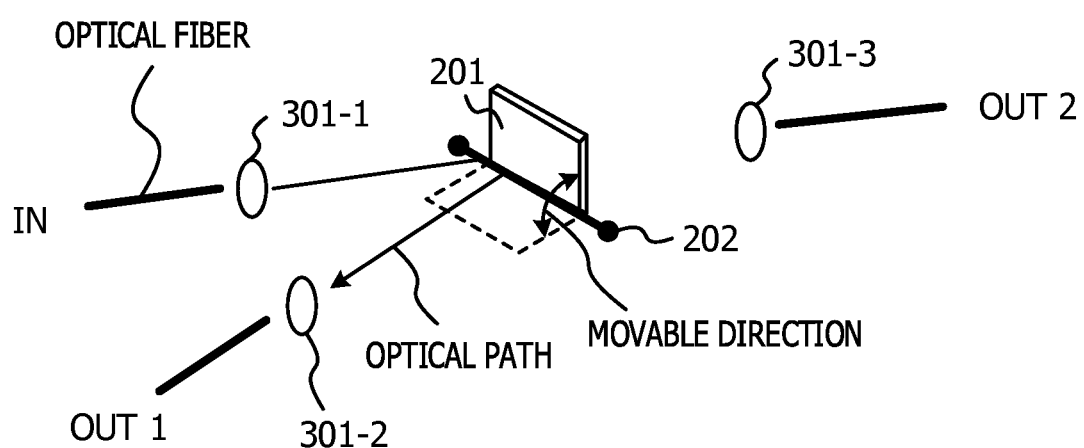
FIGS. 5A and 5B are views illustrating one example of optical configuration and connection state of a 1×2 optical switch, respectively.

FIG. 5 illustrates one example of optical configuration and connection state of a 1×2 optical switch. The 1×2 optical switch is configured by a movable mirror 201, as illustrated in FIGS. 5A and 6A.

Figure 6A:
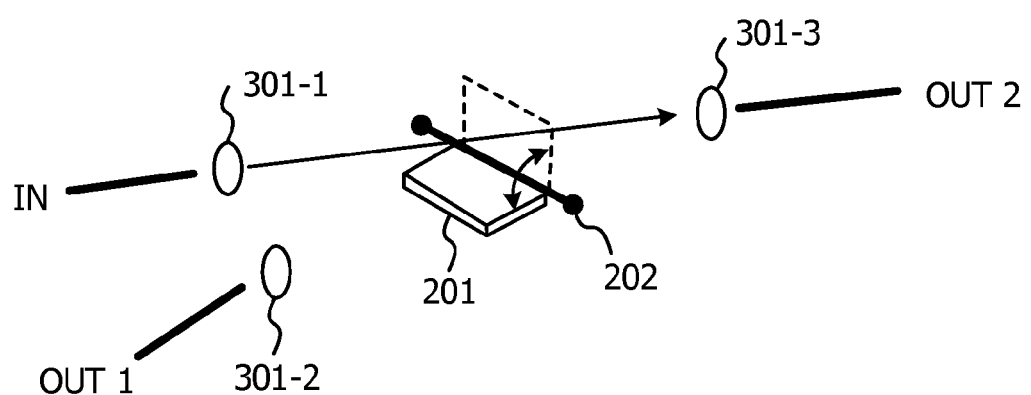
FIGS. 6A and 6B are views illustrating one example of optical configuration and connection state of a 1×2 optical switch, respectively.

Illustratively, the movable mirror 201 may be rotated about a movable axis 202 between "first position" illustrated in FIG. 5A and "second position" illustrated in FIG. 6A. The movable mirror 201 is an MEMS (Micro Electro Mechanical System) mirror employing the MEMS technology.

Illustratively, the movable mirror 201 is disposed on an optical path between an input port IN and an output port OUT2. An output port OUT1 is placed in the direction in which light incident from the input port IN is reflected by the movable mirror 201 when the movable mirror 201 is disposed in the "first position."

The term "port" used herein corresponds to an "optical fiber" (hereinafter the same). First to third lenses 301-1 to 301-3 are respectively provided for the input port IN, the output port OUT1 and the output port OUT2.

The first lens 301-1 condenses the light incident from the input port IN and outputs the condensed light toward the movable mirror 201.

When the movable mirror 201 is disposed in the "first position" as illustrated in FIG. 5A, the second lens 301-2 condenses the light reflected by the movable mirror 201 and inputs the condensed light to the output port OUT1 (which is called "coupling").

When the movable mirror 201 is disposed in the "second position" as illustrated in FIG. 6A, the third lens 301-3 condenses the light incident from the first lens 301-1 corresponding to the input port IN and inputs the condensed light to the output port OUT2.

The "first position" is a position at which the light input to the input port IN is reflected toward the output port OUT1, as illustrated in FIG. 5A. The "second position" is a position at which the light input to the input port IN is allowed to pass toward the output port OUT2 without being reflected, as illustrated in FIG. 6A. In other words, the "second position" is a position which does not interfere with the optical path between the input port IN and the output port OUT2.

Therefore, by controlling the switching of the position of the movable mirror between the "first position" and the "second position," the light input to the input port IN may be selectively output to any of the output ports OUT1 and OUT2.

For example, when the movable mirror 201 is controlled to be in the "first position" as illustrated in FIG. 5A, the light output from the input port IN is condensed by the first lens 301-1 and is then reflected by the movable mirror 201. The reflected light is condensed and coupled in the output port OUT1 by the second lens 301-2 corresponding to the output port OUT1.

Figure 5B:
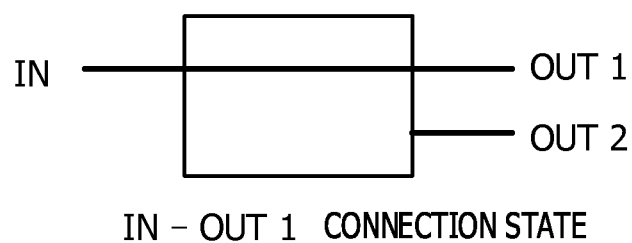

In other words, that the movable mirror 201 is controlled to be in the "first position" corresponds to a state where the input port IN and the output port OUT1 are in optical connection, as illustrated in FIG. 5B.

In the meantime, when the movable mirror 201 is controlled to be in the "second position" as illustrated in FIG. 6A, the light output from the input port IN is condensed by the first lens 301-1 and then propagates toward the output port OUT2 without being reflected by the movable mirror 201. This light is incident into the third lens 301-3 corresponding to the output port OUT2 and is condensed and coupled in the output port OUT2.

Figure 6B:
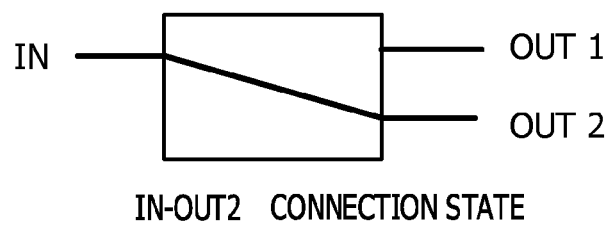

In other words, that the movable mirror 201 is controlled to be in the "second position" corresponds to a state where the input port IN and the output port OUT2 are in optical connection, as illustrated in FIG. 6B.

In the meantime, it may be considered that the 2×1 optical switch is achieved in a configuration where the input port IN of the above-described 1×2 optical switch is read as "output port" and the two output ports thereof are read as "input ports."

From the viewpoint of costs of the optical transmitter 10 and mounting of the optical switch on the optical transmitter 10, it is desirable that the number of optical switches is as small as possible. It may be, therefore, contemplated that one optical switch is used to switch the number of optical amplifiers into which received light is emitted.

For example, a 2×2 optical switch may be used to switch between two connection states: "bar connection" and "cross connection."

The "bar connection" refers to a state where among first and second input ports and first and second output ports of the 2×2 optical switch, the first input port and the first output port are interconnected and the second input port and the second output port are interconnected. The "cross connection" refers to a state where the first input port and the second output port are interconnected and the second input port and the first output port are interconnected.

When an input of an optical amplifier is connected to the second output port of the 2×2 optical switch and an output of the optical amplifier is connected to the second input port of the 2×2 optical switch, in the "bar connection" state, light input to the first input port bypasses the optical amplifier and is output to the first output port.

In the meantime, when the 2×2 optical switch is in the "cross connection" state, the light input to the first input port is input through the second output port to the optical amplifier and is amplified therein. The amplified light is input to the second input port of the 2×2 optical switch and is output from the first output port.

In this way, the 2×2 optical switch may be used to switch between "passing the input light through the optical amplifier without being emitted to the optical amplifier" (the "bar connection" state) and "emitting and amplifying the input light in the optical amplifier" (the "cross connection" state).

The 2×2 optical switch capable of switching "cross connection" and "bar connection" is called a "cross/bar type 2×2 optical switch." FIGS. 7 and 8 illustrate one example of the optical configuration and connection state of the "cross/bar type 2×2 optical switch."

Figure 7A:
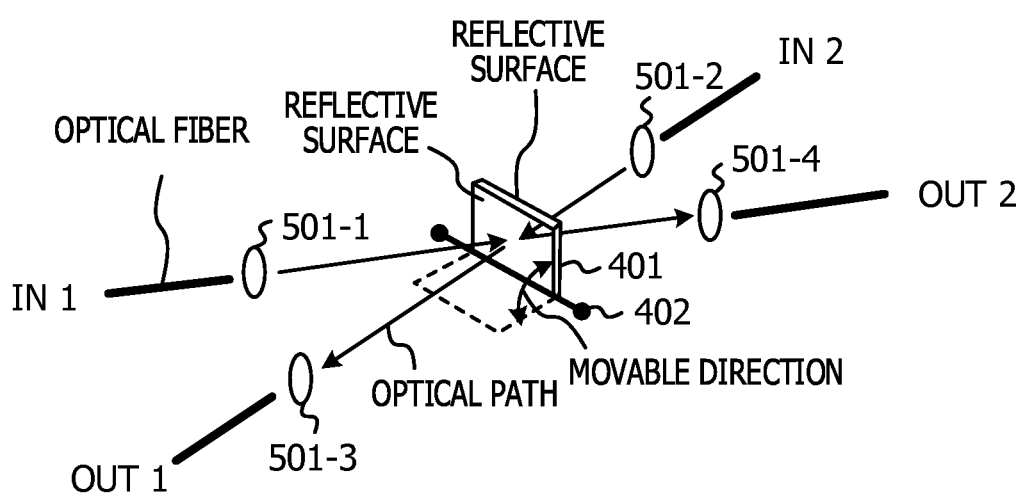
FIGS. 7A and 7B are schematic views illustrating one example of optical configuration and connection state (bar connection state) of a cross/bar type 2×2 optical switch, respectively.
Figure 8A:
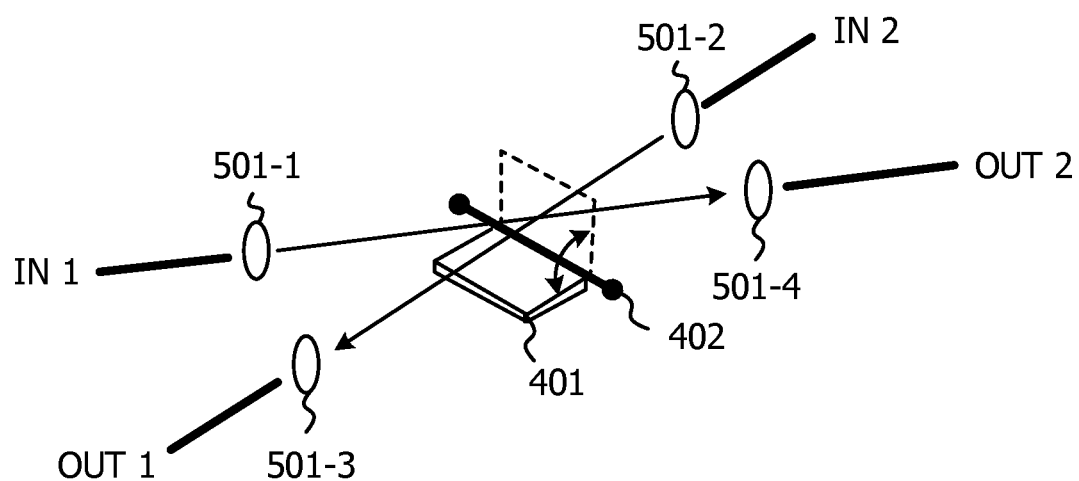
FIGS. 8A and 8B are schematic views illustrating one example of optical configuration and connection state (cross connection state) of a cross/bar type 2×2 optical switch, respectively.

The "cross/bar type 2×2 optical switch" is configured by a movable mirror 401, as illustrated in FIGS. 7A and 8A.

Similarly to the movable mirror 201 illustrated in FIGS. 5A and 6A, the movable mirror 401 may be rotated about, for example, a movable axis 402 between a "first position" illustrated in FIG. 7A and a "second position" illustrated in FIG. 8A.

However, the movable mirror 401 illustrated in FIGS. 7A and 8A is a double-sided mirror. Illustratively, the double-sided mirror 401 is disposed at an intersection of an optical path between an input port IN1 and an output port OUT2 and an optical path between an input port IN2 and an output port OUT1.

First to fourth lenses 501-1 to 501-4 are respectively provided for the input ports IN1 and IN2 and the output ports OUT1 and OUT2.

The first lens 501-1 condenses light incident from the first input port IN1 and outputs the condensed light toward one (first) reflective surface of the double-sided mirror 401.

The second lens 501-2 condenses light incident from the second input port IN2 and outputs the condensed light toward the other (opposite) reflective surface (second reflective surface) of the double-sided mirror 401.

The third lens 501-3 condenses light reflected by the first reflective surface of the double-sided mirror 401 or output light of the second input port IN2 which passes through the double-sided mirror 401 without being reflected by the double-sided mirror 401, and inputs the condensed light to the first output port OUT1.

The fourth lens 501-4 condenses light reflected by the second reflective surface of the double-sided mirror 401 or output light of the first input port IN1 which passes through the double-sided mirror 401 without being reflected by the double-sided mirror 401, and inputs the condensed light to the second output port OUT2.

The "first position" of the double-sided mirror 401 is a position at which the light input to the input port IN1 is reflected by the first reflective surface of the double-sided mirror 401 toward the output port OUT1, as illustrated in FIG. 7A. The "first position" is also a position at which the light input to the input port IN2 is reflected by the second reflective surface which is an opposite surface of the double-sided mirror 401 toward the output port OUT2.

The "second position" is a position at which both of the lights input to the input ports IN1 and IN2 are passed to the output ports OUT1 and OUT2, respectively, without being reflected, as illustrated in FIG. 8A.

In other words, the "second position" is a position which does not interfere with any of an optical path between the input port IN1 and the output port OUT2 and an optical path between the input port IN2 and the output port OUT1.

Therefore, by controlling the switching of the position of the movable mirror (double-sided mirror) 401 between the "first position" and the "second position," states of optical connection between the input ports IN1 and IN2 and the output ports OUT1 and OUT2 may be switched.

For example, when the double-sided mirror 401 is controlled to be in the "first position" as illustrated in FIG. 7A, the light input to the first input port IN1 is condensed by the first lens 501-1 and is then reflected by the first reflective surface of the double-sided mirror 401 in the "first position." The reflected light is condensed and coupled in the first output port OUT1 by the third lens 501-3 corresponding to the first output port OUT1.

In addition, when the double-sided mirror 401 is disposed in the "first position," the light input to the second input port IN2 is condensed by the corresponding second lens 501-2 and is then reflected by the second (opposite) reflective surface of the double-sided mirror 401. The reflected light is condensed and coupled in the second output port OUT2 by the fourth lens 501-4 corresponding to the second output port OUT2.

Figure 7B:

In other words, that the movable mirror 401 is controlled to be in the "first position" corresponds to a "bar connection" state as illustrated in FIG. 7B. That is, this refers to a state where the first input port IN1 and the first output port OUT1 are in optical connection and the second input port IN2 and the second output port OUT2 are in optical connection.

In the meantime, when the double-sided mirror 401 is controlled to be in the "second position" as illustrated in FIG. 8A, the double-sided mirror 401 is in a state where it reflects none of the output lights of the input ports IN1 and IN2 (in other words, does not interfere with any optical path).

Therefore, the light input to the first input port IN1 is condensed by the corresponding first lens 501-1, and subsequently is incident into the fourth lens 501-4 which is disposed in the condensation direction and corresponds to the second output port OUT2. The light is then condensed and coupled in the second output port OUT2.

In addition, the light input to the second input port IN2 is condensed by the lens corresponding to the second input port IN2, is incident into the third lens 501-3 which is disposed in the condensation direction and corresponds to the first output port OUT1, and is condensed and coupled in the first output port OUT1.

Figure 8B:
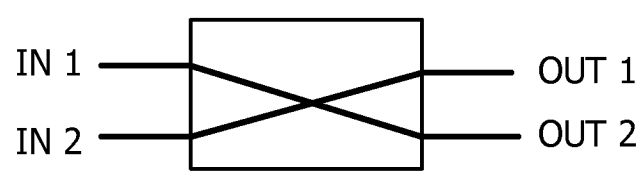

In other words, that the movable mirror 401 is controlled to be in the "second position" corresponds to a "cross connection" state as illustrated in FIG. 8B. That is, this refers to a state where the first input port IN1 and the second output port OUT2 are in optical connection and the second input port IN2 and the first output port OUT1 are in optical connection.

FIGS. 9A and 9B illustrate a configuration example where the above-described "cross/bar type 2×2 optical switch is used to switch between use and un-use of an optical amplifier (e.g., EDFA).

In the configuration illustrated in FIGS. 9A and 9B, two optical amplifiers 101-1 and 101-2 are connected to a cross/bar type 2×2 optical switch 102.

For example, an output of the first optical amplifier 101-1 is connected to the first input port IN1 of the cross/bar type 2×2 optical switch 102 and an input of the second optical amplifier 101-2 is connected to the second output port OUT2 thereof. In addition, an output of the second optical amplifier 101-2 is connected to the second input port IN2 of the cross/bar type 2×2 optical switch 102.

Therefore, when the cross/bar type 2×2 optical switch 102 is controlled to be in the "bar connection" state as illustrated in FIG. 9A, the light amplified by the first optical amplifier 101-1 bypasses (i.e., passes by) the second optical amplifier 101-2 and is output from the first output port OUT1.

In contrast, when the cross/bar type 2×2 optical switch 102 is controlled to be in the "cross connection" state as illustrated in FIG. 9B, the light amplified by the first optical amplifier 101-1 is input to the second optical amplifier 101-2 through the second output port OUT2.

The light amplified by the second optical amplifier 102-2 is input (called a "feedback") to the second input port IN2 of the cross/bar type 2×2 optical switch 102 and is output from the first output port OUT1.

In this way, by switching the cross/bar type 2×2 optical switch 102 between the "bar connection" state and the "cross connection" state, switching may be made between one-stage amplification by the optical amplifier 101-1 and two-stage amplification by the optical amplifiers 101-1 and 101-2.

In addition, as indicated by dotted lines in FIGS. 9A and 9B, an input of a third optical amplifier 101-3 may be connected to the first output port OUT1 of the cross/bar type 2×2 optical switch 102.

In this case, in the "bar connection," the input light is amplified in two stages since it passes through the two optical amplifiers 101-1 and 101-3. In the other hand, in the "cross connection," the input light is amplified in three stages since it passes through the three optical amplifiers 101-1 to 101-3.

The optical amplifiers 101-1 to 101-3 corresponds to the EDFs 60-1 to 60-3, respectively, which are one example of the optical amplification medium illustrated in FIGS. 3 and 4, and also correspond to the three optical amplifiers including the EDF 60, respectively.

Here, when the cross/bar type 2×2 optical switch 102 is controlled to be in the "bar connection" state as illustrated in FIG. 9A, the input and output of the optical amplifier 101-2 are connected through the "bar connection," thereby forming an optical "closed loop circuit."

Therefore, when the optical amplifier 101-2 is driven in the "bar connection" state (in other words, when excited light is emitted to the EDF 60-2), there is a possibility that the optical amplifier 101-2 is oscillated. For example, if the output light power obtained according to the gain of the optical amplifier 101-2 exceeds an optical loss amount in the cross/bar type 2×2 optical switch 102, an oscillation occurs since the light power in the "closed loop circuit" continues to increase.

As described above with reference to FIGS. 3 and 4, in the configuration where the excited light is used in common for the plurality of EDFs 60-1 and 60-2, since the emission of the excited light may not be individually and selectively stopped, the EDF 60-2 may not be prevented from being oscillated.

For example, if the EDF 60-2 is included in the closed loop circuit in the "bar connection," the oscillation may occur in the EDF 60-2 as long as the excitation light source 65-1 used in common for the EDFs 60-1 and 60-2 is not stopped.

If the excitation light source 65-1 is stopped in order to avoid the oscillation of the EDF 60-2, the excited light to the EDF 60-1 is also stopped. Thus, in the end, the input light may not be amplified.

Therefore, in the embodiments described below, for example, an optical amplifier configuration where one optical switch may be used to perform a configuration switching between the low gain optical amplifier 13 and the high gain optical amplifier 13 and avoid oscillation of the optical amplifier 13 will be described. The optical amplifier 13 is called a "switchable optical amplifier 13."

Figure 10A:
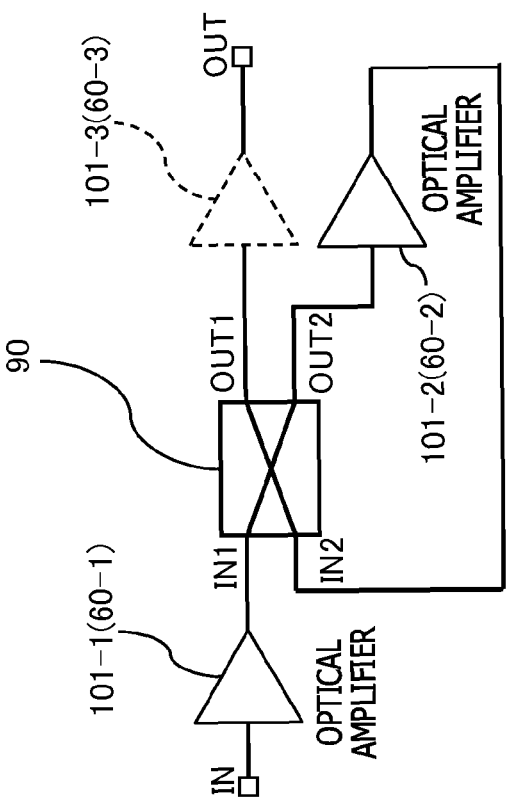
FIG. 10A is a block diagram illustrating a configuration of an optical amplifier (switchable optical amplifier) according to one embodiment, where the 2×2 optical switch is in a semi-bar connection state.
Figure 10B:
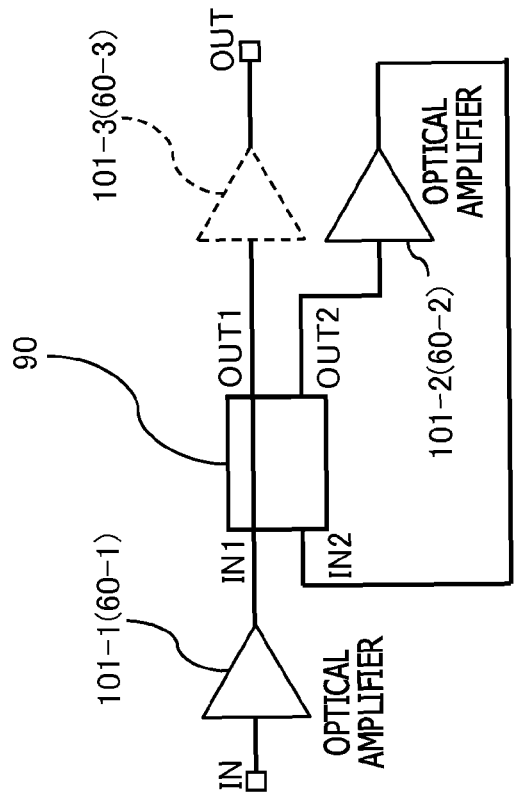
FIG. 10B is a block diagram illustrating a configuration of an optical amplifier (switchable optical amplifier) according to one embodiment, where the 2×2 optical switch is in a cross connection state.

FIGS. 10A and 10B are block diagrams illustrating a configuration example of an optical amplifier (switchable optical amplifier) according to one embodiment. Illustratively, the optical amplifier 13 illustrated in FIGS. 10A and 10B includes a first optical amplifier 101-1, a second optical amplifier 101-2, and a 2×2 optical switch 90.

Illustratively, the optical amplifiers 101-1 and 101-2 correspond to the EDFs 60-1 and 60-2, respectively, which are one example of the optical amplification medium illustrated in FIGS. 3 and 4, and also correspond to the two optical amplifiers including the EDF 60, respectively.

Illustratively, the 2×2 optical switch 90 includes first and second input ports IN1 and IN2 and first and second output ports OUT1 and OUT2 and may switch the input/output ports between a "first connection state" and a "second connection state." The "first connection state" is also called a "first switch state" and the "second connection state" is also called a "second switch state."

As illustrated in FIG. 10A, the "first connection state" is a state where the first input port IN1 and the first output port OUT1 are in optical connection and the second input port IN2 and the second output port OUT2 are not in an optical connection, i.e., no light is conducted therebetween.

In other words, the "first connection state" illustrated in FIG. 10A corresponds to a state where only one of two optical paths in the "bar connection" state of the cross/bar type 2×2 optical switch 102 illustrated in FIGS. 7A and 7B is conducted and the other is not conducted.

Therefore, for the sake of convenience, the "first connection" state of the 2×2 optical switch 90 is assumed as a "semi-bar connection" state.

In the meantime, as illustrated in FIG. 10B, the "second connection state" of the 2×2 optical switch 90 is a state where the first input port IN1 and the second output port OUT2 are in optical connection and the second input port IN2 and the first output port OUT1 are in optical connection.

In other words, the "second connection state" is equivalent to the "cross connection" state of the cross/bar type 2×2 optical switch 102 illustrated in FIGS. 8A and 8B. Therefore, the "second connection state" of the 2×2 optical switch 90 is assumed as a "cross connection" state.

For example, an output of the first optical amplifier 101-1 is connected to the first input port IN1 of the 2×2 optical switch 90 capable of switching between the "semi-bar connection" and the "cross connection" in this way and an input of the second optical amplifier 101-2 is connected to the second output port OUT2 thereof. In addition, an output of the second optical amplifier 60-2 is connected to the second input port IN2 of the 2×2 optical switch 90.

Therefore, when the 2×2 optical switch 90 is controlled to be in the "semi-bar connection" state as illustrated in FIG. 10A, the light amplified by the optical amplifier 101-1 and input to the first input port IN1 is output from the first output port OUT1 without being input to the optical amplifier 101-2.

In other words, light input to the switchable optical amplifier 13 is amplified and output by only one (for example, the first optical amplifier 101-1) of the first and second optical amplifiers 101-1 and 101-2.

Here, in the "semi-bar connection," since the second input port IN2 and the second output port OUT2 of the 2×2 optical switch 90 are in a non-conduction state, the input and output of the second optical amplifier 101-2 are optically separated from each other, thereby forming no optical "closed loop circuit."

Therefore, even when the second optical amplifier 101-2 is driven by excited light emitted therein, no oscillation occurs in the second optical amplifier 101-2. Therefore, even under situations where the excited light is used in common for the first and second optical amplifiers 101-1 and 101-2 and the excited light of the second optical amplifier 101-2 may not be individually stopped, it is possible to prevent the second optical amplifier 101-2 from being oscillated.

In the meantime, when the 2×2 optical switch 90 is controlled to be in the "cross connection" state as illustrated in FIG. 10B, the light amplified by the optical amplifier 101-1 and input to the first input port IN1 is guided to the second output port OUT2 and is input to the second optical amplifier 101-2.

The light amplified by the second optical amplifier 101-2 is input to the second input port IN2 of the 2×2 optical switch 90, is guided to the first output port OUT1, and is output from the first output port OUT1.

In other words, the light input to the switchable optical amplifier 13 is output after being amplified in two stages in order by both of the first and second optical amplifiers 101-1 and 101-2.

Therefore, the 2×2 optical switch 90 is one example of an optical switch capable of optically coupling/decoupling the input of the second optical amplifier 101-2 to/from the output of the first optical amplifier 101-1. An optical path which is formed in the "first connection state" of the 2×2 optical switch 90 and includes the optical amplifier 101-1 is one example of a first optical path. That is, the first optical path is an optical path in which the light amplified by the optical amplifier 101-1 is output through the ports IN1 to OUT1 of the 2×2 optical switch 90.

In the meantime, an optical path which is formed in the "second connection state" of the 2×2 optical switch 90 and includes the optical amplifiers 101-1 and 101-2 is one example of a second optical path. That is, the second optical path is an optical path in which the light amplified by the optical amplifier 101-1 passes through the ports IN1 to OUT2 of the 2×2 optical switch 90 and is output from the ports IN2 to OUT1 of the 2×2 optical switch 90 via the optical amplifier 101-2.

Therefore, the 2×2 optical switch 90 is an optical switch capable of switching between the first optical path and the second optical path. In addition, the optical conduction between the ports IN2 to OUT2 is cut off in the "first connection state" of the 2×2 optical switch 90. Therefore, the 2×2 optical switch 90 in the "first connection state" is one example of a light cut-off device which cuts off light propagation of the second optical path.

Meanwhile, in the configuration illustrated in FIGS. 10A and 10B, a third optical amplifier 101-3 is additionally included as in that illustrated in FIGS. 9A and 9B. For example, an input of the third optical amplifier 101-3 may be connected to the first output port OUT1 of the 2×2 optical switch 90.

In this case, the input light is amplified in two stages by the first and third optical amplifiers 101-1 and 101-3 in the "semi-bar connection state" of the 2×2 optical switch 90 and is amplified in three stages by the first to third optical amplifiers 101-1 to 101-3 in the "cross connection state."

The "cross connection" state provides a higher gain than the "semi-bar connection" state since the former has more input light amplification stages than the latter. Therefore, the switchable optical amplifier 13 in the "semi-bar connection" state illustrated in FIG. 10A corresponds to the "low gain optical amplifier 13" and the switchable optical amplifier 13 in the "cross connection" state illustrated in FIG. 10B corresponds to the "high gain optical amplifier 13."

The "high gain optical amplifier 13" may be said to be longer than the "low gain optical amplifier 13" in terms of a reachable transmission distance of amplified output light. Therefore, for the sake of convenience, the "high gain optical amplifier 13" is also called a "long reach amplifier 13" and the "low gain optical amplifier 13" is also called a "short reach amplifier 13."

Configuration Example of 2×2 Optical Switch 90

Next, a configuration example of the 2×2 optical switch 90 capable of switching between the "semi-bar connection" state and the "cross connection" state as described above will be described with reference to FIGS. 11A and 12A. Here, for the sake of convenience, the 2×2 optical switch 90 is called an "Add-Drop (AD) optical switch 90" since it may be applied to OADM, as will be described later with reference to FIGS. 13 and 14.

Figure 11A:
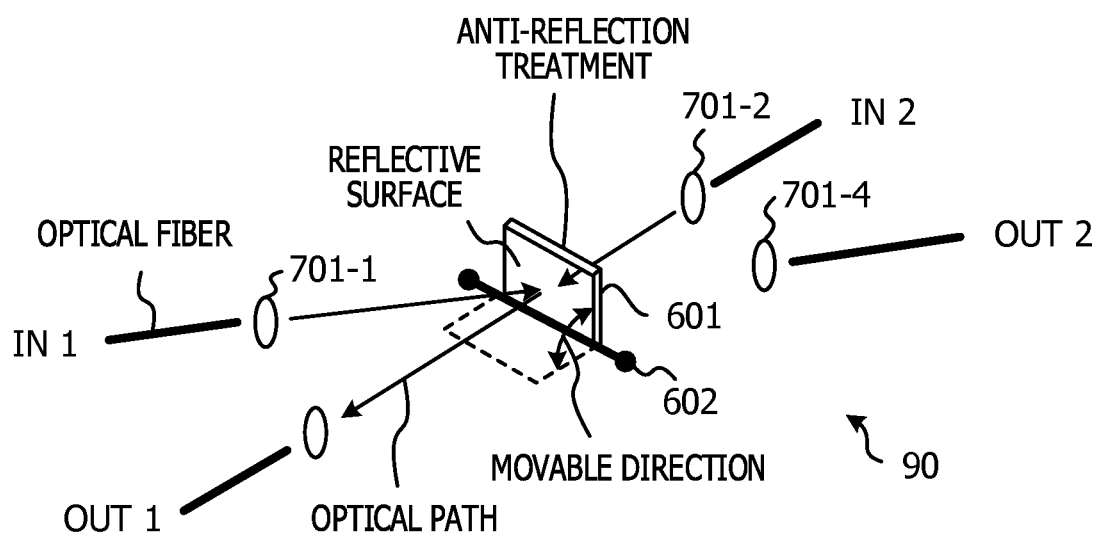
FIGS. 11A and 11B are schematic views illustrating one example of optical configuration and connection state (semi-bar connection state) of the 2×2 optical switch illustrated in FIG. 10, respectively.
Figure 12A:
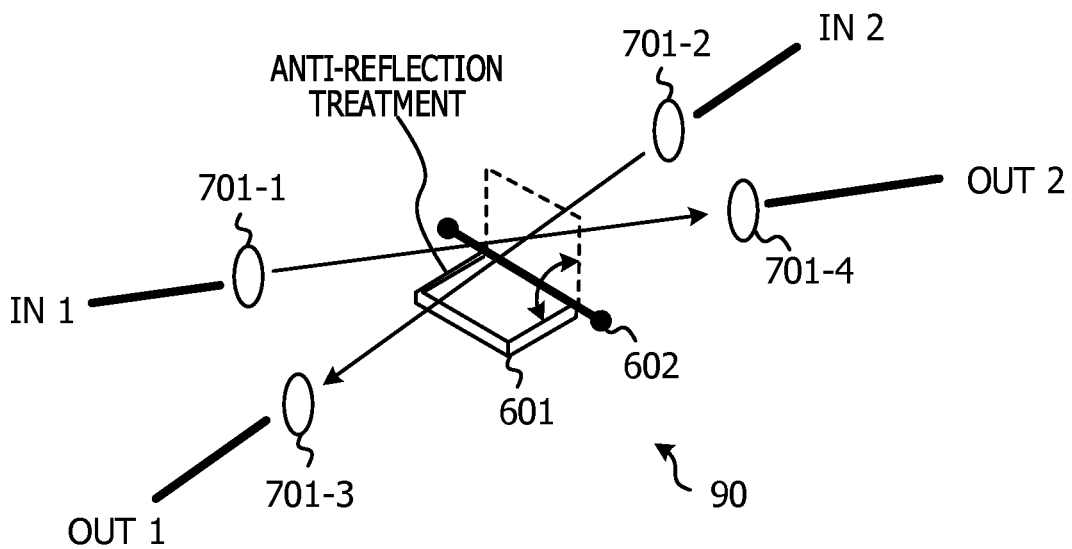
FIGS. 12A and 12B are schematic views illustrating one example of optical configuration and connection state (cross connection state) of the 2×2 optical switch illustrated in FIG. 10, respectively.

As illustrated in FIGS. 11A and 12A, the AD optical switch 90 is configured by a movable mirror 601. Similarly to the movable mirrors 201 and 401 described above, the movable mirror 601 may be rotated about, for example, a movable axis 602 between a "first position" illustrated in FIG. 11A and a "second position" illustrated in FIG. 12A.

Illustratively, the movable mirror 601 is disposed at an intersection of an optical path between an input port IN1 and an output port OUT2 and an optical path between an input port IN2 and an output port OUT1.

First to fourth lenses 701-1 to 701-4 are respectively provided for the input ports IN1 and IN2 and the output ports OUT1 and OUT2.

The first lens 701-1 condenses light incident from the first input port IN1 and outputs the condensed light toward a reflective surface of the movable mirror 601.

The second lens 701-2 condenses light incident from the second input port IN2 and outputs the condensed light toward the other surface of the movable mirror 601.

The third lens 701-3 condenses light reflected by the reflective surface of the movable mirror 601 or output light of the second input port IN2 which passes through the movable mirror 601 without being reflected by the movable mirror 601, and inputs the condensed light to the first output port OUT1.

The fourth lens 701-4 condenses output light of the first input port IN1 which passes through the movable mirror 601 without being reflected by the movable mirror 601, and inputs the condensed light to the second output port OUT2.

Here, illustratively, the movable mirror 601 illustrated in FIGS. 11A and 12A has the reflective surface reflecting the light incident from the first input port IN1 and the other surface opposite to the reflective surface has been subjected to optical anti-reflection treatment.

The anti-reflection treatment is an AR (Anti-Reflection) coating treatment for coating an ant-reflection material on the other surface of the movable mirror 601. The other surface of the movable mirror 601 subjected to the anti-reflection treatment is referred to as an "anti-reflection surface."

Since the other surface opposite to the reflective surface of the movable mirror 601 has been subjected to the anti-reflection treatment, for example, even when light is incident from the second input port IN2 into the movable mirror 601 in the "first position" illustrated in FIG. 11A, the light is not reflected and is not coupled to the second output port OUT2.

In the meantime, light incident from the first input port IN1 into the movable mirror 601 in the "first position" is incident onto the reflective surface of the movable mirror 601 and is reflected toward the first output port OUT1.

That is, the "first position" illustrated in FIG. 11A is a position at which the light input to the first input port IN1 is reflected by the reflective surface of the movable mirror 601 toward the first output port OUT1. The "first position" is also a position which inhibits the light input to the second input port IN2 from being coupled to the second output port OUT2 by being not reflected by the anti-reflection surface of the movable mirror 601.

The "second position" corresponds to the "cross connection" and is a position at which the lights input to the first and second input ports IN1 and IN2 are passed to the second and first output ports OUT2 and OUT1, respectively, as illustrated in FIG. 12A.

Therefore, by controlling the switching of the position of the movable mirror 601 between the "first position" and the "second position," optical connection between the input ports IN1 and IN2 and the output ports OUT1 and OUT2 may be switched between the "semi-bar connection" state and the "cross connection" state.

For example, when the movable mirror 601 is controlled to be in the "first position" as illustrated in FIG. 11A, the light input to the first input port IN1 is condensed by the corresponding first lens 701-1 and is then reflected by the reflective surface of the movable mirror 601. The reflected light is condensed and coupled in the first output port OUT1 by the third lens 701-3 which is provided to correspond to the first output port OUT1 and is located in the reflection direction.

In addition, the light input to the second input port IN2 is condensed by the corresponding second lens 701-2 and is then incident onto the anti-reflection surface of the movable mirror 601 in the "first position." Therefore, the light input to the second input port IN2 is not reflected and not coupled to the second output port OUT2.

Figure 11B:
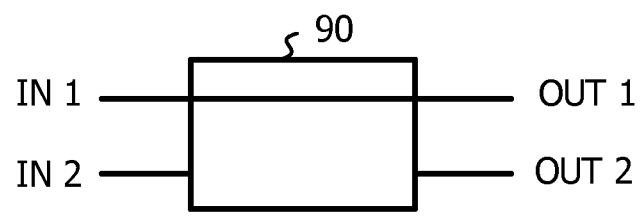

In other words, that the movable mirror 601 is controlled to be in the "first position" corresponds to the "semi-bar connection" state as illustrated in FIG. 11B. That is, this refers to a state where the first input port IN1 and the first output port OUT1 are in optical connection and the second input port IN2 and the second output port OUT2 are in no optical conduction state.

In the meantime, when the movable mirror 601 is controlled to be in the "second position" as illustrated in FIG. 12A, the movable mirror 601 does not interfere with both of the optical paths between the input port IN1 and the output port OUT1 and between the input port IN2 and the output port OUT2.

Therefore, the light input to the first input port IN1 is condensed by the corresponding first lens 701-1, is incident into the fourth lens 701-4 disposed in the condensation direction, and is then condensed and coupled in the second output port OUT2.

In addition, the light input to the second input port IN2 is condensed by the corresponding second lens 701-2, is incident into the third lens 701-3 disposed in the condensation direction, and is then condensed and coupled in the first output port OUT1.

Figure 12B:
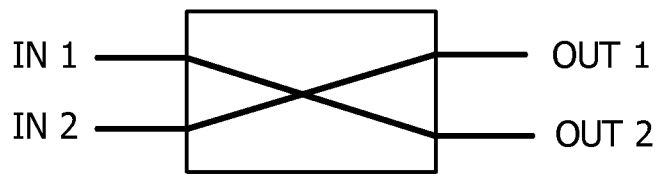

In other words, the fact that the movable mirror 601 is controlled to be in the "second position" corresponds to the "cross connection" state as illustrated in FIG. 12B. That is, this refers to a state where the first input port IN1 and the second output port OUT2 are in optical connection and the second input port IN2 and the first output port OUT1 are in optical connection.

In the manner as described above, it is possible to realize the AD optical switch 90 capable of switching between the "semi-bar connection" state and the "cross connection" state. In other words, the AD optical switch 90 is not a kind of cross/bar type 2×2 optical switch 102.

In the above-described configuration, the anti-reflection surface of the movable mirror 601 inhibits the light input to the second input port IN2 in the "first position" from being incident into and coupled to the second output port OUT2, thereby achieving the "semi-bar connection."

However, with a means of capable of inhibiting the light input to the second input port IN2 in the "first position" from being incident into and coupled to the second output port OUT2, the "semi-bar connection" state may be achieved without any anti-reflection surface.

For example, a shape of an incident surface of the movable mirror 601 onto which the light input to the second input port IN2 is incident may be set in such a manner that the light is diverted and reflected in the direction in which the light is not coupled to the second output port OUT2, in which case the above-described anti-reflection treatment is unnecessary.

Figure 13:
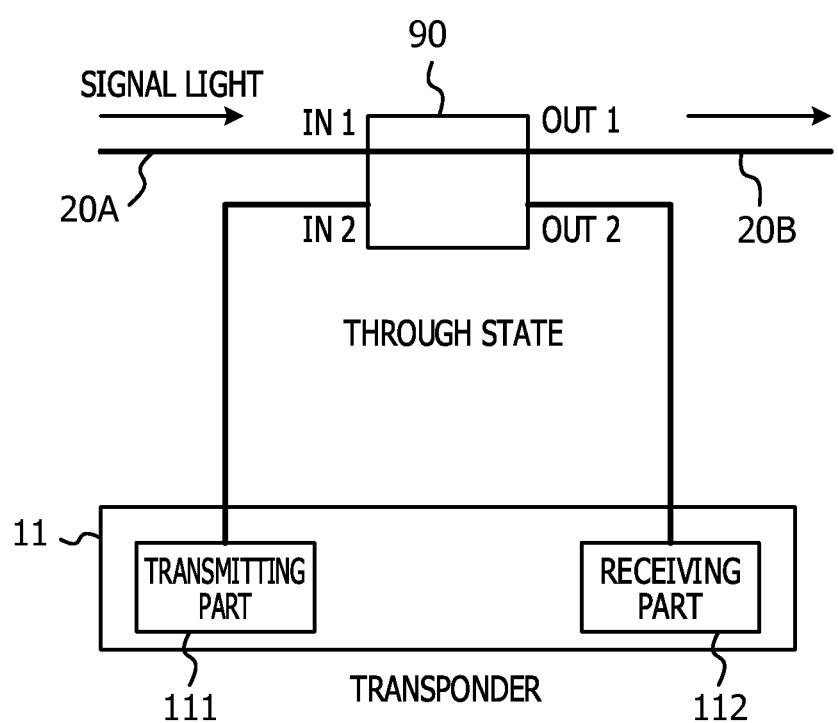
FIG. 13 is a block diagram illustrating a configuration example of Optical Add-Drop Multiplexer (OADM) to which the 2×2 optical switch (semi-bar connection state) illustrated in FIGS. 11 and 12 is applied.
Figure 14:
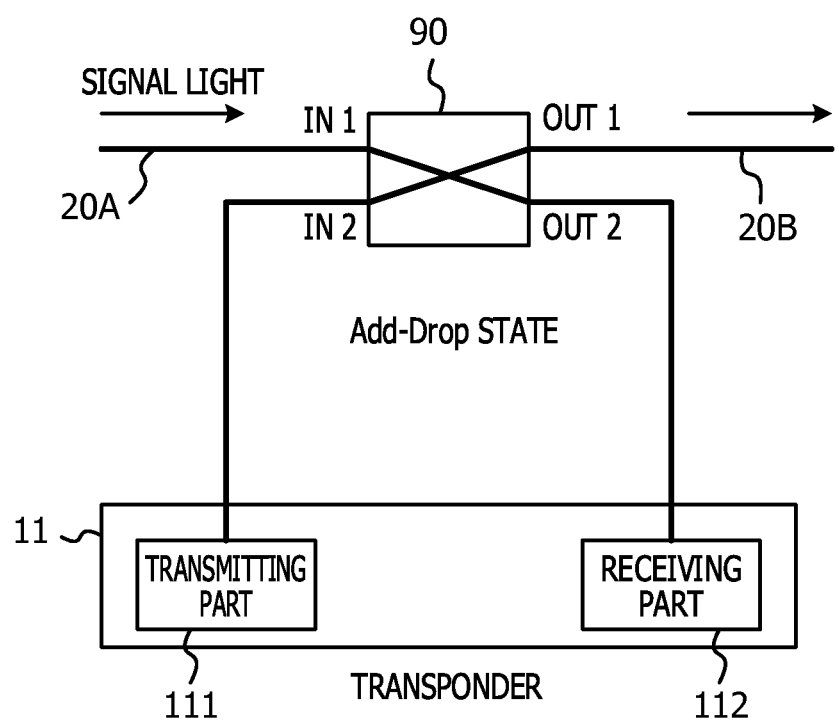
FIG. 14 is a block diagram illustrating a configuration example of OADM to which the 2×2 optical switch (cross connection state) illustrated in FIGS. 11 and 12 is applied.

As illustrated in FIGS. 13 and 14, for example, the above-described AD optical switch 90 may be applied to the OADM 10. For example, an input light transmission line 20A is connected to the first input port IN1 of the AD optical switch 90 and an output light transmission line 20B is connected to the first output port OUT1 of the AD optical switch 90.

In addition, an output of a transmitting part 111 of the transponder 11 is optically connected to the second input port IN2 of the AD optical switch 90 and an input of a receiving part 112 of the transponder 11 is optically connected to the second output port OUT2 of the AD optical switch 90. Illustratively, an optical fiber or an optical waveguide is used for the "optical" connection (hereinafter the same).

In the above-described connection form, when the AD optical switch 90 is controlled to be in the "semi-bar connection" state, the light input to the first input port IN1 of the AD optical switch 90 from the input light transmission line 20A is passed through the first output port OUT1 to the output light transmission line 20B, as illustrated in FIG. 13.

In addition, add-light, which is output light of the transmitting part 111, and drop-light, which is input light of the receiving part 112, are optically separated from the respective light transmission lines 20A and 20B.

In the meantime, when the AD optical switch 90 is controlled to be in the "cross connection" state, the light input from the input light transmission line 20A to the first input port IN1 of the AD optical switch 90 is dropped onto the receiving part 112 through the second output port OUT2, as illustrated in FIG. 14. In addition, the add-light input from the transmitting part 111 to the second input port IN2 of the AD optical switch 90 is output to the output light transmission line 20B through the first output port OUT1.

Hereinafter, examples of using the above-described AD optical switch 90 to switch the optical amplifier 13 between the "high gain optical amplifier (configuration)" and the "low gain optical amplifier (configuration)" will be described with reference to FIGS. 15 to 38.

The optical amplifier 13 using the AD optical switch 90 is referred to as a "switchable optical amplifier 13." In FIGS. 15 to 38, the same or similar elements or portions as those described above in FIGS. 3 and 4 are denoted by the same reference numerals as those described above unless particularly stated otherwise.

Figure 15:
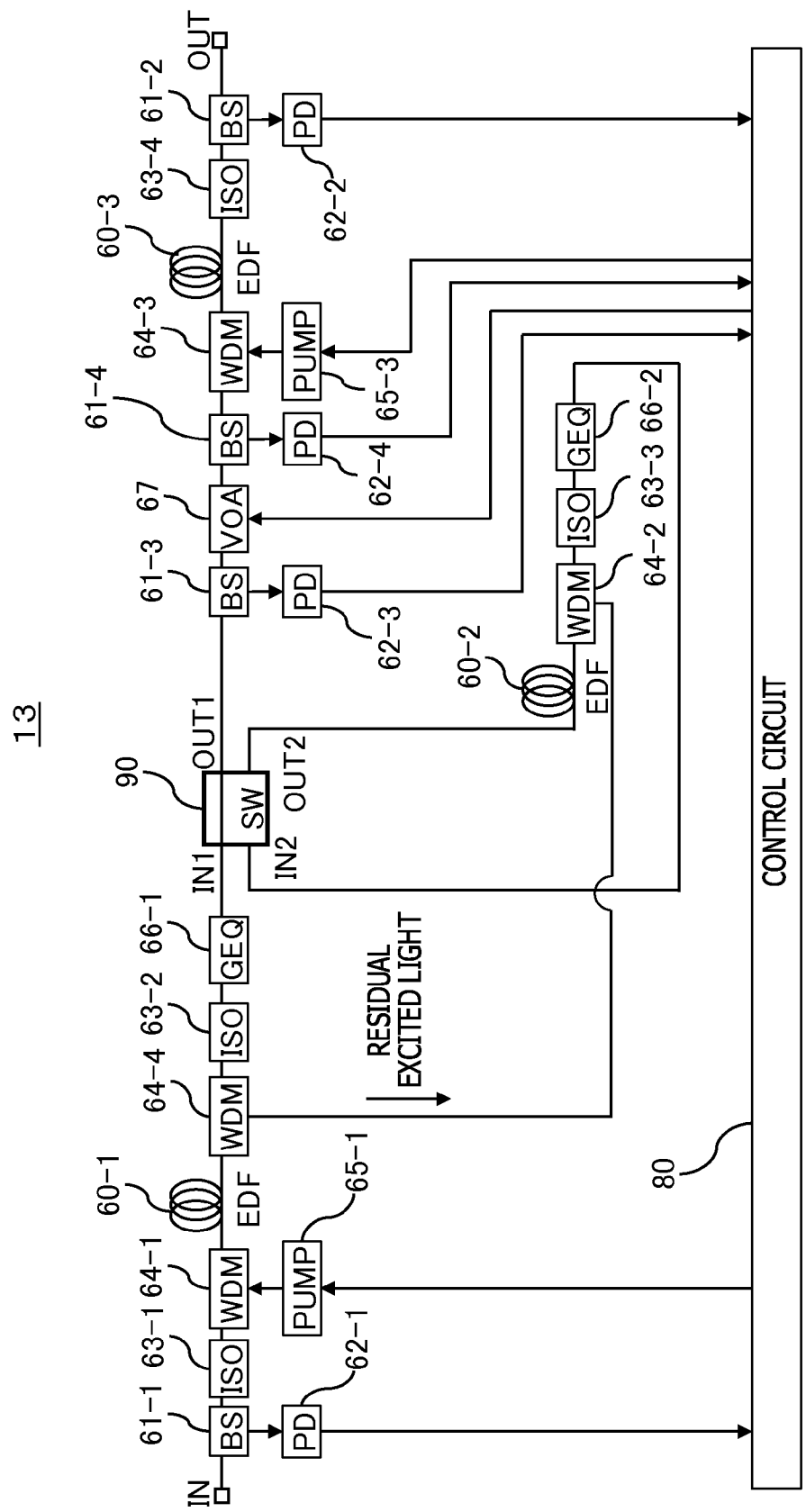
FIG. 15 is a block diagram illustrating a configuration example of a switchable optical amplifier (semi-bar connection state) according to a first example.
Figure 16:
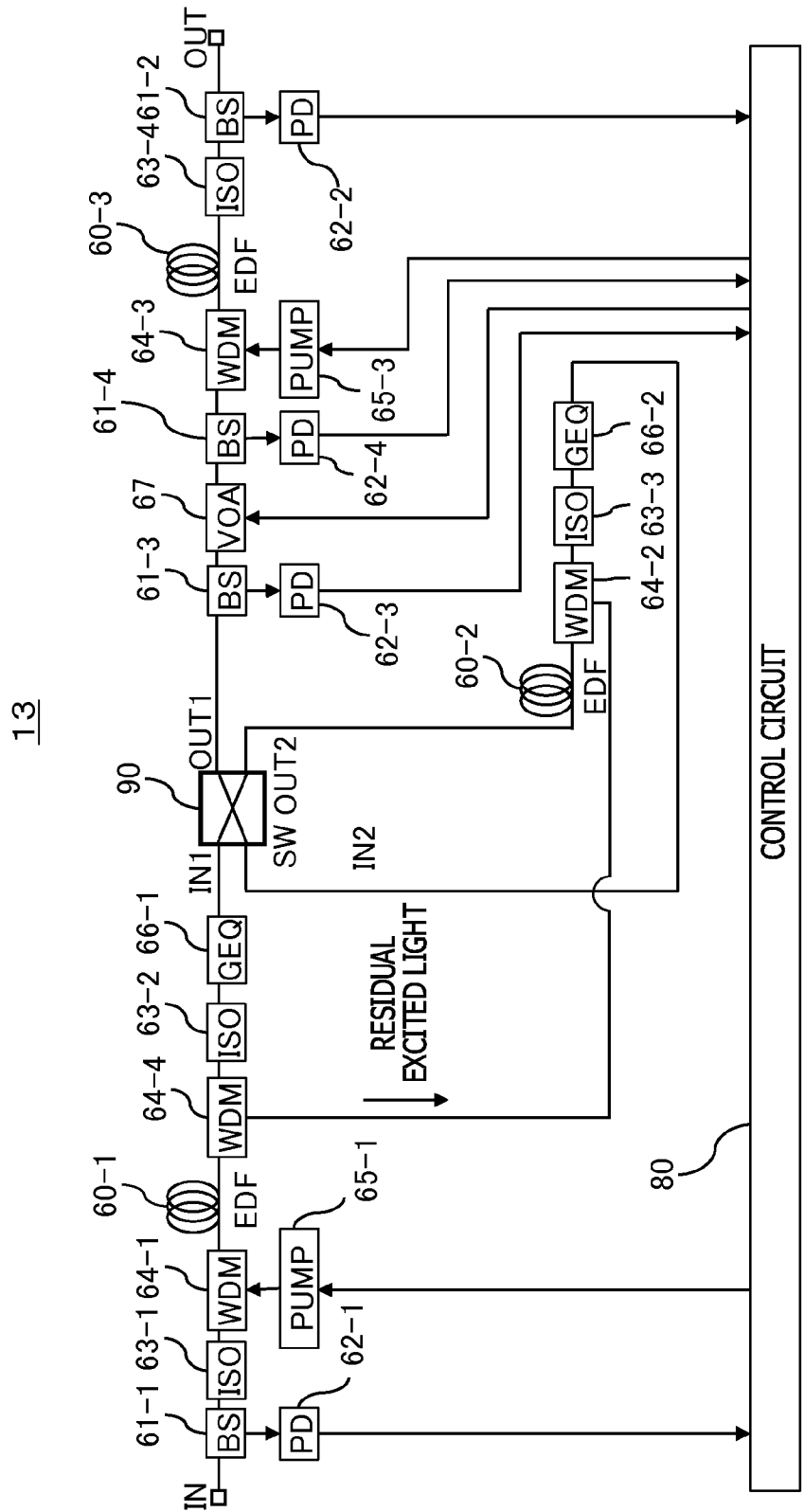
FIG. 16 is a block diagram illustrating a configuration example of a switchable optical amplifier (cross connection state) according to the first example.

First Example: FIGS. 15 and 16

FIGS. 15 and 16 are block diagrams illustrating a configuration example of a switchable optical amplifier 13 according to a first example. FIG. 15 corresponds to a "low gain optical amplifier configuration" in which the AD optical switch 90 is controlled to be in the "semi-bar connection" state. FIG. 16 corresponds to a "high gain optical amplifier configuration" in which the AD optical switch 90 is controlled to be in the "cross connection" state.

The configuration illustrated in FIGS. 15 and 16 corresponds to the configuration of using the AD optical switch 90 to control the input light to the EDF 60-2 to be valid or invalid, as illustrated in FIGS. 10A and 10B, on the basis of the excited light common use configuration illustrated in FIG. 4.

For example, the AD optical switch 90 is interposed between the ISO 63-2 and the BS 61-3. An output of the ISO 63-2 is directly or indirectly, and optically connected to the first input port IN1 of the AD optical switch 90.

Here, the "direct" connection is, for example, a convenient representation which indicates that one or more optical parts or optical devices are interposed on an optical path interconnecting other optical parts or optical devices (hereinafter the same).

For example, this means that another optical part or another optical device is interposed on an optical path between the output of the ISO 63-2 and the first input port IN1 of the AD optical switch 90. In the example of FIGS. 15 and 16, the GEQ 66-1 is interposed and an output of the GEQ 66-1 is optically connected to the first input port IN1 of the AD optical switch 90.

An input of the BS 61-3 is optically connected to the first output port OUT1 of the AD optical switch 90. An input of the EDF 60-2 is optically connected to the second output port OUT2 of the AD optical switch 90. An output of the EDF 60-2 is optically directly or indirectly connected to the second input port IN2 of the AD optical switch 90.

For example, as illustrated in FIGS. 15 and 16, the WDM coupler 64-2, the ISO 63-3 and a GEQ 66-2 are interposed on an optical path between the output of the EDF 60-2 and the second input port IN2 of the AD optical switch 90.

Illustratively, the WDM coupler 64-2 is optically connected to the output of the EDF 60-2. The WDM coupler 64-2 is optically connected to the output of the EDF 60-2, one of two output ports of the WDM coupler 64-4, and the ISO 63-3.

The WDM coupler 64-2 outputs the signal light amplified by the EDF 60-2 to the ISO 63-3 and emits the leaked light (called "residual excited light") of the excited light separated from the WDM coupler 64-4 into the EDF 60-2 in the direction opposite to the signal light transmission direction.

In other words, the WDM coupler 64-2 has the characteristic of passing a signal light wavelength to the ISO 63-3 and passing an excited light wavelength to the EDF 60-2. Therefore, the EDF 60-2 is "backward-excited" by the residual excited light.

The residual excited light is excited light of the excitation light source 65-1. The excited light of the excitation light source 65-1 is emitted by the WDM coupler 64-1 into the EDF 60-1 in the same direction as the transmission direction of the signal light to the EDF 60-1.

Therefore, the EDF 60-1 is "forward-excited" by the excited light of the excitation light source 65-1 and the EDF 60-2 is "backward-excited" by the residual excited light of the excitation light source 65-1 which remains without being consumed for amplification in the EDF 60-1.

The ISO 63-3 outputs the signal light, which is amplified by the EDF 60-2 and passes through the WDM coupler 64-2, in one direction and prevents returned light from being input to the EDF 60-2. The ISO 63-3 and the ISO 63-2 disposed at the post-stage of the EDF 60-1 may prevent the EDF 60-2 from being oscillated due to the returned light, thereby stabilizing the amplification operation of the EDF 60-2.

The GEQ 66-2 is optically connected to an output of the ISO 63-3. The GEQ 66-2 equalizes (compensates for) the gain wavelength characteristic of the EDF 60-2. An output of the GEQ 66-2 is optically connected to the second input port IN2 of the AD optical switch 90.

In the above-described configuration, when the AD optical switch 90 is controlled to be in the "semi-bar connection" state, an optical path passing through the EDF 60-2 is separated from an optical path passing through the EDF 60-1 and the EDF 60-3, as illustrated in FIG. 15. The switching of the connection state of the AD optical switch 90 is, illustratively, controlled by the control circuit 80.

Therefore, the signal light input to the input port IN of the switchable optical amplifier 13 is amplified by the EDF 60-1 and then passes through the first input port IN1 and first output port OUT1 of the AD optical switch 90. Meanwhile, before the signal light amplified by the EDF 60-1 is input to the first input port IN1 of the AD optical switch 90, the gain wavelength characteristic of the signal light is compensated for in the GEQ 66-1.

The signal light output from the first output port OUT1 of the AD optical switch 90 is input to the EDF 60-3 via the BS 61-3, the VOA 67, the BS 61-4 and the WDM coupler 64-3 and is then amplified by the EDF 60-3.

The signal light amplified by the EDF 60-3 is output from the output port OUT of the switchable optical amplifier 13 (hereinafter sometimes abbreviated as the "optical amplifier 13") via the ISO 63-4 and the BS 61-2.

Here, the optical path passing through the EDF 60-2 forms no closed loop circuit since no connection is made between the second input port IN2 and second output port OUT2 of the AD optical switch 90. Therefore, even when the EDF 60-2 is "backward-excited" by the residual excited light of the excitation light source 65-1 emitted into the EDF 60-2, no oscillation occurs.

In the meantime, when the AD optical switch 90 is controlled to be in the "cross connection" state, an optical path in which the signal light is transmitted to the EDF 60-1, the EDF 60-2 and the EDF 60-3 in this order is formed, as illustrated in FIG. 16.

For example, the signal light input to and amplified by the EDF 60-1 is input to the EDF 60-2 via the first input port IN1 and the second output port OUT2 of the AD optical switch 90.

The signal light input to and amplified by the EDF 60-2 is input to the GEQ 66-2 via the ISO 63-3 and is then input to the second input port IN2 of the AD optical switch 90 after the gain wavelength characteristic of the signal light is compensated for in the GEQ 66-2.

The signal light input to the second input port IN2 of the AD optical switch 90 is output to the first output port OUT1 of the AD optical switch 90 since the AD optical switch 90 is in the "cross connection" state.

The signal light output from the first output port OUT1 of the AD optical switch 90 is input to the VOA 67 via the BS 61-3 and is then input to the EDF 60-3 via the BS 61-4 and the WDM coupler 64-3 after a loss amount of the signal light is adjusted by the VOA 67.

The signal light amplified by the EDF 60-3 is output from the output port OUT of the switchable optical amplifier 13 via the ISO 63-4 and the BS 61-2.

Based on the result of monitoring of the signal light power by the PD 62-1 and the PD 62-2, the control circuit 80 performs AGC (Automatic Gain Control) for the switchable optical amplifier 13 as a whole.

Since this AGC is performed for the switchable optical amplifier 13 as a whole, it is performed for either the "low gain optical amplifier configuration" in the "semi-bar connection" state or the "high gain optical amplifier configuration" in the "cross connection" state.

In other words, the overall AGC of the switchable optical amplifier 13 corresponds to a control to make the sum of gains of two EDFs 60-1 and 60-3 constant for the "low gain optical amplifier configuration," while corresponding to a control to make the sum of gains of three EDFs 60-1 to 60-3 constant for the "high gain optical amplifier configuration."

Illustratively, the control circuit 80 calculates the current overall gain of the optical amplifier 13 based on the power of input light to the optical amplifier 13, which is monitored by the PD 62-1, and the power of output light from the optical amplifier 13, which is monitored by the PD 62-2. The control circuit 80 controls the excited light power of the excitation light sources 65-1 and 65-3 such that the calculated overall gain reaches a target gain.

In addition to the AGC or as an alternative to the AGC, the control circuit 80 performs ALC (Automatic Level Control) to make the output light power (level) of the switchable optical amplifier 13 constant. Similarly to the AGC, the ALC is performed for either the "low gain optical amplifier configuration" in the "semi-bar connection" state or the "high gain optical amplifier configuration" in the "cross connection" state.

For example, the control circuit 80 controls the excited light power of the excitation light sources 65-1 and 65-3 such that the current output light power (level) of the switchable optical amplifier 13 monitored by the PD 62-2 reaches target power (level).

As described above, according to the first example, the single AD optical switch 90 may be used to switch the single optical amplifier 13 between the "low gain optical amplifier configuration" and the "high gain optical amplifier configuration." Therefore, it is possible to achieve reduction of the number of amplifier menus, reduction of costs of the optical transmitter 10, and further reduction of costs incurred for maintenance and management of the optical transmitter 10.

In addition, since the excited light of the excitation light source 65-1 is used in common for the EDF 60-1 and the EDF 60-2, it is possible to reduce the number of excited lights in the optical amplifier 13 and achieve compactness and low costs of the optical amplifier 13 and further compactness and low costs of the optical transmitter 10.

In addition, since the excited light is used in common for the EDF 60-1 and the EDF 60-2, even in situations where the excited light may not be individually selectively stopped in the "low gain optical amplifier configuration," it is possible to prevent the EDF 60-2 from being oscillated, according to the "semi-bar connection" state.

In addition, since the EDF 60-2 is "backward-excited" by the residual excited light of the EDF 60-1, its gain is less likely to be saturated than "forward-excitation." In addition, an intensity noise of the excited light is less likely to be superimposed on the signal light than "forward-excitation." In addition, in the "backward-excitation," since the excited light propagates in the opposite direction to the signal light, even when a noise component or the like is contained in the excited light of the EDF 60-2, it is possible to suppress any interference to the signal light.

For example, one WDM coupler 64-4 may obtain an insufficient capability (called "crosstalk") to separate the signal light wavelength from the excited light wavelength and a signal light wavelength component may be contained in the residual excited light for the EDF 60-2.

Even in this case, in the EDF 60-2, since the excited light propagates in the opposite direction to the signal light, it is possible to prevent the signal light wavelength component remaining in the excited light from interfering with the signal light to be amplified.

In addition, the GEQ 66-1 illustrated in FIGS. 15 and 16 is relocated at the post-stage of the AD optical switch 90, for example, between the VOA 67 and the EDF 60-3. For example, if the output light level of the EDF 60-1 is relatively lower than that of the EDF 60-2, the GEQ 66-1 is relocated at the post-stage of the AD optical switch 90.

In this case, since the input light level of the EDF 60-2 or the EDF 60-3 may be set to be higher than that of the EDF 60-1, it is possible to expect improvement of the NF characteristics. Such relocatability of the GEQ 66-1 at the post-stage of the AD optical switch 90 may be equally applied to second to twelfth examples to be described below. For example, this is pertinent to the sixth to tenth examples, and the twelfth example providing an EDF two-stage configuration.

Figure 17:
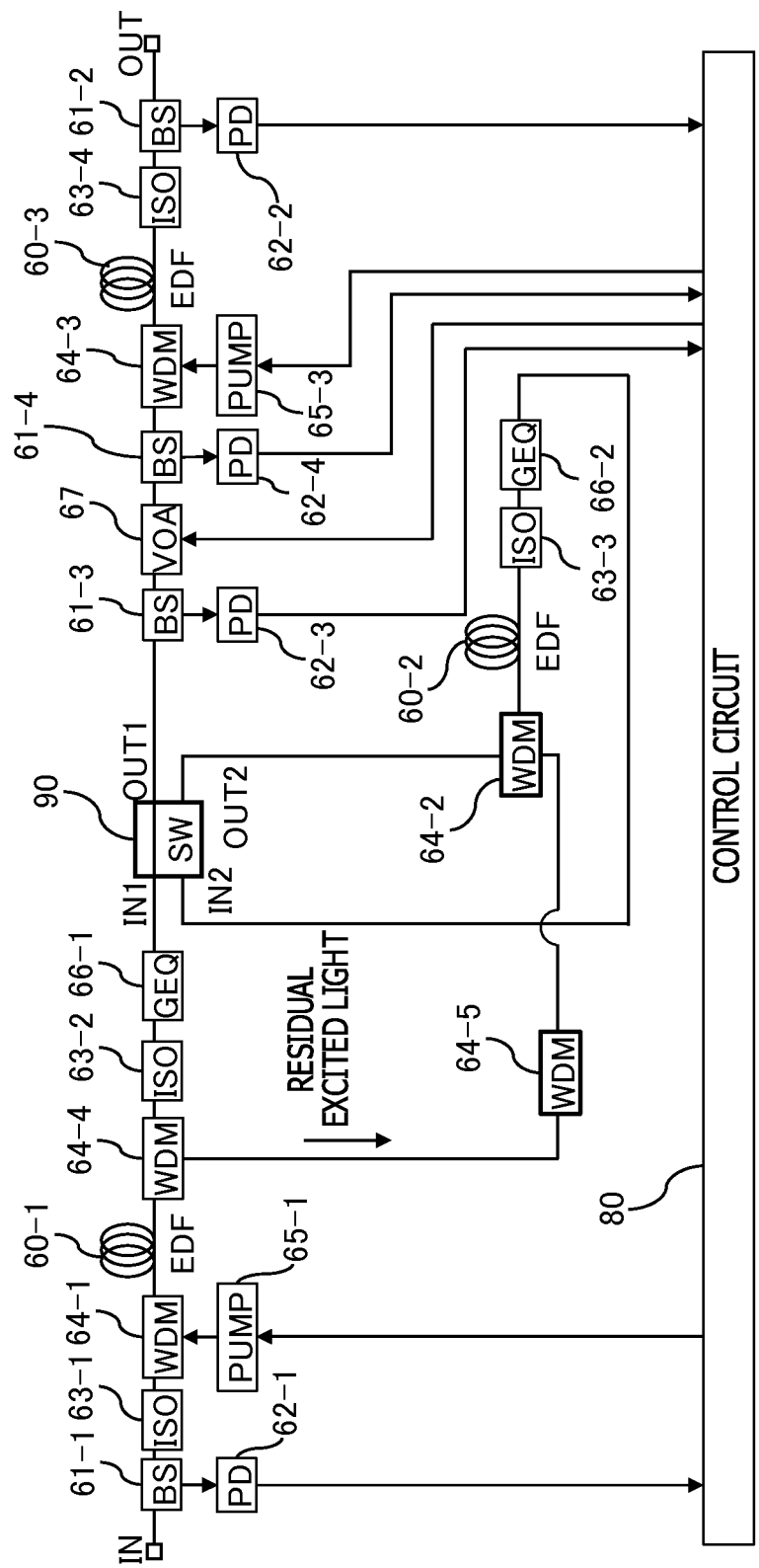
FIG. 17 is a block diagram illustrating a configuration example of a switchable optical amplifier (semi-bar connection state) according to a second example.
Figure 18:
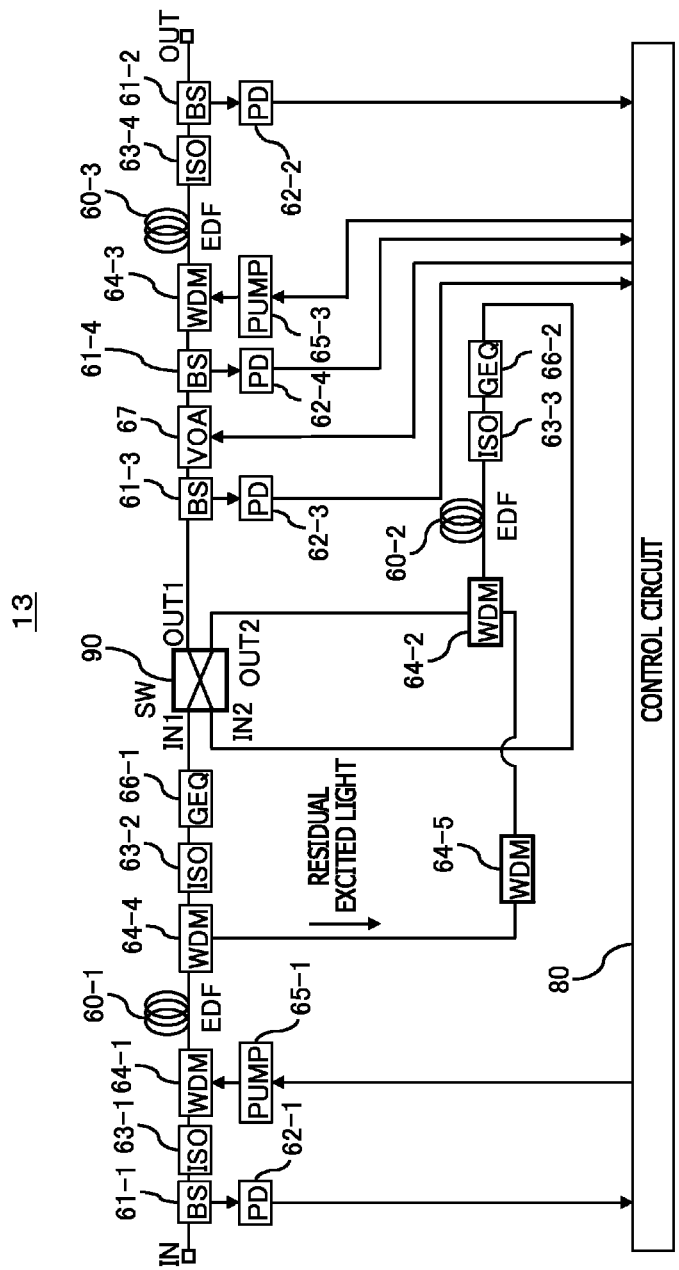
FIG. 18 is a block diagram illustrating a configuration example of a switchable optical amplifier (cross connection state) according to the second Example.

Second Example: FIGS. 17 and 18

FIGS. 17 and 18 are block diagrams illustrating a configuration example of a switchable optical amplifier 13 according to a second example. FIG. 17 corresponds to a "low gain optical amplifier configuration" in which the AD optical switch 90 is controlled to be in the "semi-bar connection" state. FIG. 18 corresponds to a "high gain optical amplifier configuration" in which the AD optical switch 90 is controlled to be in the "cross connection" state.

The configuration illustrated in FIGS. 17 and 18 is different from the configuration of the first Example illustrated in FIGS. 15 and 16 in that the WDM coupler 64-2 is disposed at the pre-stage of the EDF 60-2 and the EDF 60-2 is "forward-excited" by the residual excited light of the excitation light source 65-1.

The "forward-excitation" of the EDF 60-2 may provide an improved wavelength dependency of NF of signal light as compared to the "backward-excitation" of the first example.

However, as described in the first example, since the excited light and the signal light to be amplified have the same propagation direction in the "forward-excitation," if a noise component or the like is contained in the excited light, it is more likely to generate an interference to the signal light in the "forward-excitation" than the "backward-excitation" of the first example.

For example, one WDM coupler 64-4 may not obtain a sufficient capability to separate the signal light wavelength from the excited light wavelength and a signal light wavelength component may be contained in the residual excited light for the EDF 60-2.

If the EDF 60-2 is "forward-excited" by the excited light in which the signal light wavelength component remains, since the signal light and the excited light have the same propagation direction, the signal light wavelength component remaining in the excited light is likely to interfere with the signal light to be amplified.

Therefore, a WDM coupler 64-5 may be additionally disposed on an optical path between the WDM coupler 64-4 disposed at the post-stage of the EDF 60-1 and the WDM coupler 64-2 disposed at the pre-stage of the EDF 60-2, along which the residual excited light of the EDF 60-1 propagates.

The WDM coupler 64-5 is one example of a fourth coupler and has the characteristic of cutting the signal light wavelength component leaked along with the residual excited light separated from the WDM coupler 64-4.

When the one WDM coupler 64-4 may not obtain the sufficient capability to separate the signal light wavelength from the excited light wavelength, the WDM coupler 64-5 may be complementarily used to increase the wavelength separation capability. The number of WDM couplers 64-5 to be complementarily used may be two or more (hereinafter the same).

Thus, since the signal light wavelength component which may be contained in the residual excited light may be suppressed, it is possible to prevent the signal light wavelength component remaining in the excited light from interfering with the signal light to be amplified by the EDF 60-2. Therefore, it is possible to improve the NF of the signal light to be amplified by the EDF 60-2. Other configurations and operations are the same as the first example.

Figure 19:
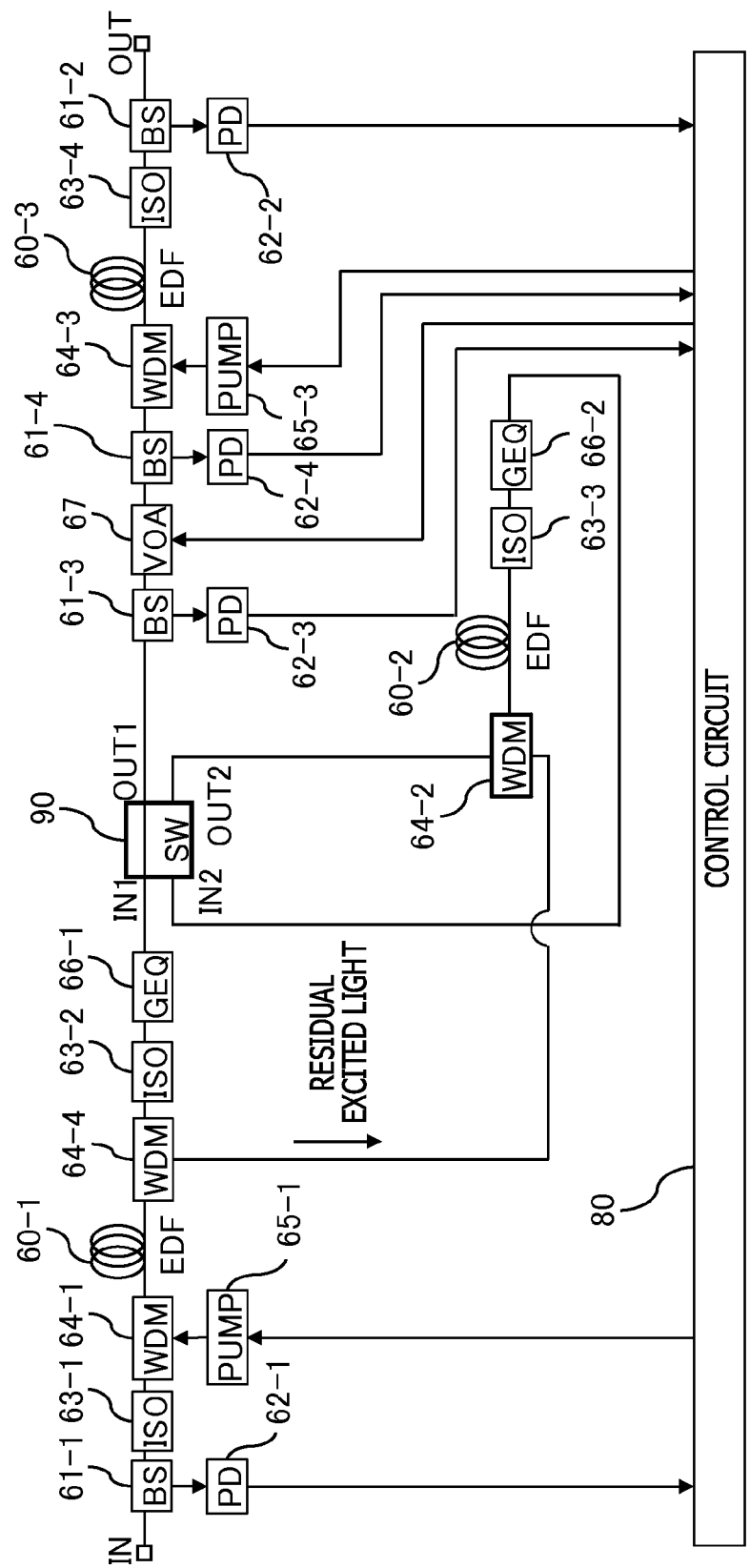
FIG. 19 is a block diagram illustrating a configuration example of a switchable optical amplifier (semi-bar connection state) according to a third example.
Figure 20:
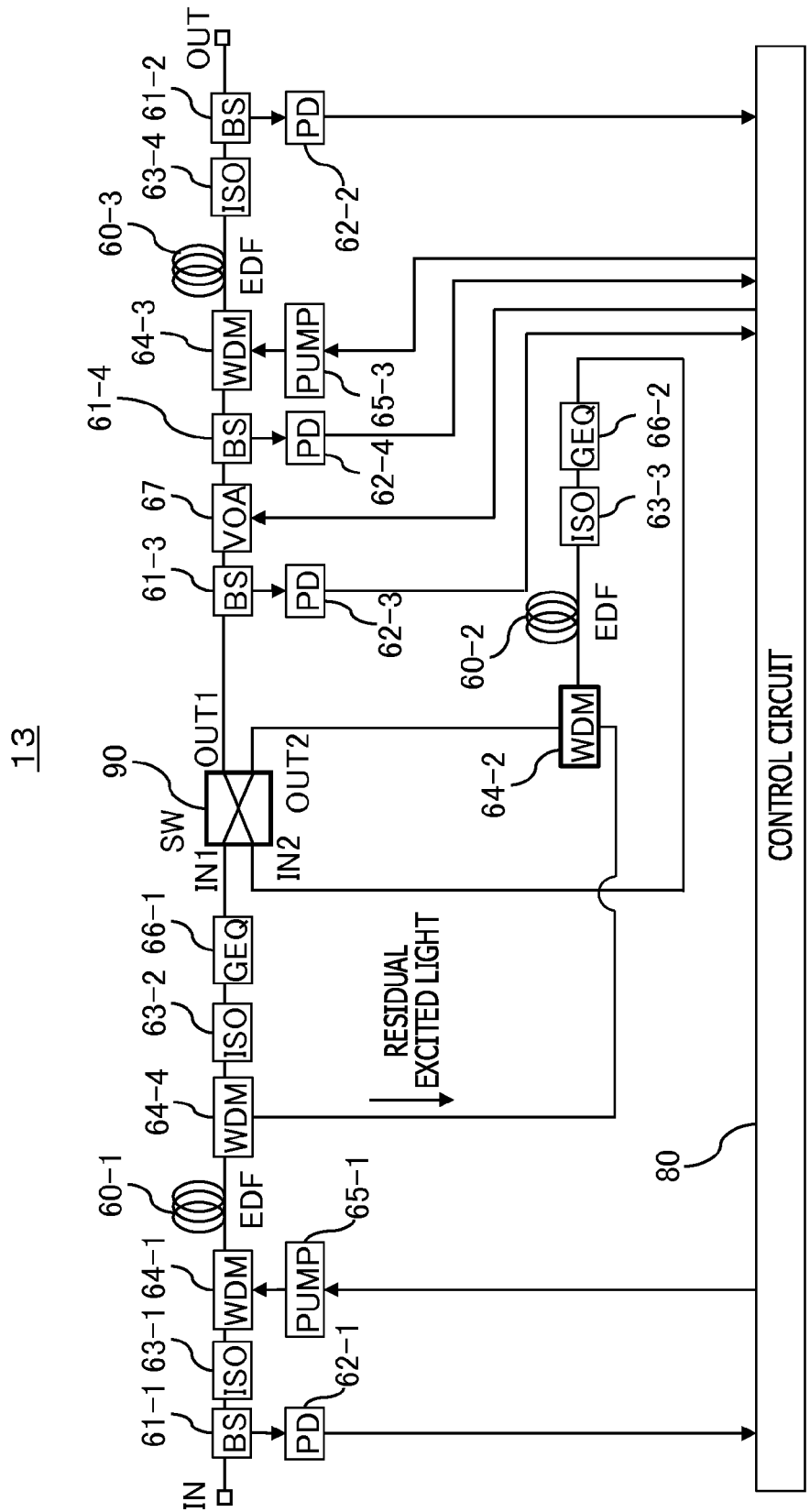
FIG. 20 is a block diagram illustrating a configuration example of a switchable optical amplifier (cross connection state) according to the third example.

Third Example: FIGS. 19 and 20

FIGS. 19 and 20 are block diagrams illustrating a configuration example of a switchable optical amplifier 13 according to a third example. FIG. 19 corresponds to a "low gain optical amplifier configuration" in which the AD optical switch 90 is controlled to be in the "semi-bar connection" state. FIG. 20 corresponds to a "high gain optical amplifier configuration" in which the AD optical switch 90 is controlled to be in the "cross connection" state.

It was assumed in the above second example that the one WDM coupler 64-4 may not obtain the sufficient capability to separate the signal light wavelength from the excited light wavelength. However, if the one WDM coupler 64-4 may obtain the sufficient wavelength separation capability, the WDM coupler 64-5 may not be disposed on the optical path between the WDM coupler 64-4 and the WDM coupler 64-2, as illustrated in FIGS. 19 and 20. Other configurations and operations are the same as the second example.

Figure 21:
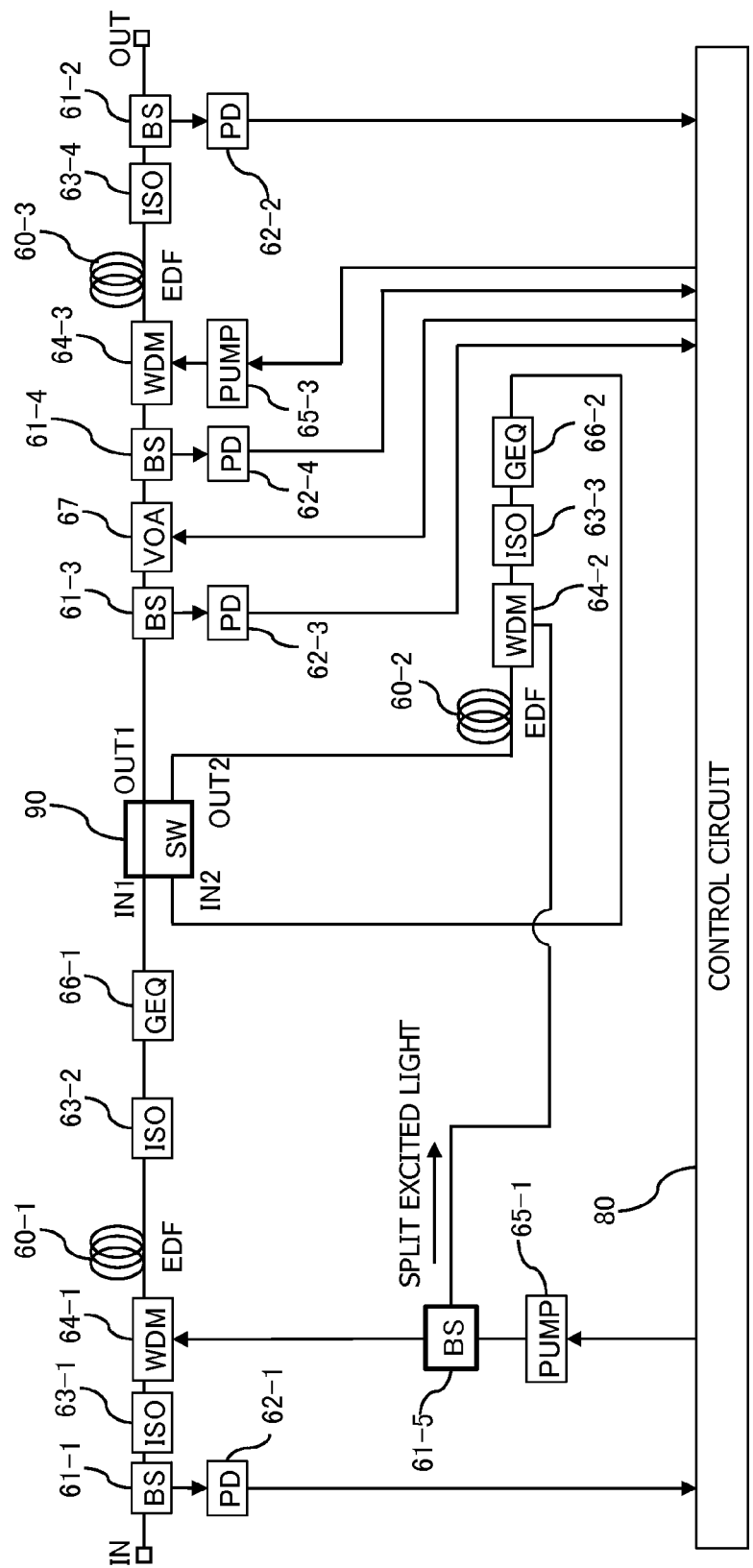
FIG. 21 is a block diagram illustrating a configuration example of a switchable optical amplifier (semi-bar connection state) according to a fourth example.
Figure 22:
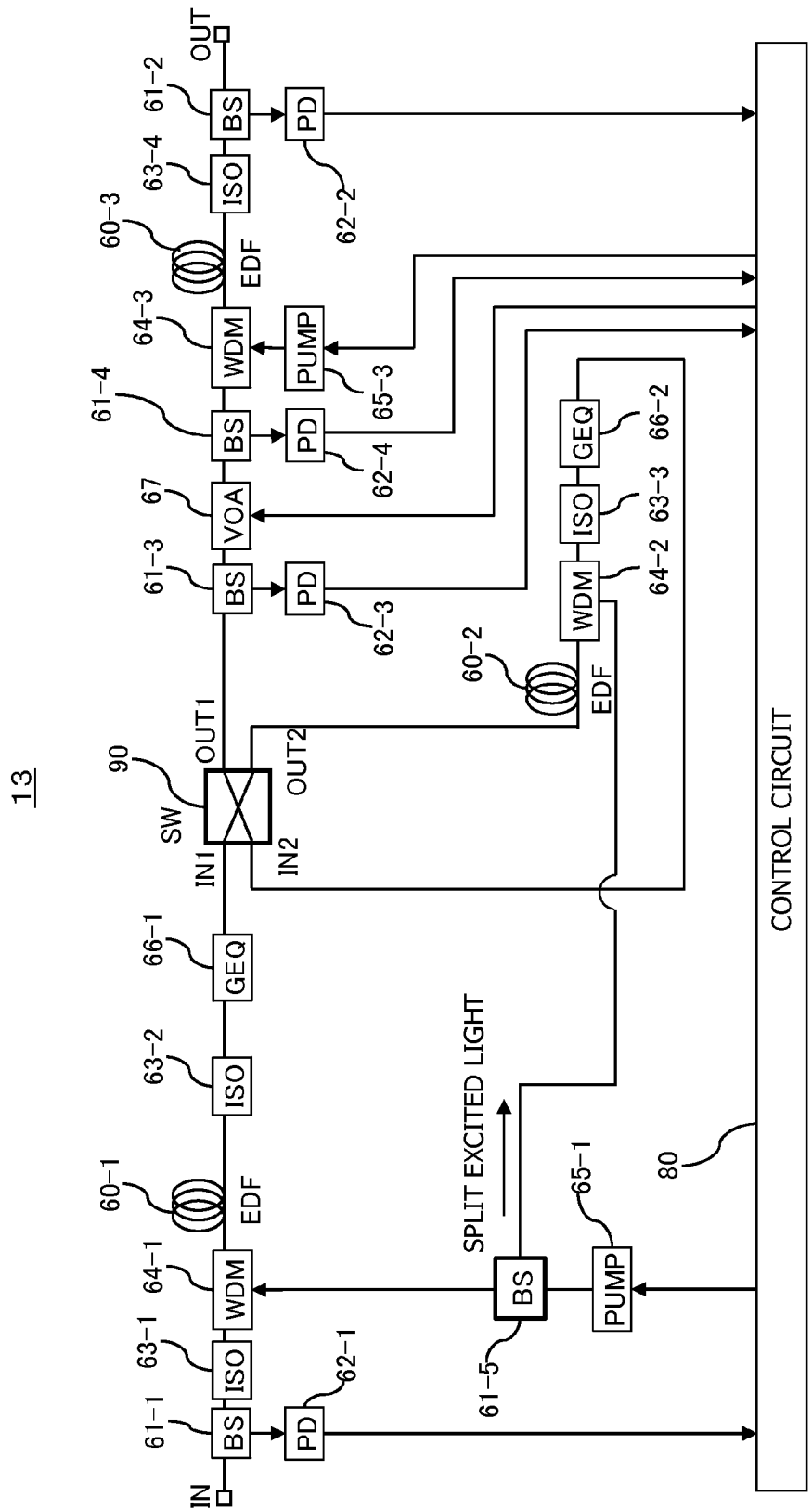
FIG. 22 is a block diagram illustrating a configuration example of a switchable optical amplifier (cross connection state) according to the fourth example.

Fourth Example: FIGS. 21 and 22

FIGS. 21 and 22 are block diagrams illustrating a configuration example of a switchable optical amplifier 13 according to a fourth example. FIG. 21 corresponds to a "low gain optical amplifier configuration" in which the AD optical switch 90 is controlled to be in the "semi-bar connection" state. FIG. 22 corresponds to a "high gain optical amplifier configuration" in which the AD optical switch 90 is controlled to be in the "cross connection" state.

In the above first to third examples (FIGS. 15 to 20), the configuration example of emitting the residual excited light included in the output light of the EDF 60-1 to the EDF 60-2 has been described as one example of the configuration of using the excited light of the excitation light source 65-1 in common for the EDF 60-1 and the EDF 60-2.

However, the configuration of using the excited light in common is not limited thereto but may be a configuration of splitting the excited light of the excitation light source 65-1 by means of the BS 61-5 and emitting the split lights into the EDFs 60-1 and 60-2, respectively, as illustrated in FIG. 3.

For example, as illustrated in FIGS. 21 and 22, the BS 61-5 is disposed at the post-stage of the excitation light source 61-5 and the excited lights split by the BS 61-5 are respectively emitted into the WDM coupler 64-1 at the pre-stage of the EDF 60-1 and the WDM coupler 64-2 at the post-stage of the EDF 60-2.

In other words, the EDF 60-1 is "forward-excited" by one of the split excited lights of the excitation light source 61-5 and the EDF 60-2 is "backward-excited" by the other of the split excited lights of the excitation light source 61-5.

In further words, the switchable optical amplifier 13 illustrated in FIGS. 21 and 22 corresponds to a configuration where the WDM coupler 64-4 at the post-stage of the EDF 60-1 is excluded from the configuration of the first example (FIGS. 15 and 16) and the BS 61-5 is added at the post-stage of the excitation light source 65-1.

Other configurations and operations are the same as the first example. The fourth example may obtain the same operation and effects as the first example. In addition, whether to use the residual excited light or the split excited light for the excited light to be emitted into the EDF 60-2 depends on extents of reduction of excited light power, reduction of the number of parts, improvement of NF characteristics, and so on.

Figure 23:
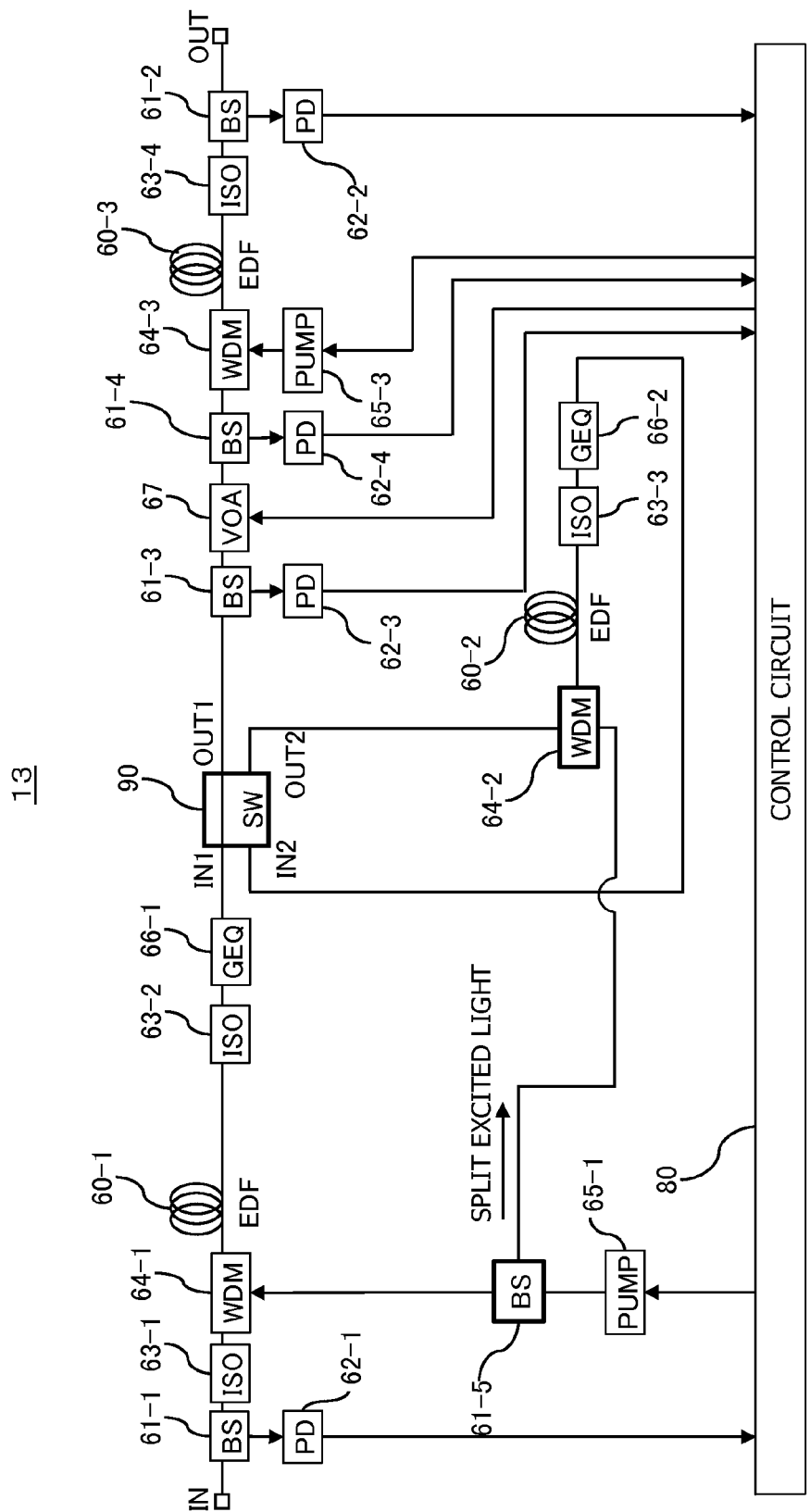
FIG. 23 is a block diagram illustrating a configuration example of a switchable optical amplifier (semi-bar connection state) according to a fifth Example.
Figure 24:
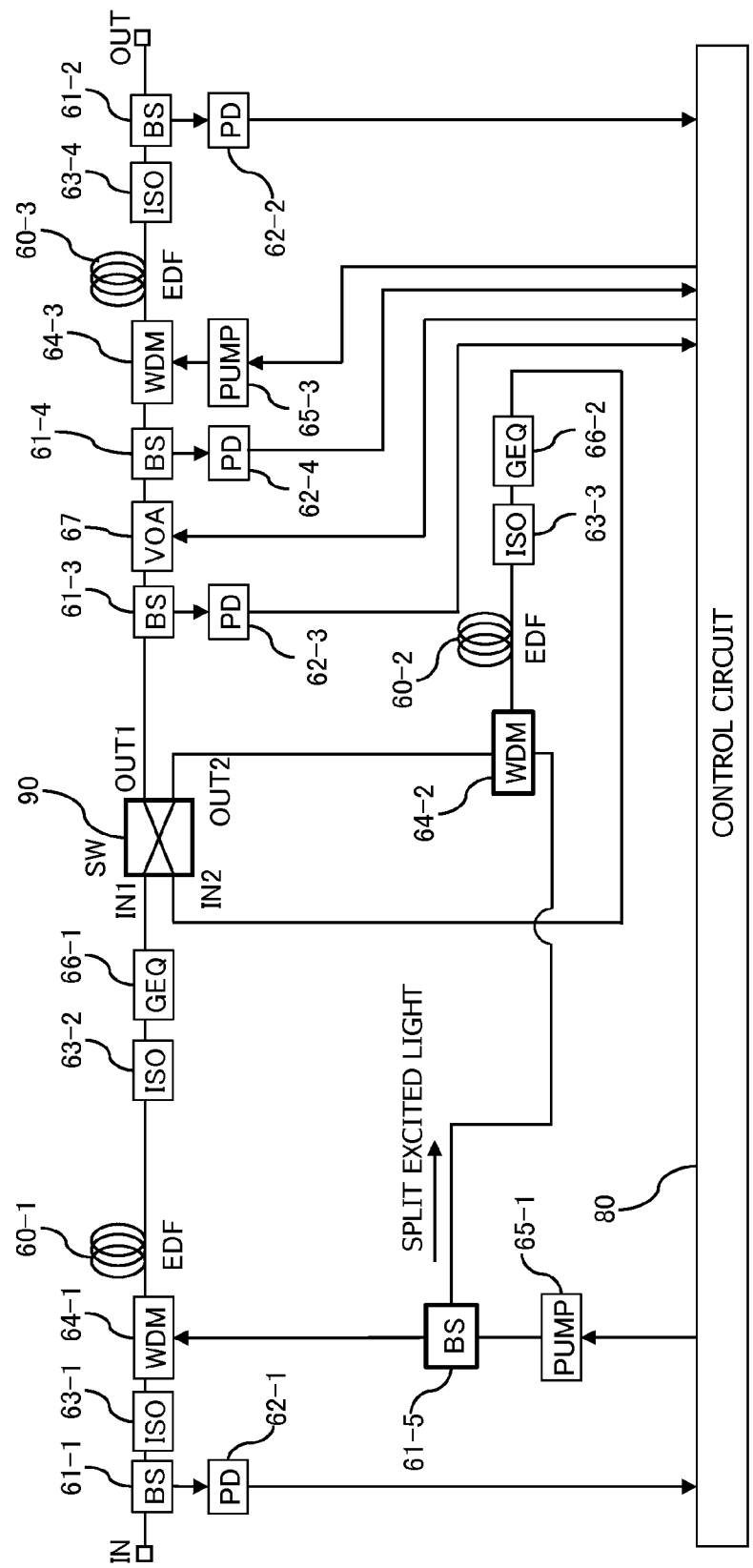
FIG. 24 is a block diagram illustrating a configuration example of a switchable optical amplifier (cross connection state) according to the fifth example.

Fifth Example: FIGS. 23 and 24

FIGS. 23 and 24 are block diagrams illustrating a configuration example of a switchable optical amplifier 13 according to a fifth example. FIG. 23 corresponds to a "low gain optical amplifier configuration" in which the AD optical switch 90 is controlled to be in the "semi-bar connection" state. FIG. 24 corresponds to a "high gain optical amplifier configuration" in which the AD optical switch 90 is controlled to be in the "cross connection" state.

In the above fourth example, the EDF 60-2 is "backward-excited" by the split excited light split by the BS 61-5. Alternatively, in the fifth example, the EDF 60-2 may be "forward-excited" by the split excited light, as illustrated in FIGS. 23 and 24.

That is, when one of the excited lights split by the BS 65-1 is input to the WDM coupler 64-2 disposed at the pre-stage of the EDF 60-2, the EDF 60-2 may be "forward-excited" by the split excited light.

In other words, the switchable optical amplifier 13 illustrated in FIGS. 23 and 24 corresponds to a configuration where the WDM coupler 64-4 at the post-stage of the EDF 60-1 is excluded from the configuration of the third example (FIGS. 19 and 20) and the BS 61-5 is added at the post-stage of the excitation light source 65-1.

Other configurations and operations are the same as the third example. The fifth example may obtain the same operation and effects as the third example. In addition, whether to use the residual excited light or the split excited light for the excited light to be emitted into the EDF 60-2 depends on extents of reduction of excited light power, reduction of the number of parts, improvement of NF characteristics, and so on as in the fourth example.

Figure 25:
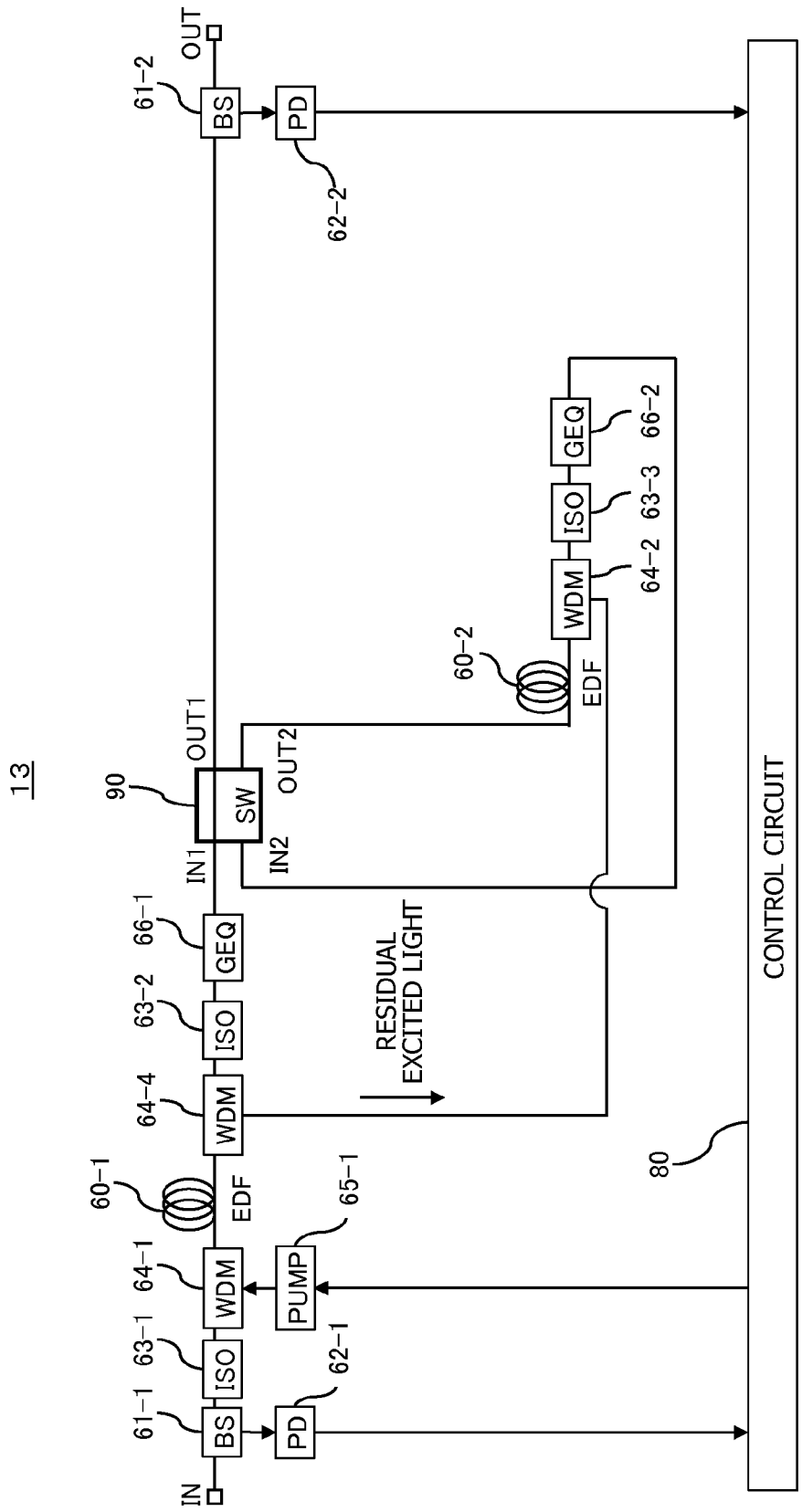
FIG. 25 is a block diagram illustrating a configuration example of a switchable optical amplifier (semi-bar connection state) according to a sixth example.
Figure 26:
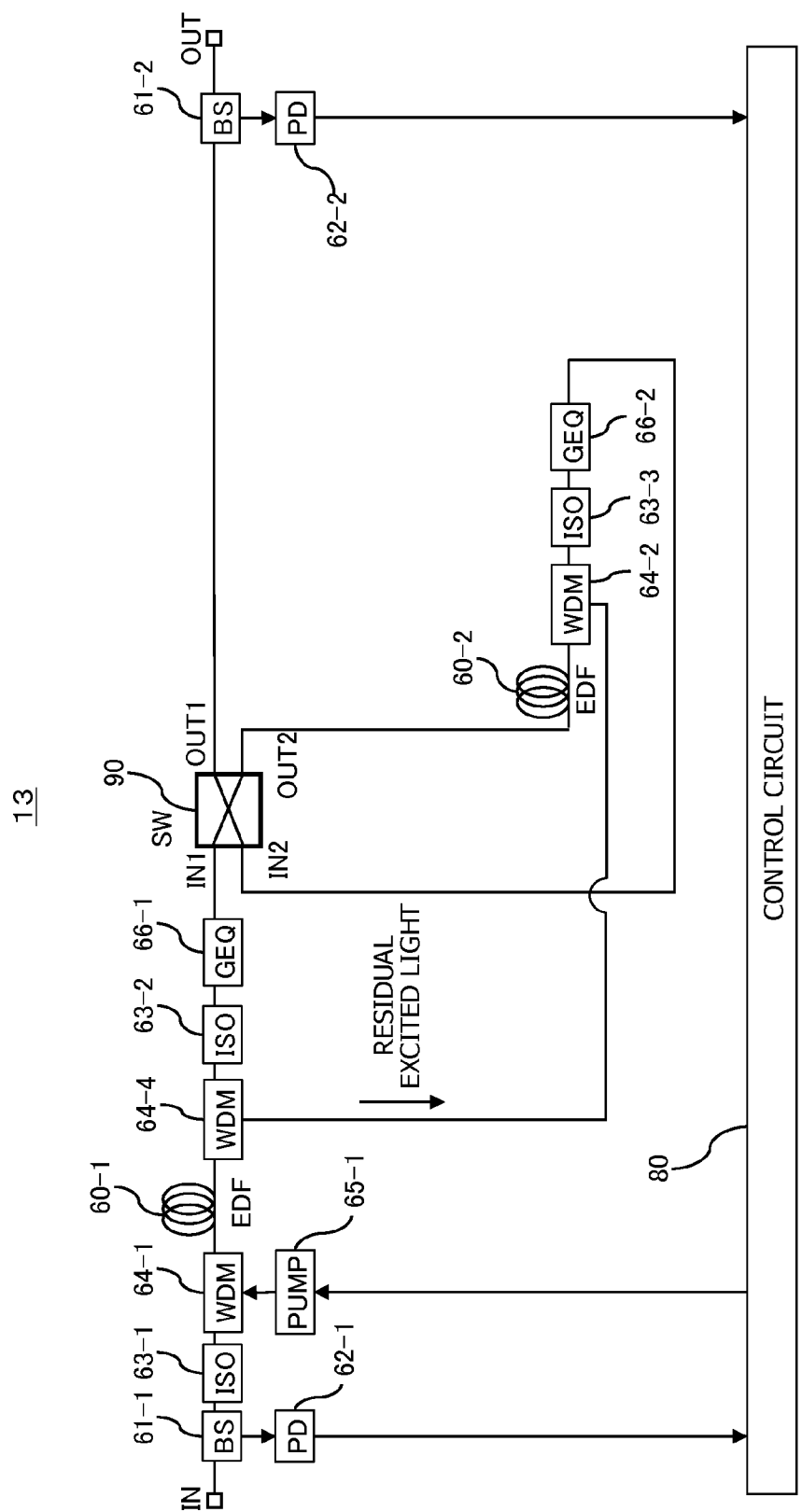
FIG. 26 is a block diagram illustrating a configuration example of a switchable optical amplifier (cross connection state) according to the sixth example.

Sixth Example: FIGS. 25 and 26

FIGS. 25 and 26 are block diagrams illustrating a configuration example of a switchable optical amplifier 13 according to a sixth example. FIG. 25 corresponds to a "low gain optical amplifier configuration" in which the AD optical switch 90 is controlled to be in the "semi-bar connection" state. FIG. 26 corresponds to a "high gain optical amplifier configuration" in which the AD optical switch 90 is controlled to be in the "cross connection" state.

The configuration of the switchable optical amplifier 13 illustrated in FIGS. 25 and 26 corresponds to a configuration where the EDF three-stage configuration of the first example illustrated in FIGS. 15 and 16 is modified to an EDF two-stage configuration. For example, in the configuration illustrated in FIGS. 25 and 26, the EDF 60-3, the excitation light source 65-3, the WDM coupler 64-3 and the ISO 63-4 are excluded from the configuration illustrated in FIGS. 15 and 16.

In addition, the VOA 67 is also excluded with the exclusion of the EDF 60-3 and the BS 61-3, the BS 61-4, the PD 62-3 and the PD 62-4 are also excluded with the exclusion of the VOA 67.

In the switchable optical amplifier 13 of the sixth example, when the AD optical switch 90 is controlled to be in the "semi-bar connection" state by the control circuit 80 as illustrated in FIG. 25, the EDF 60-2 is separated from the output optical path of the EDF 60-1.

Therefore, after being amplified by the EDF 60-1, the signal light input to the input port IN of the switchable optical amplifier 13 is input to the first input port IN1 of the AD optical switch 90 via the ISO 63-2 and the GEQ 66-1 and is then output to the first output port OUT1 thereof.

The signal light output from the first output port OUT1 of the AD optical switch 90 is output from the output port OUT of the switchable optical amplifier 13 via the BS 61-2.

In the meantime, when the AD optical switch 90 is controlled to be in the "cross connection" state by the control circuit 80 as illustrated in FIG. 26, after being amplified by the EDF 60-1, the signal light input to the input port IN of the switchable optical amplifier 13 is input to the first input port IN1 of the AD optical switch 90 and is then output to the second output port OUT2 thereof.

The signal light output from the second output port OUT2 of the AD optical switch 90 is input to the EDF 60-2. The EDF 60-2 is "backward-excited" by the residual excited light of the EDF 60-1, which is input from the WDM coupler 64-2, and amplifies the input signal light.

The signal light amplified by the EDF 60-2 is input to the GEQ 66-2 via the WDM coupler 64-2 and the ISO 63-3 and, with its gain wavelength characteristic compensated by the GEQ 66-2, input to the second input port IN2 of the AD optical switch 90.

Since the AD optical switch 90 is in the "cross connection" state, the signal light input to the second input port IN2 of the AD optical switch 90 is output to the first output port OUT1 thereof and is then output from the output port OUT of the switchable optical amplifier 13 via the BS 61-2.

Based on the result of monitoring of the signal light power by the PD 62-1 and the PD 62-2, the control circuit 80 performs the overall AGC (Automatic Gain Control) for the switchable optical amplifier 13.

Since this AGC is performed for the switchable optical amplifier 13 as a whole, it is performed for either the "low gain optical amplifier configuration" in the "semi-bar connection" state or the "high gain optical amplifier configuration" in the "cross connection" state.

In other words, the overall AGC of the switchable optical amplifier 13 corresponds to a control to make the gain of one EDF 60-1 constant for the "low gain optical amplifier configuration," while corresponding to a control to make the sum of gains of two EDFs 60-1 and 60-2 constant for the "high gain optical amplifier configuration."

Illustratively, the control circuit 80 calculates the current overall gain of the switchable optical amplifier 13 based on the input light power of the optical amplifier 13, which is monitored by the PD 62-1, and the output light power of the optical amplifier 13, which is monitored by the PD 62-2. The control circuit 80 controls the excited light power of the excitation light source 65-1 such that the calculated overall gain reaches a target gain.

In addition to the AGC or as an alternative to the AGC, the control circuit 80 performs ALC (Automatic Level Control) to make the output light power (level) of the switchable optical amplifier 13 constant. Like the AGC, the ALC is performed for either the "low gain optical amplifier configuration" in the "semi-bar connection" state or the "high gain optical amplifier configuration" in the "cross connection" state.

For example, the control circuit 80 controls the excited light power of the excitation light source 65-1 such that the current output light power (level) of the switchable optical amplifier 13 monitored by the PD 62-2 reaches target power (level).

The switchable optical amplifier 13 of the sixth example including no third EDF 60-3 provides a lower gain and a shorter amplified signal light reachable distance than the switchable optical amplifiers 13 of the first to fifth examples.

Therefore, the switchable optical amplifier 13 of the sixth example may be applied to a transmission section (called "span") which may correspond to a short signal light transmission distance.

The sixth example may exhibit the same operation and effects as the first example. For example, since the reduction of the number of amplifier menus may be achieved, it is possible to achieve reduction of costs of the optical transmitter 10 and reduction of costs incurred for maintenance and management of the optical transmitter 10.

In addition, since the excited light of the excitation light source 65-1 is used in common for the EDF 60-1 and the EDF 60-2, it is possible to reduce the number of excited lights in the optical amplifier 13 and achieve compactness and low costs of the optical amplifier 13 and further compactness and low costs of the optical transmitter 10.

In addition, since the excited light is used in common for the EDF 60-1 and the EDF 60-2, even in situations where the excited light may not be individually selectively stopped in the "low gain optical amplifier configuration," it is possible to prevent the EDF 60-2 from being oscillated, according to the "semi-bar connection" state.

In addition, since the EDF 60-2 is "backward-excited" by the residual excited light of the EDF 60-1, its gain is less likely to be saturated than "forward-excitation." In addition, an intensity noise of the excited light is less likely to be superimposed on the signal light than "forward-excitation."

In addition, in the "backward-excitation," since the excited light propagates in the opposite direction to the signal light, even when a noise component or the like is contained in the excited light of the EDF 60-2, it is possible to suppress any interference to the signal light.

For example, one WDM coupler 64-4 may obtain an insufficient capability (called "crosstalk") to separate the signal light wavelength from the excited light wavelength and a signal light wavelength component may be contained in the residual excited light for the EDF 60-2.

Even in this case, in the EDF 60-2, since the excited light propagates in the opposite direction to the signal light, it is possible to prevent the signal light wavelength component remaining in the excited light from interfering with the signal light to be amplified.

Figure 27:
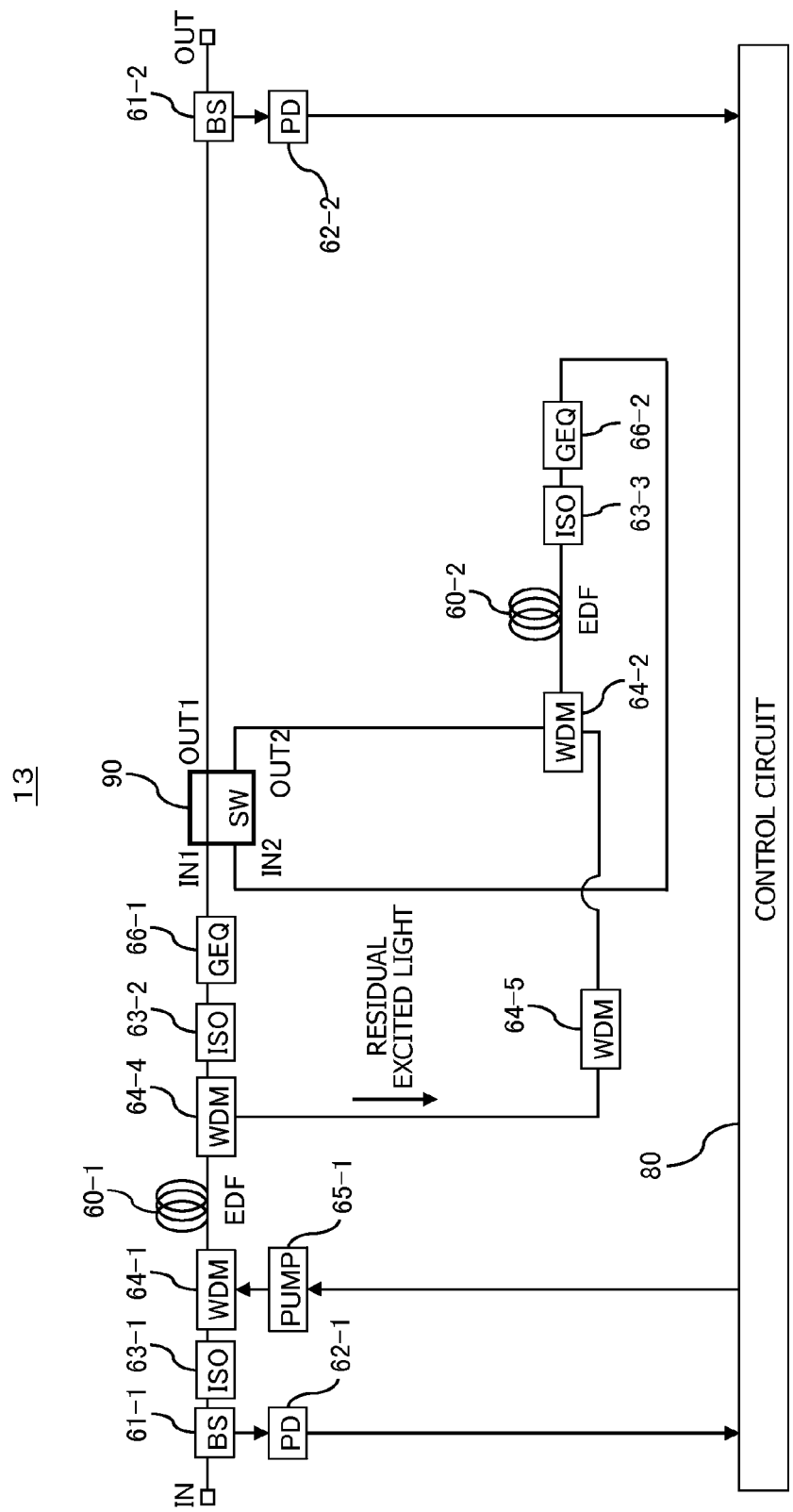
FIG. 27 is a block diagram illustrating a configuration example of a switchable optical amplifier (semi-bar connection state) according to a seventh example.
Figure 28:
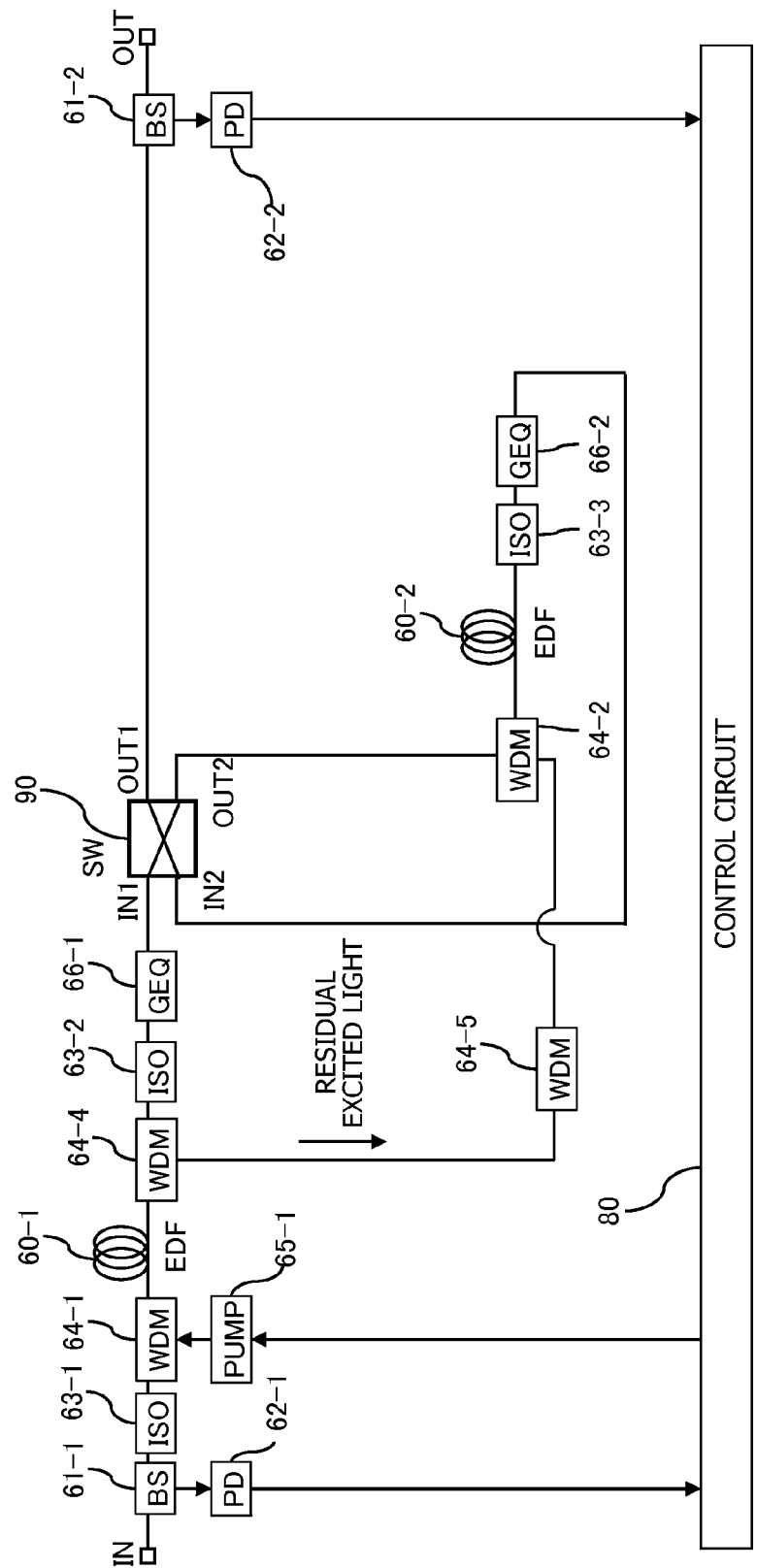
FIG. 28 is a block diagram illustrating a configuration example of a switchable optical amplifier (cross connection state) according to the seventh example.

Seventh Example: FIGS. 27 and 28

FIGS. 27 and 28 are block diagrams illustrating a configuration example of a switchable optical amplifier 13 according to a seventh example. FIG. 27 corresponds to a "low gain optical amplifier configuration" in which the AD optical switch 90 is controlled to be in the "semi-bar connection" state. FIG. 28 corresponds to a "high gain optical amplifier configuration" in which the AD optical switch 90 is controlled to be in the "cross connection" state.

The switchable optical amplifier 13 illustrated in FIGS. 27 and 28 corresponds to a configuration where the WDM coupler 64-5 is added to the configuration illustrated in the sixth example (FIGS. 25 and 26), as in the second example (FIGS. 17 and 18).

For example, the WDM coupler 64-5 is disposed on the optical path between the WDM coupler 64-4 at the post-stage of the EDF 60-1 and the WDM coupler 64-2 at the pre-stage of the EDF 60-2.

When the one WDM coupler 64-4 may not obtain the sufficient capability to separate the signal light wavelength from the excited light wavelength, the WDM coupler 64-5 may be complementarily used to increase the wavelength separation capability, as described in the second example.

Thus, since the signal light wavelength component which may be contained in the residual excited light may be suppressed, it is possible to prevent the signal light wavelength component remaining in the excited light from interfering with the signal light to be amplified by the EDF 60-2. Therefore, it is possible to improve the NF of the signal light to be amplified by the EDF 60-2. Other configurations and operations are the same as the sixth example.

Figure 29:
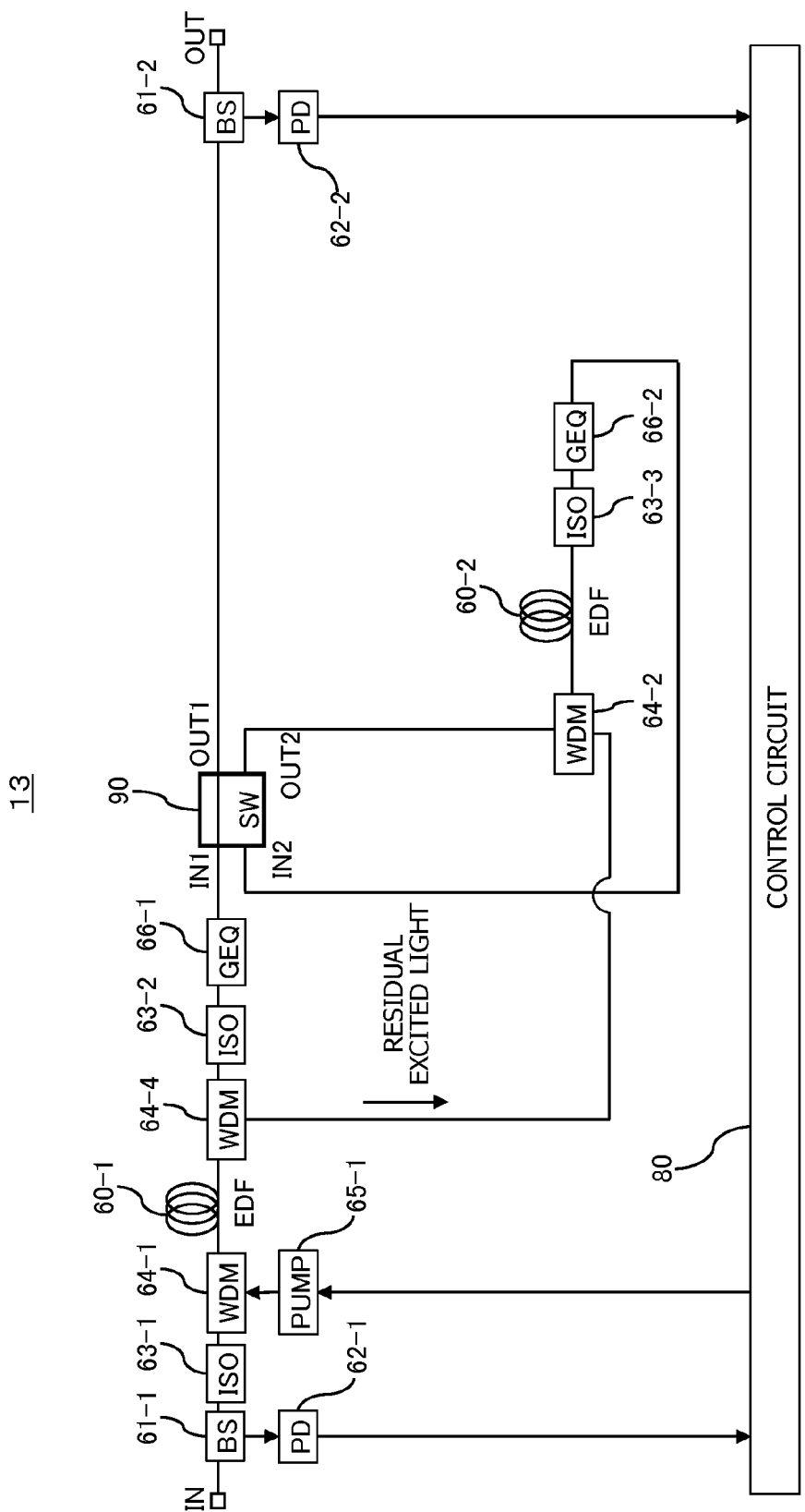
FIG. 29 is a block diagram illustrating a configuration example of a switchable optical amplifier (semi-bar connection state) according to an eighth example.
Figure 30:
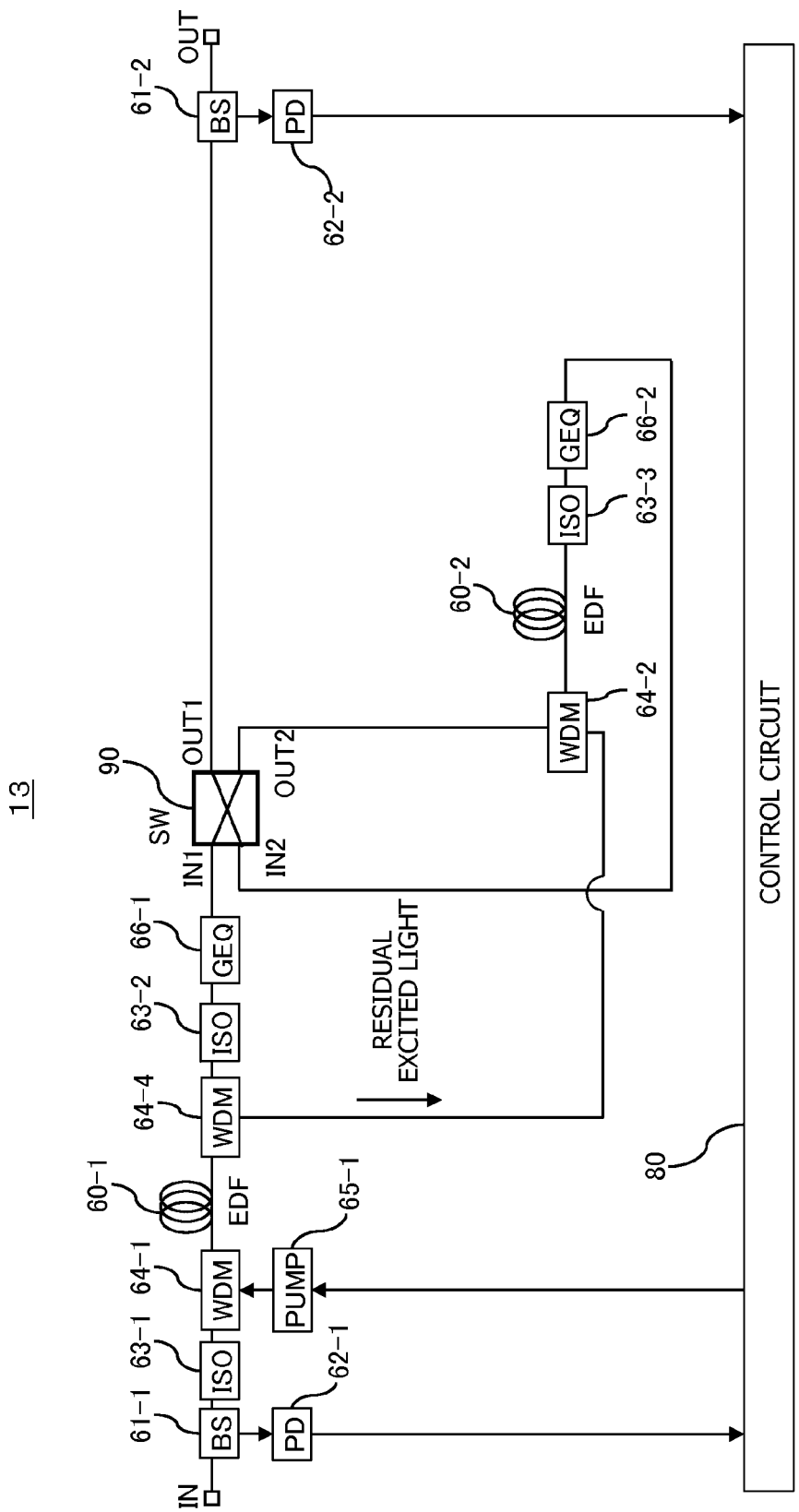
FIG. 30 is a block diagram illustrating a configuration example of a switchable optical amplifier (cross connection state) according to the eighth example.

Eighth Example: FIGS. 29 and 30

FIGS. 29 and 30 are block diagrams illustrating a configuration example of a switchable optical amplifier 13 according to an eighth example. FIG. 29 corresponds to a "low gain optical amplifier configuration" in which the AD optical switch 90 is controlled to be in the "semi-bar connection" state. FIG. 30 corresponds to a "high gain optical amplifier configuration" in which the AD optical switch 90 is controlled to be in the "cross connection" state.

It was assumed in the above seventh example that the one WDM coupler 64-4 may not obtain the sufficient capability to separate the signal light wavelength from the excited light wavelength. However, if the one WDM coupler 64-4 may obtain the sufficient wavelength separation capability, the WDM coupler 64-5 may not be disposed as illustrated in FIGS. 29 and 30, like the third example. Other configurations and operations are the same as the seventh example.

Figure 31:
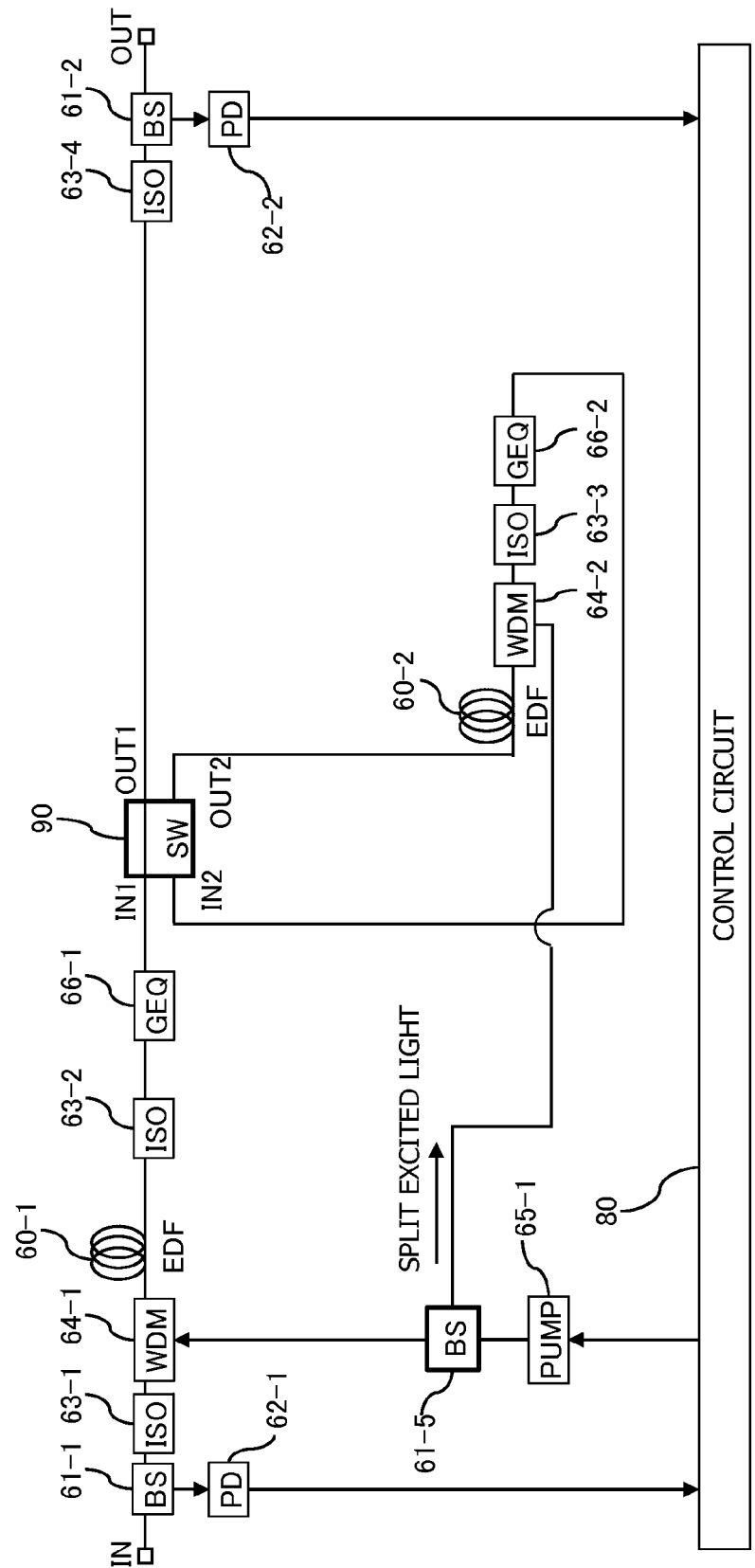
FIG. 31 is a block diagram illustrating a configuration example of a switchable optical amplifier (semi-bar connection state) according to a ninth example.
Figure 32:
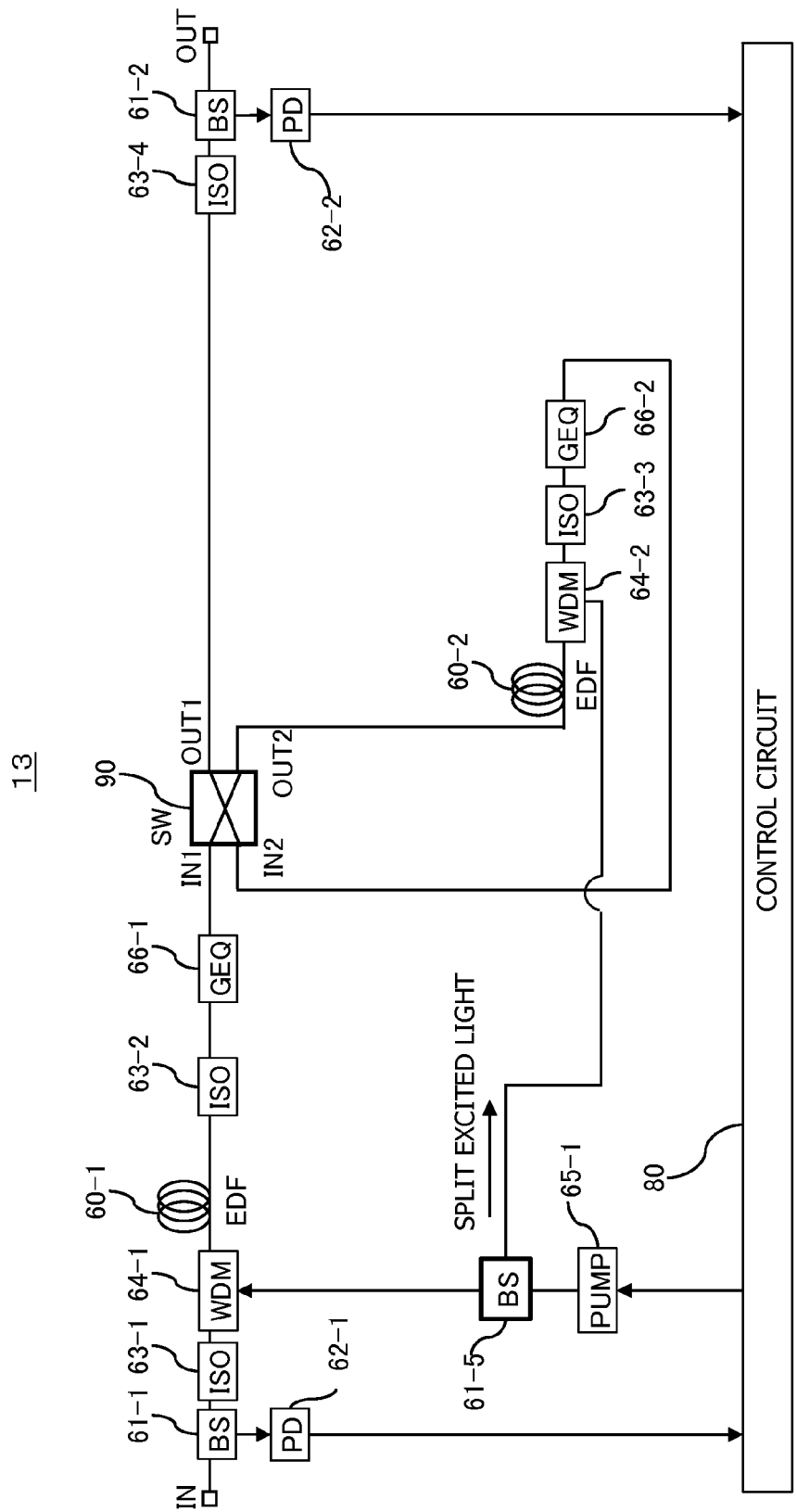
FIG. 32 is a block diagram illustrating a configuration example of a switchable optical amplifier (cross connection state) according to the ninth example.

Ninth Example: FIGS. 31 and 32

FIGS. 31 and 32 are block diagrams illustrating a configuration example of a switchable optical amplifier 13 according to a ninth example. FIG. 31 corresponds to a "low gain optical amplifier configuration" in which the AD optical switch 90 is controlled to be in the "semi-bar connection" state. FIG. 32 corresponds to a "high gain optical amplifier configuration" in which the AD optical switch 90 is controlled to be in the "cross connection" state.

In the above sixth to eighth examples (FIGS. 25 to 30), the configuration example of emitting the residual excited light included in the output light of the EDF 60-1 to the EDF 60-2 has been described as one example of the configuration of using the excited light of the excitation light source 65-1 in common for the EDF 60-1 and the EDF 60-2.

However, the configuration of using the excited light in common is not limited thereto but may be a configuration of splitting the excited light of the excitation light source 65-1 by means of the BS 61-5 and emitting the split lights into the EDFs 60-1 and 60-2, respectively, as illustrated in FIG. 3.

For example, as illustrated in FIGS. 31 and 32, the BS 61-5 is disposed at the post-stage of the excitation light source 61-5 and the excited lights split by the BS 61-5 are respectively emitted into the WDM coupler 64-1 at the pre-stage of the EDF 60-1 and the WDM coupler 64-2 at the post-stage of the EDF 60-2.

In other words, the EDF 60-1 is "forward-excited" by one of the split excited lights of the excitation light source 61-5 and the EDF 60-2 is "backward-excited" by the other of the split excited lights of the excitation light source 61-5.

In other words, the switchable optical amplifier 13 illustrated in FIGS. 31 and 32 corresponds to a configuration where the WDM coupler 64-4 at the post-stage of the EDF 60-1 is excluded from the configuration of the sixth example (FIGS. 25 and 26) and the BS 61-5 is added at the post-stage of the excitation light source 65-1.

Other configurations and operations are the same as the sixth Example. The ninth example may obtain the same operation and effects as the sixth example. In addition, whether to use the residual excited light or the split excited light for the excited light to be emitted into the EDF 60-2 depends on extents of reduction of excited light power, reduction of the number of parts, improvement of NF characteristics, and so on.

Figure 33:
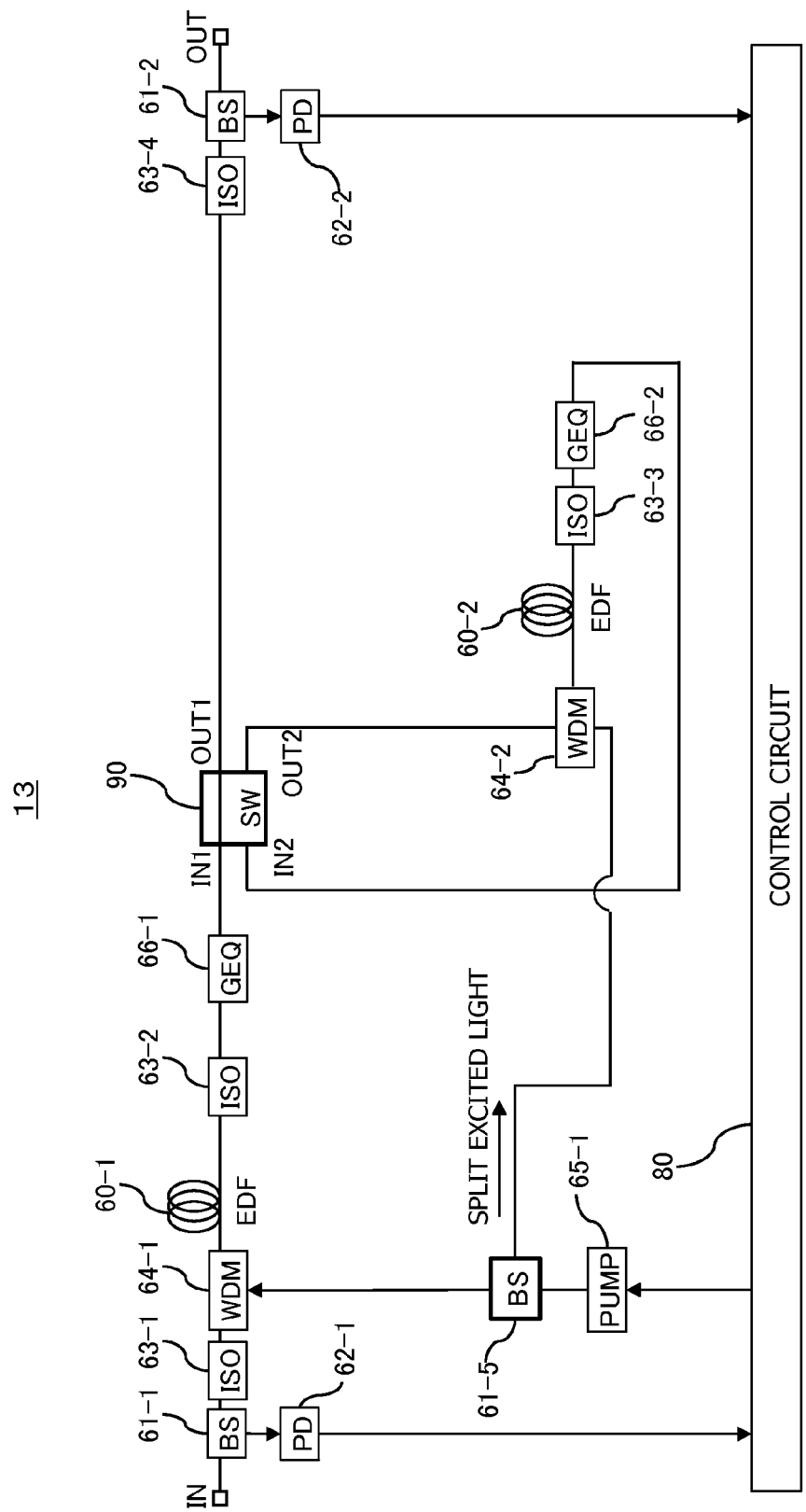
FIG. 33 is a block diagram illustrating a configuration example of a switchable optical amplifier (semi-bar connection state) according to a tenth example.
Figure 34:
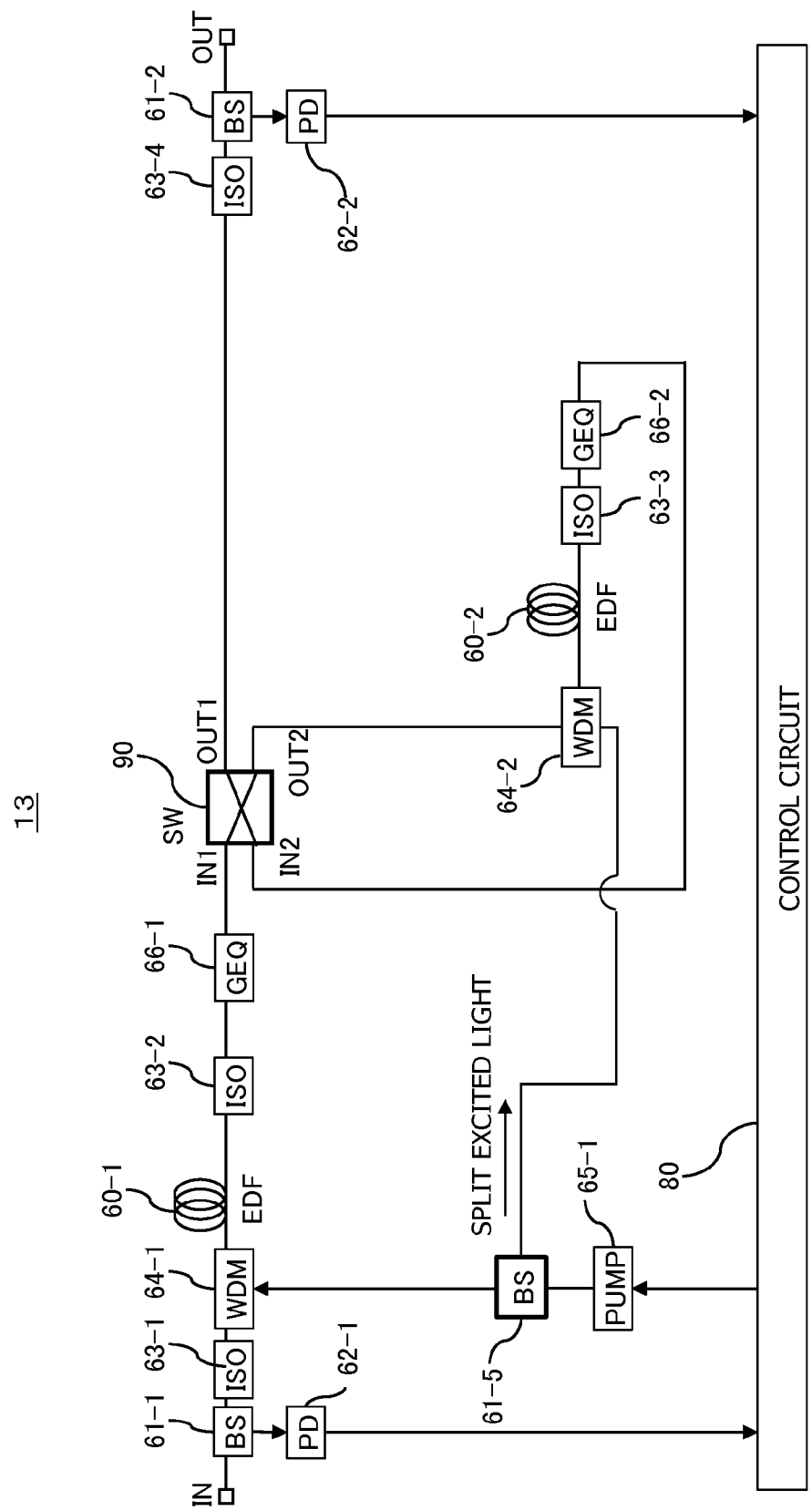
FIG. 34 is a block diagram illustrating a configuration example of a switchable optical amplifier (cross connection state) according to the tenth example.

Tenth Example: FIGS. 33 and 34

FIGS. 33 and 34 are block diagrams illustrating a configuration example of a switchable optical amplifier 13 according to a tenth example. FIG. 33 corresponds to a "low gain optical amplifier configuration" in which the AD optical switch 90 is controlled to be in the "semi-bar connection" state. FIG. 34 corresponds to a "high gain optical amplifier configuration" in which the AD optical switch 90 is controlled to be in the "cross connection" state.

In the above ninth example, the EDF 60-2 is "backward-excited" by the split excited light split by the BS 61-5. Alternatively, in the tenth example, the EDF 60-2 may be "forward-excited" by the split excited light, as illustrated in FIGS. 33 and 34, like the fifth example.

That is, when one of the excited lights split by the BS 65-1 is input to the WDM coupler 64-2 disposed at the pre-stage of the EDF 60-2, the EDF 60-2 is "forward-excited" by the split excited light.

In other words, the switchable optical amplifier 13 illustrated in FIGS. 33 and 34 corresponds to a configuration where the WDM coupler 64-4 at the post-stage of the EDF 60-1 is excluded from the configuration of the sixth example (FIGS. 25 and 26) and the BS 61-5 is added at the post-stage of the excitation light source 65-1.

Other configurations and operations are the same as the sixth example. The tenth example may obtain the same operation and effects as the sixth example. In addition, whether to use the residual excited light or the split excited light for the excited light to be emitted into the EDF 60-2 depends on extents of reduction of excited light power, reduction of the number of parts, improvement of NF characteristics, and so on.

Figure 35:
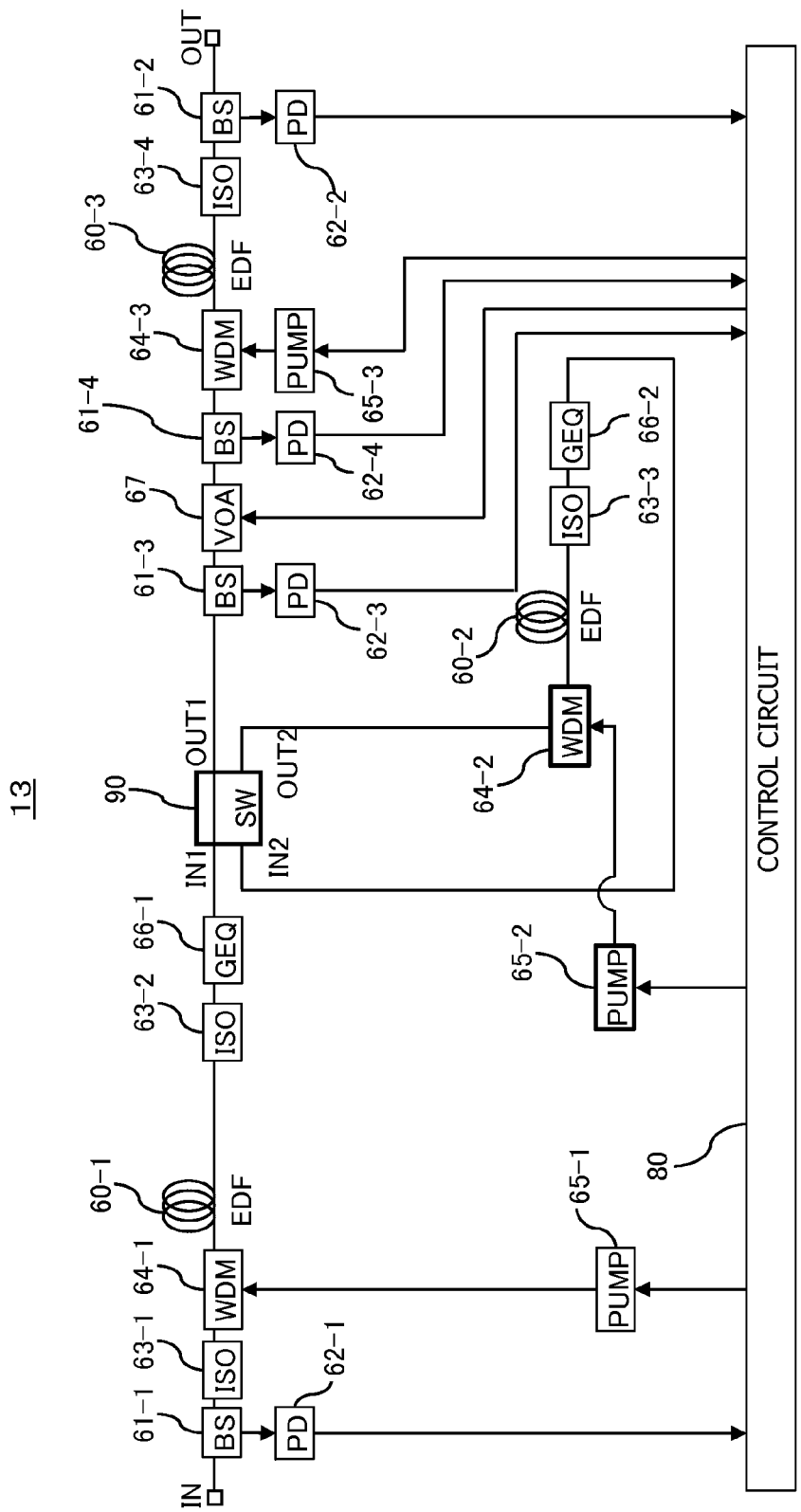
FIG. 35 is a block diagram illustrating a configuration example of a switchable optical amplifier (semi-bar connection state) according to an eleventh example.
Figure 36:
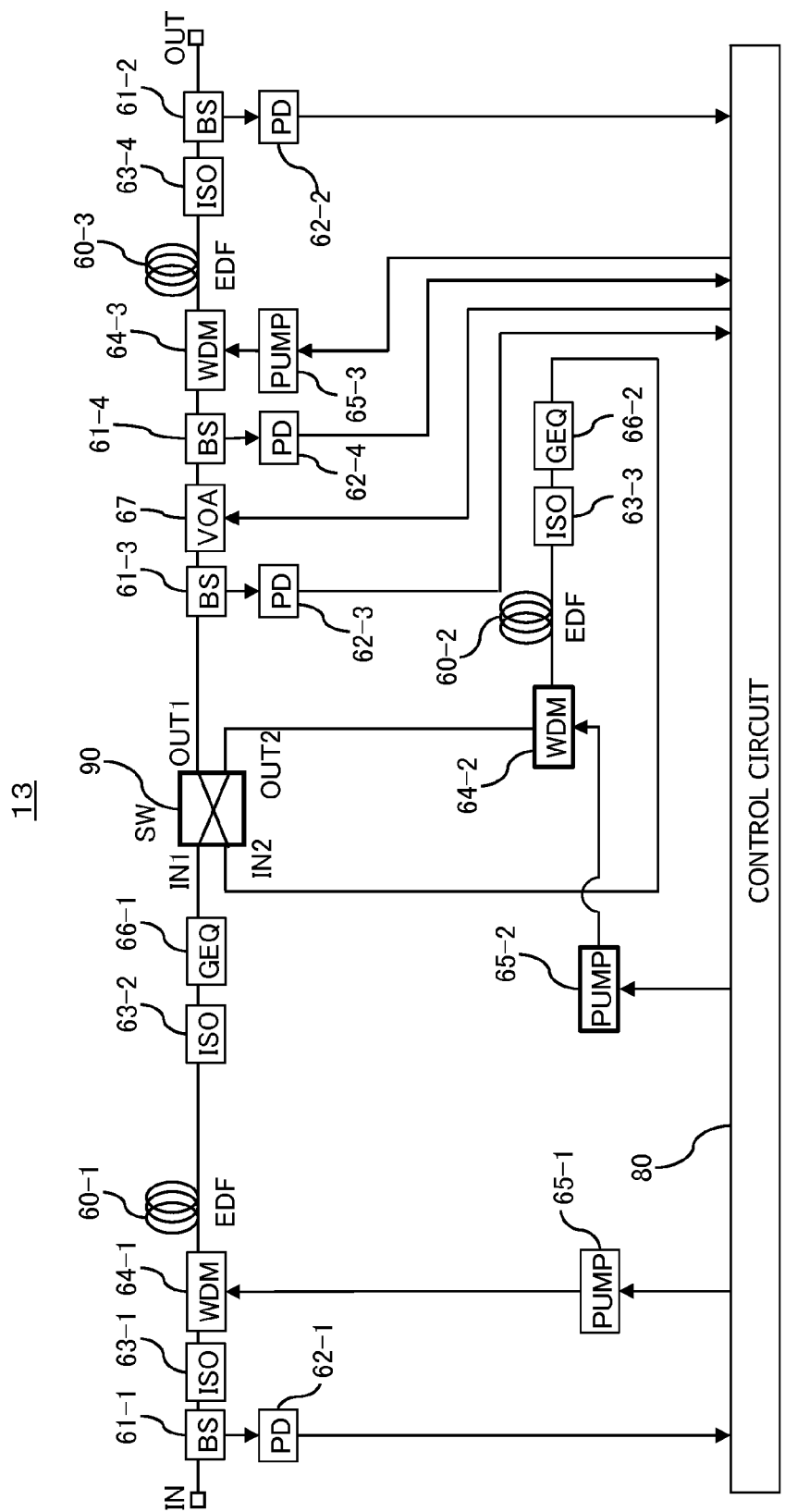
FIG. 36 is a block diagram illustrating a configuration example of a switchable optical amplifier (cross connection state) according to the eleventh example.

Eleventh Example: FIGS. 35 and 36

FIGS. 35 and 36 are block diagrams illustrating a configuration example of a switchable optical amplifier 13 according to an eleventh example. FIG. 35 corresponds to a "low gain optical amplifier configuration" in which the AD optical switch 90 is controlled to be in the "semi-bar connection" state. FIG. 36 corresponds to a "high gain optical amplifier configuration" in which the AD optical switch 90 is controlled to be in the "cross connection" state.

The switchable optical amplifier 13 illustrated in FIGS. 35 and 36 corresponds to a configuration where the excitation light sources 65-1 and 65-2 are respectively disposed for the EDFs 60-1 and 60-2 in the configuration of, for example, the third or fifth example (FIGS. 19 and 20 or FIGS. 23 and 24).

For example, the excited light of the excitation light source 65-1 is emitted into the EDF 60-1 by the WDM coupler 64-1 at the pre-stage of the EDF 60-1 and the excited light of the excitation light source 65-2 is emitted into the EDF 60-2 by the WDM coupler 64-2 at the pre-stage of the EDF 60-2.

In other words, in the eleventh example, the EDFs 60-1 and 60-2 are "forward-excited" by the respective excitation light sources 65-1 and 65-2. However, the EDF 60-2 may be "backward-excited," like the first or fourth example (FIGS. 15 and 16 or FIGS. 21 and 22).

For example, in FIGS. 35 and 36, the WDM coupler 64-2 for emitting the excited light of the excitation light source 65-2 into the EDF 60-2 may be disposed at the post-stage of the EDF 60-2.

According to the eleventh example, the excited light power to the EDFs 60-1 and 60-2 (in other words, the gains of the EDFs 60-1 and 60-2) may be individually selectively controlled by the control circuit 80.

Therefore, as the AD optical switch 90 is controlled to be in the "semi-bar connection" state, the control circuit 80 of the eleventh example stops the driving of the excitation light source 65-2 and accordingly stops the driving of the EDF 60-2.

In other words, only when the AD optical switch 90 is controlled to be in the "cross connection" state and amplification by the EDF 60-2 is effectively controlled, the control circuit 80 drives the EDF 60-2 by driving the excitation light source 65-2.

In this case, even if an optical path passing through the AD optical switch 90 and the EDF 60-2 forms a closed loop circuit, occurrence of oscillation may be avoided since the driving of the EDF 60-2 may be stopped.

Therefore, under the condition where the driving of the excitation light source 65-2 is stopped when the EDF 60-2 is not used, the AD optical switch 90 may be replaced with the cross/bar type 2×2 optical switch 102 illustrated in FIGS. 7A and 7B and FIGS. 8A and 8B.

When one or both of the above-mentioned AGC and ALC are performed, the control circuit 80 controls the excitation light sources 65-1 to 65-3 corresponding respectively to the EDFs 60-1 to 60-3. Other configurations and operations are the same as the third and fifth examples or the first and fourth examples.

Figure 37:
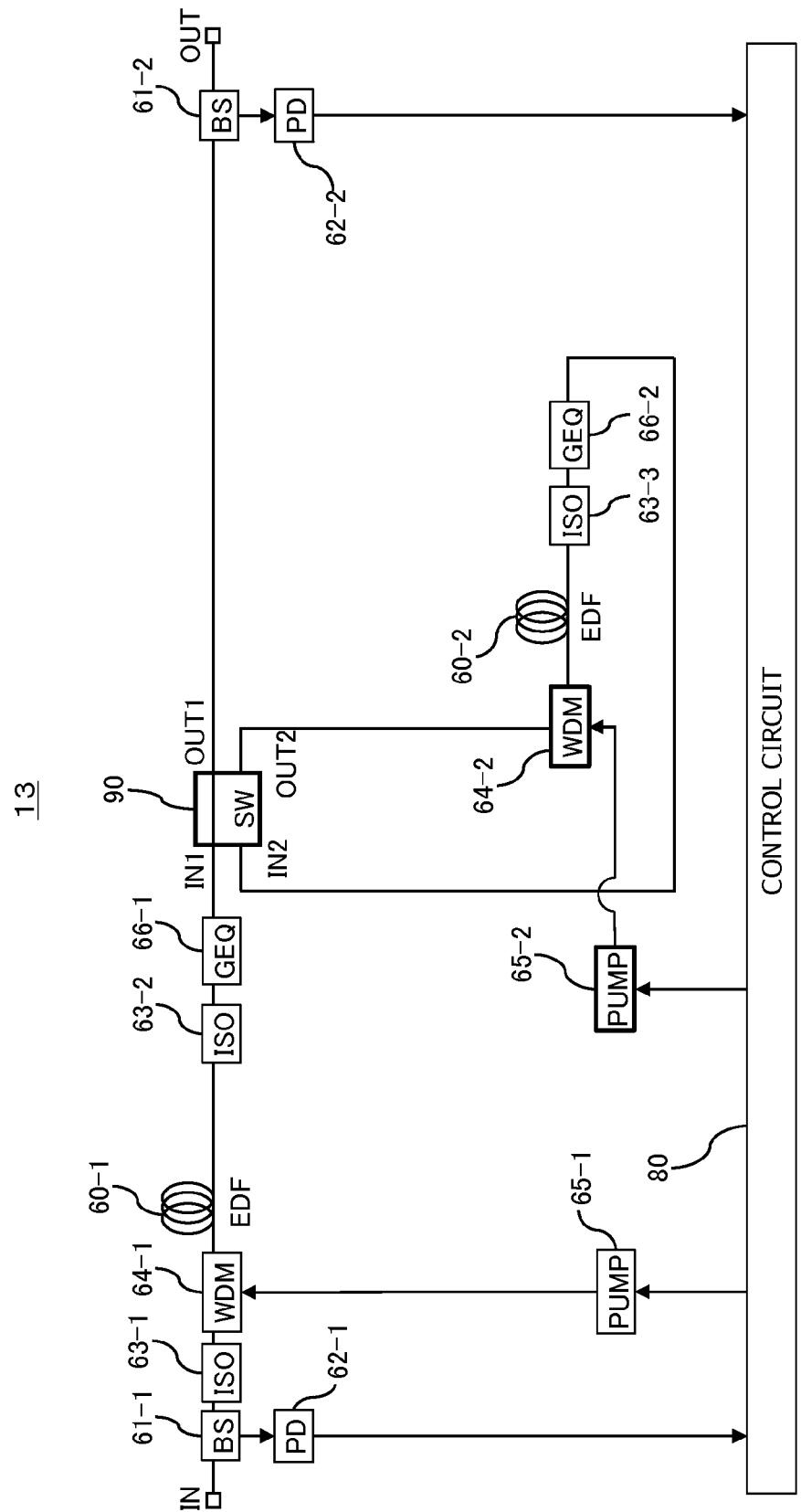
FIG. 37 is a block diagram illustrating a configuration example of a switchable optical amplifier (semi-bar connection state) according to a twelfth example.
Figure 38:
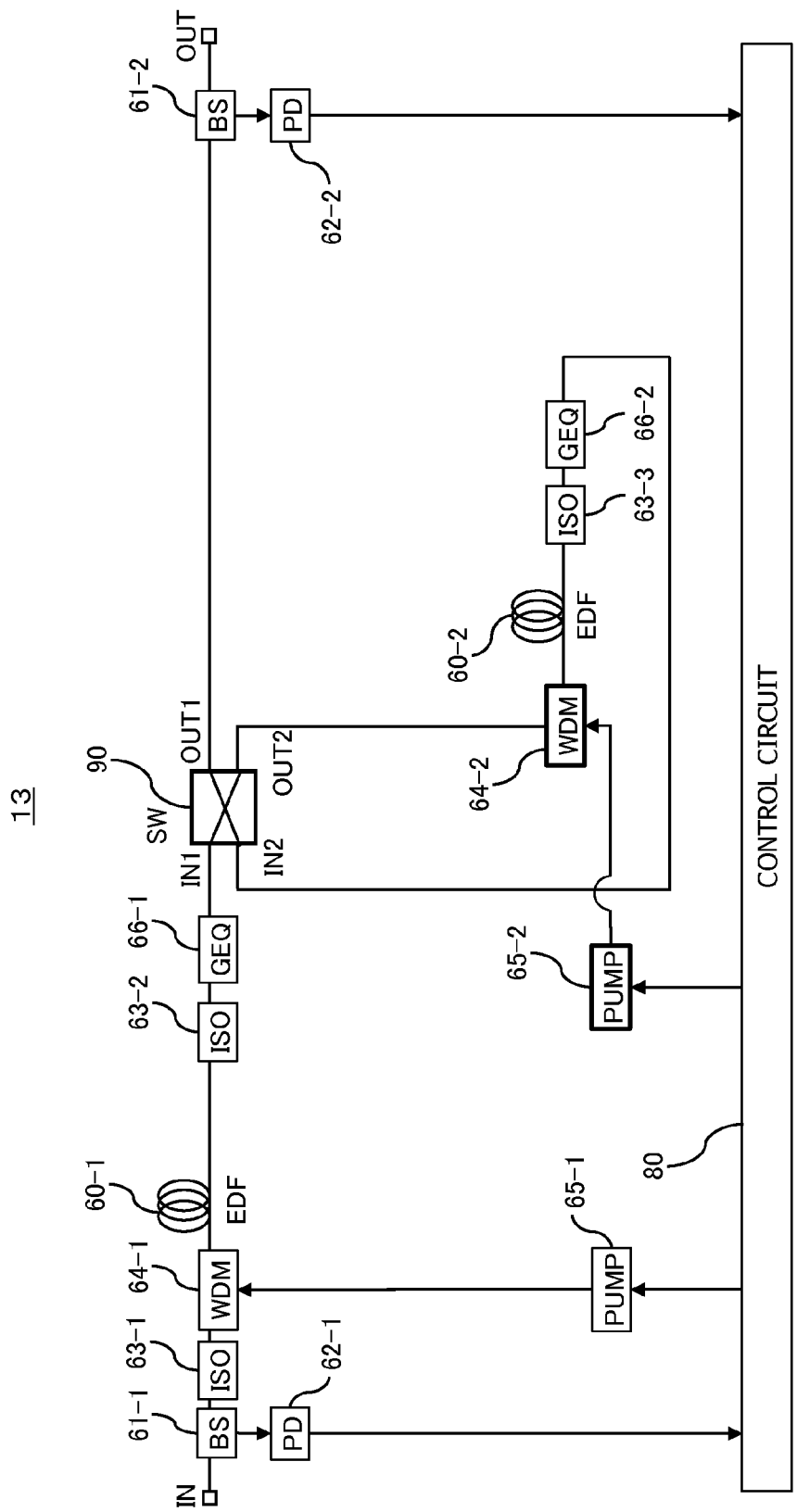
FIG. 38 is a block diagram illustrating a configuration example of a switchable optical amplifier (cross connection state) according to the twelfth example.

Twelfth Example: FIGS. 37 and 38

FIGS. 37 and 38 are block diagrams illustrating a configuration example of a switchable optical amplifier 13 according to a twelfth example. FIG. 37 corresponds to a "low gain optical amplifier configuration" in which the AD optical switch 90 is controlled to be in the "semi-bar connection" state. FIG. 38 corresponds to a "high gain optical amplifier configuration" in which the AD optical switch 90 is controlled to be in the "cross connection" state.

The configuration illustrated in FIGS. 37 and 38 corresponds to a two-stage EDF configuration where the EDF 60-3 is not included, like the sixth to tenth examples. In addition, the configuration illustrated in FIGS. 37 and 38 corresponds to a configuration where the excitation light sources 65-1 and 65-2 are respectively disposed for the EDFs 60-1 and 60-2 in the configuration illustrated in the eighth or tenth example (FIGS. 29 and 30 or FIGS. 33 and 34), like the eleventh example.

For example, the excited light of the excitation light source 65-1 is emitted into the EDF 60-1 by the WDM coupler 64-1 at the pre-stage of the EDF 60-1 and the excited light of the excitation light source 65-2 is emitted into the EDF 60-2 by the WDM coupler 64-2 at the pre-stage of the EDF 60-2.

In other words, in the twelfth example, the EDFs 60-1 and 60-2 are "forward-excited" by the respective excitation light sources 65-1 and 65-2. However, the EDF 60-2 may be "backward-excited," as in the sixth or ninth example (FIGS. 25 and 26 or FIGS. 31 and 32).

For example, in FIGS. 37 and 38, the WDM coupler 64-2 for emitting the excited light of the excitation light source 65-2 into the EDF 60-2 may be disposed at the post-stage of the EDF 60-2.

According to the twelfth example, the excited light power to the EDFs 60-1 and 60-2 (in other words, the gains of the EDFs 60-1 and 60-2) may be individually selectively controlled by the control circuit 80 as in the eleventh example.

Therefore, as the AD optical switch 90 is controlled to be in the "semi-bar connection" state, the control circuit 80 of the twelfth example stops the driving of the excitation light source 65-2 and accordingly stops the driving of the EDF 60-2.

In other words, only when the AD optical switch 90 is controlled to be in the "cross connection" state and amplification by the EDF 60-2 is effectively controlled, the control circuit 80 drives the EDF 60-2 by driving the excitation light source 65-2.

In this case, even if an optical path passing through the AD optical switch 90 and the EDF 60-2 forms a closed loop circuit, occurrence of oscillation may be avoided since the driving of the EDF 60-2 may be stopped.

Therefore, even in the twelfth example, like the eleventh example, under the condition where the driving of the excitation light source 65-2 is stopped when the EDF 60-2 is not used, the AD optical switch 90 may be replaced with the cross/bar type 2×2 optical switch 102 illustrated in FIGS. 6 and 7.

When one or both of the above-mentioned AGC and ALC are performed, the control circuit 80 controls the excitation light sources 65-1 and 65-2 corresponding respectively to the EDFs 60-1 and 60-2. Other configurations and operations are the same as the eighth and tenth examples or the sixth and ninth examples.

Others

In the above-described embodiment and examples, the applications of the AD optical switch 90 have been described as one example of the configuration to allow an optical path passing through the EDF 60-2 to avoid from forming a closed loop circuit.

That is, in the above-described examples, formation of an optical closed loop circuit including the EDF 60-2 may be avoided by cutting off optical conduction between the second output port OUT2 and second input port IN2 of the AD optical switch 90 according to the "semi-bar connection" of the AD optical switch 90.

However, as long as the formation of the optical closed loop circuit including the EDF 60-2 may be avoided, other configurations or devices (for the sake of convenience, called "optical cut-off devices") may be applied to the switchable optical amplifier 13.

Figure 39A:
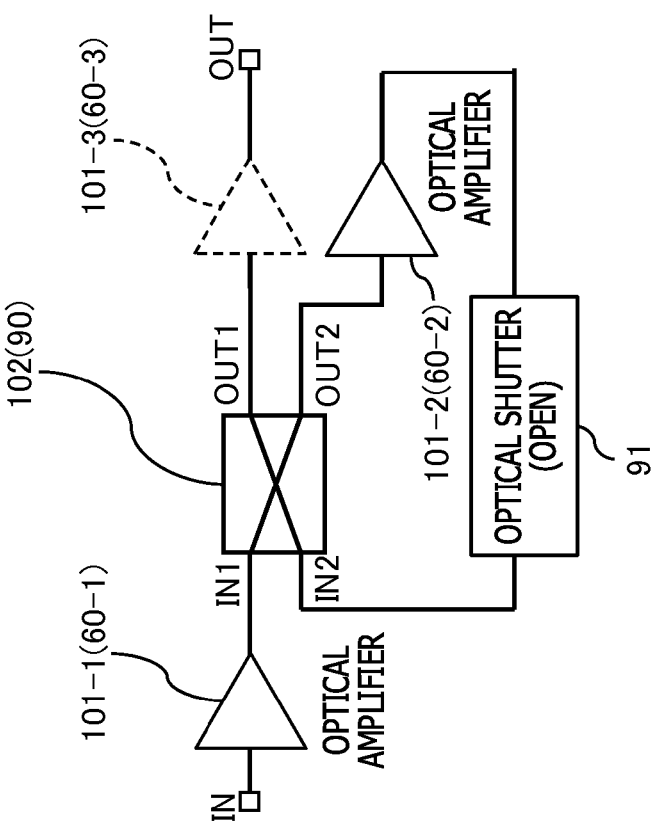
FIG. 39A is a block diagram illustrating a configuration example of a switchable optical amplifier according to a modification of FIG. 10, where the 2×2 optical switch is in a bar connection state.
Figure 39B:
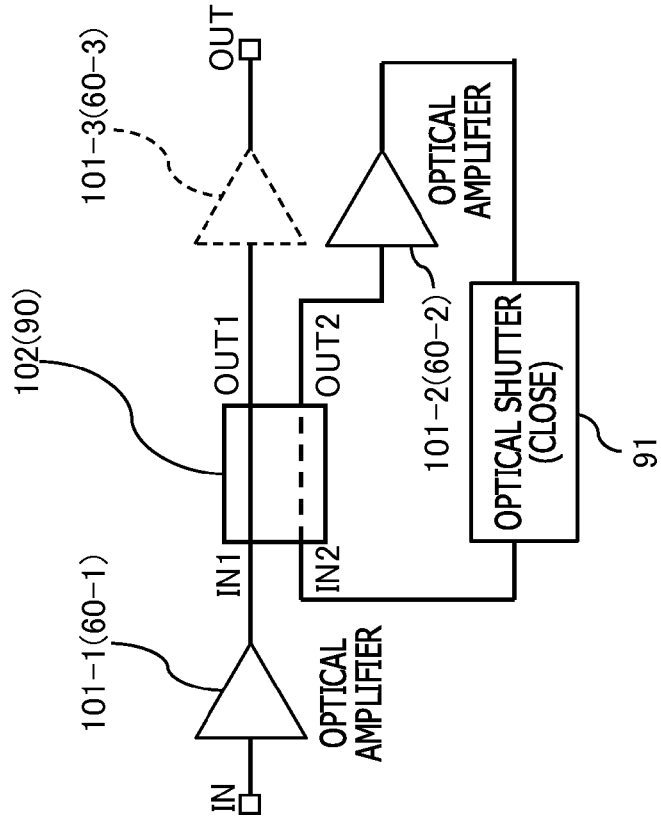
FIG. 39B is a block diagram illustrating a configuration example of a switchable optical amplifier according to a modification of FIG. 10, where the 2×2 optical switch is in a cross connection state.

For example, as illustrated in FIGS. 39A and 39B, an optical shutter 91 as one example of the optical cut-off devices is disposed on the optical path passing through the EDF 60-2 (a second optical path). When the optical shutter 91 is disposed, the AD optical switch 90 may be replaced with the cross/bar type 2×2 optical switch 102 illustrated in FIGS. 7A and 7B and FIGS. 8A and 8B.

In the "low gain optical amplifier configuration" in which the EDF 60-2 is not used, the optical shutter 91 is "closed" to cut off light propagating through the optical path passing through the EDF 60-2.

For example, as illustrated in FIG. 39A, when the optical switch 102 or 90 is controlled to be in the "bar connection" state (or "semi-bar connection" state), the optical shutter 91 is controlled to be in the "closed" state. Therefore, the formation of the optical closed loop circuit including the EDF 60-2 may be avoided.

In the meantime, in the "high gain optical amplifier configuration" in which the EDF 60-2 is additionally used, the optical shutter 91 is "opened" to allow the light to propagate through the optical path passing through the EDF 60-2.

For example, as illustrated in FIG. 39B, when the optical switch 102 or 90 is controlled to be in the "cross connection" state, the optical shutter 91 is controlled to be in the "opened" state. Therefore, signal light may be effectively amplified by the EDF 60-2.

The "opened" state and "closed" state of the optical shutter 91 are controlled by the above-described control circuit 80. For example, the control circuit 80 performs the "opened" and "closed" control for the optical shutter 91, as described above, according to control of connection state between the input and output ports of the optical switch 102 or 90.

Alternatively, the function of the optical shutter 91 may be realized by a VOA. For example, the "closed" state of the optical shutter 91 is realized by controlling a VOA loss to a maximum, whereas the "opened" state of the optical shutter 91 is realized by controlling the VOA loss to a minimum.

In addition, an example where an EDF of which optical connection/disconnection to/from the output optical path of the first EDF 60-1 is controlled by using the AD optical switch 90 is the second EDF 60-2 has been described in the above embodiment and Examples.

Additionally or alternatively, the EDF 60-3 may be optically connected/disconnected to/from the output optical path of the EDF 60-1 or the EDF 60-2 by using the AD optical switch 90, like the EDF 60-2.

Figure 40:
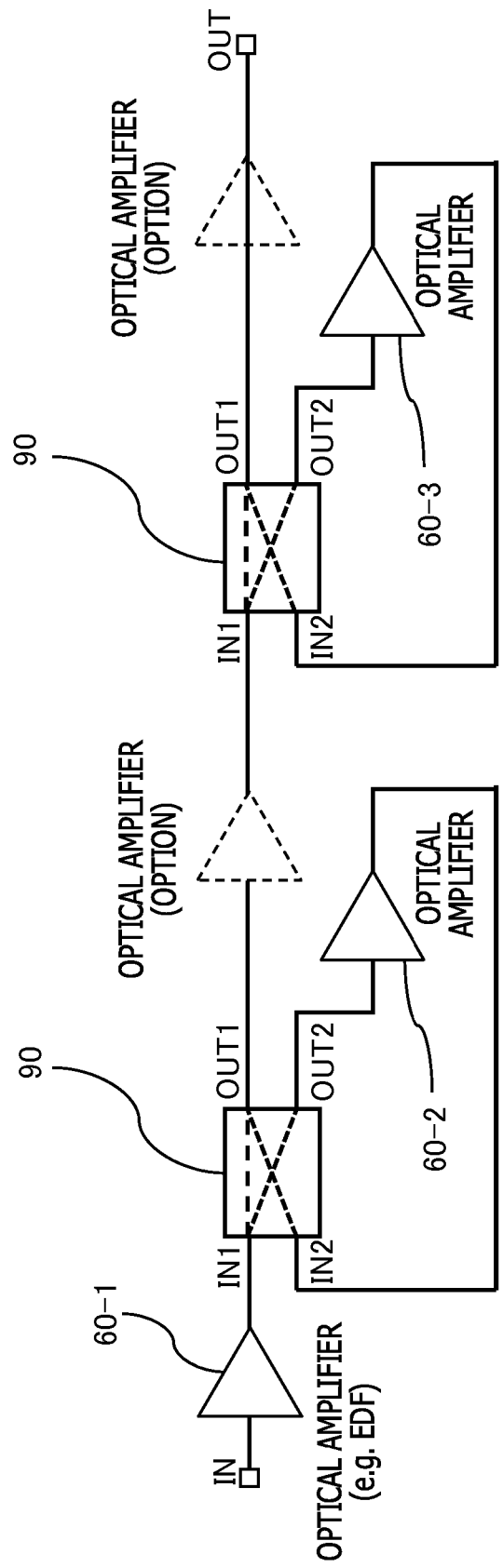
FIG. 40 is a block diagram illustrating a configuration example of the switchable optical amplifier according to the modification of FIG. 10.

For example, as illustrated in FIG. 40, an additional AD optical switch 90 may be used to optically connect/disconnect the EDF 60-3 to/from the output optical path of the EDF 60-2, like the connection form of EDF 60-2.

In this case, when a switch state of two AD optical switches 90 is controlled by, for example, the control circuit 80, switching between one-stage amplification by the EDF 60-1, two-stage amplification by the EDFs 60-1 and 60-2 and three-stage amplification by the EDFs 60-1 to 60-3 may be achieved.

Therefore, it is possible to realize three types of amplifier menus for, for example, short-range, intermediate-range and long-range with one switchable optical amplifier 13. In addition, it is possible to expect extension of variable gain range and improvement of the NF characteristics.

In addition, as illustrated by a dotted line in FIG. 40, one or more additional optical amplifiers (e.g., EDFs) may be interposed between the two AD optical switches 90. In addition, one or more additional optical amplifiers (e.g., EDFs) may be disposed in the first output port OUT1 of the AD optical switch 90 at the post-stage.

In the switchable optical amplifier 13 having the three-stage EDF configuration illustrated in FIGS. 15 to 24 and FIGS. 35 and 36, an additional VOA 67 may be interposed between the second output port OUT2 of the AD optical switch and an input of the EDF 60-2.

In this case, when VOA losses of two VOAs 67 are individually controlled by the control circuit 80, the VOA loss of light input to the EDF 60-3 may be distributed to two places to be controlled. Therefore, it is possible to set the input light level of the EDF 60-3 to be relatively high and expect improvement of the NF characteristics.

Similarly to the VOA loss of the VOA 67 disposed at the pre-stage of the EDF 60-3, the VOA loss of the VOA 67 added at the pre-stage of the EDF 60-2 is controlled by the control circuit 80 based on a monitored value of input/output light power of the VOAs 67.

The input/output light power of the additional VOA 67 may be monitored illustratively by disposing BS and PD at the pre-stage of and at the post-stage of the VOA 67, respectively. The control circuit 80 may control the VOA loss of the additional VOA 67 based on an electric signal (power monitored value) depending on received light power in each PD.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. A switchable optical amplifier comprising:
   a first optical amplifier;
   a second optical amplifier;
   an optical switch which includes first and second input ports and first and second output ports, the optical switch that switches between a first connection state where the first input port and the first output port are in an optical connection and the second input port and the second output port are not in an optical connection and a second connection state where the first input port and the second output port are in an optical connection and the second input port and the first output port are in an optical connection;
   an excitation light source that outputs excited light;
   a first coupler disposed at a pre-stage of the first optical amplifier and which emits the excited light into the first optical amplifier;
   a second coupler disposed at a post-stage of the first optical amplifier and which extracts a component of the excited light remaining in an output light of the first optical amplifier; and
   a third coupler disposed between an output of the second optical amplifier and the second input port of the optical switch and which emits the excited light component extracted by the second coupler into the second optical amplifier,
   wherein an output of the first optical amplifier is optically coupled to the first input port of the optical switch, and an input of the second optical amplifier is optically coupled to the second output port of the optical switch.

2. The switchable optical amplifier according to claim 1, further comprising:
   a fourth coupler which is interposed between the second coupler and the third coupler and cuts a signal light component amplified by the first optical amplifier.

3. The switchable optical amplifier according to claim 1, further comprising:
   a splitter that splits the excited light of the excitation light source.

4. The switchable optical amplifier according to claim 1, wherein the first and second optical amplifiers are an erbium-doped optical fiber amplifier.

5. An optical transmission apparatus comprising:
   a first optical amplifier which amplifies input light;
   a second optical amplifier;
   an optical switch which includes first and second input ports and first and second output ports, the optical switch switches between a first connection state where the first input port and the first output port are in an optical connection and the second input port and the second output port are not in an optical connection and a second connection state where the first input port and the second output port are in an optical connection and the second input port and the first output port are in an optical connection;
   an excitation light source that outputs excited light;
   a first coupler disposed at a pre-stage of the first optical amplifier and which emits the excited light into the first optical amplifier;
   a second coupler disposed at a post-stage of the first optical amplifier and which extracts a component of the excited light remaining in an output light of the first optical amplifier; and
   a third coupler disposed between an output of the second optical amplifier and the second input port of the optical switch and which emits the excited light component extracted by the second coupler into the second optical amplifier,
   wherein an output of the first optical amplifier is optically coupled to the first input port of the optical switch, and an input of the second optical amplifier is optically coupled to the second output port of the optical switch.

6. The optical transmission apparatus according to claim 5, further comprising:
a splitter that splits the excited light of the excitation light source.

* * * * *